United States Patent
Overton et al.

(10) Patent No.: US 8,385,705 B2
(45) Date of Patent: *Feb. 26, 2013

(54) MICROBEND-RESISTANT OPTICAL FIBER

(75) Inventors: Bob J. Overton, Lenoir, NC (US); Louis-Anne de Montmorillon, Versailles (FR); Simon Richard, Villebon sur Yvette (FR); Denis Molin, Draveil (FR); Marianne Bigot-Astruc, Marcoussis (FR); Pierre Sillard, Le Chesnay (FR); David Boivin, Longjumeau (FR)

(73) Assignee: Draka Comteq, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,097

(22) Filed: Mar. 26, 2012

(65) Prior Publication Data

US 2012/0189258 A1    Jul. 26, 2012

Related U.S. Application Data

(63) Continuation of application No. 12/774,845, filed on May 6, 2010, now Pat. No. 8,145,027, which is a continuation-in-part of application No. PCT/US2008/082927, filed on Nov. 9, 2008.

(60) Provisional application No. 60/986,737, filed on Nov. 9, 2007, provisional application No. 61/041,484, filed on Apr. 1, 2008, provisional application No. 61/112,595, filed on Nov. 7, 2008.

(51) Int. Cl.
*G02B 6/02* (2006.01)
*G02B 6/00* (2006.01)

(52) U.S. Cl. ......... 385/128; 385/126; 385/127; 385/144

(58) Field of Classification Search .......... 385/123–128, 385/141–145
See application file for complete search history.

(56) References Cited

U.S. PATENT DOCUMENTS

| 4,114,980 A | 9/1978 | Asam et al. |
| RE30,635 E | 6/1981 | Kuppers et al. |

(Continued)

FOREIGN PATENT DOCUMENTS

| DE | 3700565 A1 | 7/1988 |
| EP | 0059564 | 9/1982 |

(Continued)

OTHER PUBLICATIONS

Jeunhomme, "Single-Mode Fiber Optics, Principles and Applications, Second Edition, Revised and Expanded", pp. 38-49.

(Continued)

*Primary Examiner* — Daniel Petkovsek
(74) *Attorney, Agent, or Firm* — Summa, Additon & Ashe, P.A.

(57) ABSTRACT

Disclosed is an improved, single-mode optical fiber possessing a novel coating system. When combined with a bend-insensitive glass fiber, the novel coating system according to the present invention yields an optical fiber having exceptionally low losses. The coating system features (i) a softer primary coating with excellent low-temperature characteristics to protect against microbending in any environment and in the toughest physical situations and, optionally, (ii) a colored secondary coating possessing enhanced color strength and vividness. The secondary coating provides improved ribbon characteristics for structures that are robust, yet easily entered (i.e., separated and stripped). The optional dual coating is specifically balanced for superior heat stripping in fiber ribbons, with virtually no residue left behind on the glass. This facilitates fast splicing and terminations. The improved coating system provides optical fibers that offer significant advantages for deployment in most, if not all, fiber-to-the-premises (FTTx) systems.

65 Claims, 25 Drawing Sheets

10 – fiber
11 – central core
12 – first intermediate inner cladding
13 – first depressed inner cladding
14 – second intermediate inner cladding
15 – second depressed inner cladding
16 – outer cladding (refractive index $n_g$)

U.S. PATENT DOCUMENTS

| | | | |
|---|---|---|---|
| 4,314,833 A | 2/1982 | Kuppers | |
| 4,385,802 A | 5/1983 | Blaszyk et al. | |
| 4,641,917 A | 2/1987 | Glodis et al. | |
| 4,718,748 A | 1/1988 | Broer et al. | |
| 4,750,806 A | 6/1988 | Biswas | |
| 4,836,640 A | 6/1989 | Gartside, III et al. | |
| 4,838,643 A | 6/1989 | Hodges et al. | |
| 4,848,869 A | 7/1989 | Urruti | |
| 4,852,968 A | 8/1989 | Reed | |
| 4,904,051 A | 2/1990 | Broer et al. | |
| 5,032,001 A | 7/1991 | Shang | |
| 5,044,724 A | 9/1991 | Glodis et al. | |
| 5,062,685 A | 11/1991 | Cain et al. | |
| 5,106,402 A | 4/1992 | Geittner et al. | |
| 5,146,531 A | 9/1992 | Shustack | |
| 5,175,785 A | 12/1992 | Dabby | |
| 5,235,660 A | 8/1993 | Perry et al. | |
| 5,448,674 A | 9/1995 | Vengsarkar et al. | |
| 5,491,581 A | 2/1996 | Roba | |
| 5,555,340 A | 9/1996 | Onishi et al. | |
| 5,574,816 A | 11/1996 | Yang et al. | |
| 5,586,205 A | 12/1996 | Chen et al. | |
| 5,673,354 A | 9/1997 | Akasaka et al. | |
| 5,717,805 A | 2/1998 | Stulpin | |
| 5,721,800 A | 2/1998 | Kato et al. | |
| 5,761,362 A | 6/1998 | Yang et al. | |
| 5,802,236 A | 9/1998 | DiGiovanni et al. | |
| 5,851,259 A | 12/1998 | Clayton et al. | |
| 5,852,690 A | 12/1998 | Haggans et al. | |
| 5,911,023 A | 6/1999 | Risch et al. | |
| 5,917,109 A | 6/1999 | Berkey | |
| 5,946,439 A | 8/1999 | Terasawa et al. | |
| 5,963,700 A | 10/1999 | Kato et al. | |
| 5,966,490 A | 10/1999 | Minns et al. | |
| 5,982,968 A | 11/1999 | Stulpin | |
| 6,035,087 A | 3/2000 | Bonicel et al. | |
| 6,041,153 A | 3/2000 | Yang | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,181,858 B1 | 1/2001 | Kato et al. | |
| 6,185,353 B1 | 2/2001 | Yamashita et al. | |
| 6,210,802 B1 | 4/2001 | Risch et al. | |
| 6,215,931 B1 | 4/2001 | Risch et al. | |
| 6,240,224 B1 | 5/2001 | Reekie et al. | |
| 6,266,467 B1 | 7/2001 | Kato et al. | |
| 6,280,850 B1 | 8/2001 | Oh et al. | |
| 6,314,224 B1 | 11/2001 | Stevens et al. | |
| 6,317,551 B1 | 11/2001 | Mitchell et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,334,019 B1 | 12/2001 | Birks et al. | |
| 6,360,046 B1 | 3/2002 | Sasaoka et al. | |
| 6,381,390 B1 | 4/2002 | Hutton et al. | |
| 6,396,987 B1 | 5/2002 | de Montmorillon et al. | |
| 6,411,403 B1 | 6/2002 | Siddhamalli | |
| 6,415,089 B2 | 7/2002 | Kato et al. | |
| 6,422,042 B1 | 7/2002 | Berkey | |
| 6,424,776 B1 | 7/2002 | Nouchi et al. | |
| 6,466,721 B1 | 10/2002 | Tsukitani et al. | |
| 6,477,305 B1 | 11/2002 | Berkey et al. | |
| 6,490,396 B1 | 12/2002 | Smith | |
| 6,490,398 B2 | 12/2002 | Gruner-Nielsen et al. | |
| 6,493,491 B1 | 12/2002 | Shen et al. | |
| 6,498,887 B1 | 12/2002 | Gruner-Nielsen et al. | |
| 6,510,268 B1 | 1/2003 | de Montmorillon et al. | |
| 6,529,666 B1 | 3/2003 | Dultz et al. | |
| 6,530,244 B1 | 3/2003 | Oh et al. | |
| 6,535,665 B1 | 3/2003 | Kim et al. | |
| 6,535,676 B1 | 3/2003 | de Montmorillon et al. | |
| 6,542,683 B1 | 4/2003 | Evans et al. | |
| 6,587,623 B1 | 7/2003 | Papen et al. | |
| 6,603,908 B2 | 8/2003 | Dallas et al. | |
| 6,603,913 B1 | 8/2003 | Okuno | |
| 6,618,538 B2 | 9/2003 | Nechitailo et al. | |
| 6,647,190 B2 | 11/2003 | Matsuo et al. | |
| 6,650,814 B2 | 11/2003 | Caplen et al. | |
| 6,658,184 B2 | 12/2003 | Bourget et al. | |
| 6,658,190 B2 | 12/2003 | Hirano et al. | |
| 6,671,442 B2 | 12/2003 | Wang et al. | |
| 6,687,440 B2 | 2/2004 | Balestra et al. | |
| 6,687,445 B2 | 2/2004 | Carter et al. | |
| 6,694,079 B1 | 2/2004 | Matsuo et al. | |
| 6,707,976 B1 | 3/2004 | Gruner-Nielsen et al. | |
| 6,744,959 B2 | 6/2004 | Takahasi | |
| 6,749,446 B2 | 6/2004 | Nechitailo | |
| 6,751,389 B2 | 6/2004 | Tirloni | |
| 6,754,425 B2 | 6/2004 | Jeon et al. | |
| 6,771,865 B2 | 8/2004 | Blaszyk et al. | |
| 6,804,441 B2 | 10/2004 | Arai et al. | |
| 6,819,848 B2 | 11/2004 | Takahashi | |
| 6,856,744 B2 | 2/2005 | Kumano | |
| 6,859,599 B2 | 2/2005 | Mukasa | |
| 6,879,764 B2 | 4/2005 | Changdar et al. | |
| 6,885,802 B2 | 4/2005 | Oliveti et al. | |
| 6,901,196 B2 | 5/2005 | Takahashi et al. | |
| 6,901,197 B2 | 5/2005 | Hasegawa et al. | |
| 6,904,218 B2 | 6/2005 | Sun et al. | |
| 6,904,772 B2 | 6/2005 | Berkey et al. | |
| 6,912,347 B2 | 6/2005 | Rossi et al. | |
| 6,917,740 B2 | 7/2005 | Boek et al. | |
| 6,917,743 B2 | 7/2005 | Honma et al. | |
| 6,922,515 B2 | 7/2005 | Nechitailo et al. | |
| 6,925,239 B2 | 8/2005 | Wang et al. | |
| 6,928,211 B2 | 8/2005 | Tanigawa et al. | |
| 6,928,839 B2 | 8/2005 | Bilinov | |
| 6,941,049 B2 | 9/2005 | Risch et al. | |
| 6,941,054 B2 | 9/2005 | Tirloni et al. | |
| 6,952,519 B2 | 10/2005 | Bickham et al. | |
| 6,959,137 B2 | 10/2005 | Kalish et al. | |
| 6,961,508 B2 | 11/2005 | van Eekelen et al. | |
| 6,985,662 B2 | 1/2006 | Bickham | |
| 7,008,696 B2 | 3/2006 | Kim et al. | |
| 7,045,010 B2 | 5/2006 | Sturman, Jr. | |
| 7,072,552 B2 | 7/2006 | Manyam et al. | |
| 7,085,466 B2 | 8/2006 | Roba et al. | |
| 7,095,940 B2 | 8/2006 | Hayami et al. | |
| 7,162,128 B2 | 1/2007 | Lovie et al. | |
| 7,164,832 B2 | 1/2007 | Kumano | |
| 7,164,835 B2 | 1/2007 | Matsuo et al. | |
| 7,171,074 B2 | 1/2007 | DiGiovanni et al. | |
| 7,171,090 B2 | 1/2007 | Mattingly, III et al. | |
| 7,171,103 B2 | 1/2007 | Eekelen et al. | |
| 7,187,833 B2 | 3/2007 | Mishra | |
| 7,200,310 B2 | 4/2007 | Roba et al. | |
| 7,228,040 B2 | 6/2007 | Nakajima et al. | |
| 7,239,784 B2 | 7/2007 | Hayami et al. | |
| 7,254,305 B2 | 8/2007 | Mishra | |
| 7,272,289 B2 | 9/2007 | Bickham et al. | |
| 7,283,714 B1 | 10/2007 | Gapontsev et al. | |
| 7,292,762 B2 | 11/2007 | Guan et al. | |
| 7,295,741 B2 | 11/2007 | Sako et al. | |
| 7,315,677 B1 | 1/2008 | Li et al. | |
| 7,317,858 B2 | 1/2008 | Roba et al. | |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,366,386 B2 | 4/2008 | Sako et al. | |
| 7,366,387 B2 | 4/2008 | Matsuo et al. | |
| 7,433,566 B2 | 10/2008 | Bookbinder et al. | |
| 7,440,663 B2 | 10/2008 | Matsuo et al. | |
| 7,440,665 B2 | 10/2008 | Hasegawa | |
| 7,444,838 B2 | 11/2008 | Pickrell et al. | |
| 7,450,806 B2 | 11/2008 | Bookbinder et al. | |
| 7,450,807 B2 | 11/2008 | Bickham et al. | |
| 7,483,613 B2 | 1/2009 | Bigot-Astruc et al. | |
| 7,505,660 B2 | 3/2009 | Bickham et al. | |
| 7,515,795 B2 | 4/2009 | Overton et al. | |
| 7,526,166 B2 | 4/2009 | Bookbinder et al. | |
| 7,526,169 B2 | 4/2009 | Bickham et al. | |
| 7,555,186 B2 | 6/2009 | Flammer et al. | |
| 7,555,187 B2 | 6/2009 | Bickham et al. | |
| 7,567,739 B2 | 7/2009 | Overton et al. | |
| 7,567,742 B2 | 7/2009 | Pickrell et al. | |

| | | | | | | |
|---|---|---|---|---|---|---|
| 7,569,801 B2 | 8/2009 | Oka | | 2008/0292262 A1 | 11/2008 | Overton et al. |
| 7,570,852 B2 | 8/2009 | Nothofer et al. | | 2008/0304800 A1 | 12/2008 | Bickham et al. |
| 7,574,088 B2 | 8/2009 | Sugizaki et al. | | 2008/0317410 A1 | 12/2008 | Griffioen et al. |
| 7,574,095 B2 | 8/2009 | Lock et al. | | 2009/0003779 A1 | 1/2009 | Parris |
| 7,587,111 B2 | 9/2009 | de Montmorillon et al. | | 2009/0003781 A1 | 1/2009 | Parris et al. |
| 7,599,589 B2 | 10/2009 | Overton et al. | | 2009/0003785 A1 | 1/2009 | Parris et al. |
| 7,620,282 B2 | 11/2009 | Bickham | | 2009/0041414 A1 | 2/2009 | Lavenne et al. |
| 7,623,747 B2 | 11/2009 | de Montmorillon et al. | | 2009/0060437 A1 | 3/2009 | Fini et al. |
| 7,639,915 B2 | 12/2009 | Parris et al. | | 2009/0126407 A1 | 5/2009 | Bookbinder et al. |
| 7,646,954 B2 | 1/2010 | Tatat | | 2009/0154888 A1 | 6/2009 | Abbott, III et al. |
| 7,665,902 B2 | 2/2010 | Griffioen et al. | | 2009/0169163 A1 | 7/2009 | Abbott, III et al. |
| 7,873,249 B2 | 1/2011 | Kachmar et al. | | 2009/0175583 A1 | 7/2009 | Overton |
| 7,889,960 B2 | 2/2011 | de Montmorillon | | 2009/0208176 A1 | 8/2009 | Guan et al. |
| 7,899,293 B2 | 3/2011 | de Montmorillon | | 2009/0214167 A1 | 8/2009 | Lookadoo et al. |
| 8,031,997 B2 | 10/2011 | Overton | | 2009/0232461 A1 | 9/2009 | Nakajima et al. |
| 8,041,167 B2 | 10/2011 | Overton | | 2009/0252469 A1 | 10/2009 | Sillard et al. |
| 8,041,168 B2 | 10/2011 | Overton | | 2009/0263092 A1 | 10/2009 | Flammer et al. |
| 8,081,853 B2 | 12/2011 | Overton | | 2009/0274424 A1 | 11/2009 | Debut et al. |
| 8,081,854 B2 | 12/2011 | Yoon et al. | | 2009/0279833 A1 | 11/2009 | Overton et al. |
| 8,081,855 B2 | 12/2011 | Nakanishi et al. | | 2009/0279835 A1 | 11/2009 | de Montmorillon et al. |
| 8,081,856 B2 | 12/2011 | Nakanishi et al. | | 2009/0279836 A1 | 11/2009 | de Montmorillon et al. |
| 8,107,784 B2 * | 1/2012 | Borel et al. .................... 385/127 | | 2009/0290841 A1 | 11/2009 | Borel et al. |
| 8,131,125 B2 | 3/2012 | de Montmorillon et al. | | 2009/0297107 A1 | 12/2009 | Tatat |
| 8,145,025 B2 * | 3/2012 | de Montmorillon et al. . 385/127 | | 2009/0317039 A1 | 12/2009 | Blazer et al. |
| 8,145,026 B2 | 3/2012 | Overton et al. | | 2010/0021117 A1 | 1/2010 | de Montmorillon |
| 8,145,027 B2 * | 3/2012 | Overton et al. ............... 385/128 | | 2010/0021170 A1 | 1/2010 | Lumineau et al. |
| 8,165,439 B2 | 4/2012 | Overton | | 2010/0028020 A1 | 2/2010 | Gholami et al. |
| 8,265,442 B2 | 9/2012 | Overton | | 2010/0067855 A1 | 3/2010 | Barker |
| 2002/0031317 A1 | 3/2002 | Tsukitani et al. | | 2010/0067857 A1 | 3/2010 | Lovie et al. |
| 2002/0034367 A1 | 3/2002 | Gaillard et al. | | 2010/0067859 A1 | 3/2010 | de Montmorillon et al. |
| 2002/0061175 A1 | 5/2002 | Matsuo et al. | | 2010/0092135 A1 | 4/2010 | Barker et al. |
| 2002/0122644 A1 | 9/2002 | Birks et al. | | 2010/0092138 A1 | 4/2010 | Overton |
| 2002/0159731 A1 | 10/2002 | Gruner-Nielsen et al. | | 2010/0092139 A1 | 4/2010 | Overton |
| 2003/0063878 A1 | 4/2003 | Matsuo et al. | | 2010/0092140 A1 | 4/2010 | Overton |
| 2003/0081921 A1 | 5/2003 | Sillard et al. | | 2010/0118388 A1 | 5/2010 | Pastouret et al. |
| 2003/0142938 A1 | 7/2003 | Koyano et al. | | 2010/0119022 A1 | 5/2010 | Overton |
| 2003/0152349 A1 | 8/2003 | Lauzon et al. | | 2010/0119202 A1 | 5/2010 | Overton |
| 2003/0190128 A1 | 10/2003 | Jang et al. | | 2010/0135623 A1 | 6/2010 | Overton |
| 2003/0210878 A1 | 11/2003 | Kumano et al. | | 2010/0135624 A1 | 6/2010 | Overton et al. |
| 2003/0231847 A1 | 12/2003 | Varner et al. | | 2010/0135625 A1 | 6/2010 | Overton |
| 2004/0013382 A1 | 1/2004 | van Eekelen et al. | | 2010/0135627 A1 | 6/2010 | Pastouret et al. |
| 2004/0022511 A1 | 2/2004 | Eekelen et al. | | 2010/0142033 A1 | 6/2010 | Regnier et al. |
| 2004/0033039 A1 | 2/2004 | Oliveti et al. | | 2010/0166375 A1 | 7/2010 | Parris |
| 2004/0042748 A1 | 3/2004 | Gruner-Nielsen et al. | | 2010/0183821 A1 | 7/2010 | Hartsuiker et al. |
| 2004/0086245 A1 | 5/2004 | Farroni et al. | | 2010/0189400 A1 | 7/2010 | Sillard et al. |
| 2004/0208463 A1 | 10/2004 | Park | | 2010/0209059 A1 | 8/2010 | Conrad et al. |
| 2005/0089289 A1 | 4/2005 | Hayami et al. | | 2010/0254668 A1 | 10/2010 | Consonni et al. |
| 2005/0244120 A1 | 11/2005 | Mishra | | 2010/0290781 A1 | 11/2010 | Overton et al. |
| 2006/0024010 A1 | 2/2006 | van Eekelen et al. | | 2011/0135264 A1 | 6/2011 | de Montmorillon et al. |
| 2006/0115224 A1 | 6/2006 | Kutami et al. | | 2012/0183268 A1 | 7/2012 | de Montmorillon et al. |
| 2006/0140560 A1 | 6/2006 | Allen et al. | | 2012/0189258 A1 | 7/2012 | Overton et al. |
| 2007/0003198 A1 | 1/2007 | Gibson et al. | | | | |
| 2007/0003199 A1 | 1/2007 | Mattingly et al. | | FOREIGN PATENT DOCUMENTS | | |
| 2007/0019915 A1 | 1/2007 | Overton et al. | | EP | 0327702 A2 | 8/1989 |
| 2007/0053642 A1 | 3/2007 | Mishra | | EP | 0848266 A1 | 6/1998 |
| 2007/0077016 A1 | 4/2007 | Bickham et al. | | EP | 0991967 A1 | 4/2000 |
| 2007/0104437 A1 | 5/2007 | Bookbinder et al. | | EP | 1116972 A1 | 7/2001 |
| 2007/0127878 A1 | 6/2007 | de Montmorillon et al. | | EP | 1398653 A1 | 3/2004 |
| 2007/0147756 A1 | 6/2007 | Matsuo et al. | | EP | 1443347 A2 | 8/2004 |
| 2007/0183726 A1 | 8/2007 | Nothofer et al. | | EP | 1650174 A2 | 4/2006 |
| 2007/0196061 A1 | 8/2007 | Bickham et al. | | EP | 1698920 A1 | 9/2006 |
| 2007/0258686 A1 | 11/2007 | de Montmorillon et al. | | EP | 1762867 | 3/2007 |
| 2007/0263960 A1 | 11/2007 | Lock et al. | | EP | 1785754 A1 | 5/2007 |
| 2007/0274651 A1 | 11/2007 | DiGiovanni et al. | | EP | 1845399 A1 | 10/2007 |
| 2007/0280615 A1 | 12/2007 | de Montmorillon et al. | | EP | 1921478 A1 | 5/2008 |
| 2008/0013898 A1 | 1/2008 | Wells | | EP | 1930753 A1 | 6/2008 |
| 2008/0013905 A1 | 1/2008 | Bookbinder et al. | | EP | 2116877 A1 | 5/2009 |
| 2008/0037942 A1 | 2/2008 | Tatat | | EP | 2116878 A1 | 11/2009 |
| 2008/0056654 A1 | 3/2008 | Bickham et al. | | GB | 2228585 A | 8/1990 |
| 2008/0056658 A1 | 3/2008 | Bickham et al. | | JP | 06-196778 | 7/1994 |
| 2008/0124028 A1 | 5/2008 | Bickham et al. | | JP | 09-048629 | 2/1997 |
| 2008/0145010 A1 | 6/2008 | Overton et al. | | JP | 09-218319 | 8/1997 |
| 2008/0152288 A1 | 6/2008 | Flammer et al. | | JP | 09-311231 | 12/1997 |
| 2008/0166094 A1 | 7/2008 | Bookbinder et al. | | JP | 2000-338353 | 12/2000 |
| 2008/0181564 A1 | 7/2008 | Overton et al. | | JP | 2002-082250 | 3/2002 |
| 2008/0193092 A1 | 8/2008 | Greenwood et al. | | JP | 2006-133314 | 5/2006 |
| 2008/0226241 A1 | 9/2008 | Sugizaki et al. | | WO | 99/00685 A1 | 1/1999 |
| 2008/0240662 A1 | 10/2008 | Helvenstein | | WO | 00/14580 A1 | 3/2000 |
| 2008/0279514 A1 | 11/2008 | Kundis et al. | | WO | 00/37977 A1 | 6/2000 |

| | | |
|---|---|---|
| WO | 01/05724 A2 | 1/2001 |
| WO | 01/27667 A2 | 4/2001 |
| WO | 01/47822 A1 | 7/2001 |
| WO | 01/47822 A2 | 7/2001 |
| WO | 02/12931 A2 | 2/2002 |
| WO | 02/29459 A1 | 4/2002 |
| WO | 0239159 A1 | 5/2002 |
| WO | 02/055614 A2 | 7/2002 |
| WO | 03/091177 A1 | 11/2003 |
| WO | 03/091178 A | 11/2003 |
| WO | 03/091781 A1 | 11/2003 |
| WO | 03107054 A1 | 12/2003 |
| WO | 2004/027941 | 4/2004 |
| WO | 2004/092794 A1 | 10/2004 |
| WO | 2004109352 A1 | 12/2004 |
| WO | 2006/090519 | 8/2006 |
| WO | 2007/013923 A2 | 2/2007 |
| WO | 2008027351 A2 | 3/2008 |
| WO | 2008/037291 A1 | 4/2008 |
| WO | 2008/157341 A2 | 12/2008 |
| WO | 2009/062131 A1 | 5/2009 |
| WO | 2009/064381 A1 | 5/2009 |
| WO | 2010/053356 A2 | 5/2010 |

OTHER PUBLICATIONS

Allard, et al., "Bending loss of a single-mode triangular-index fiber with a depressed cladding ring by a vector mode method", SPIE vol. 1792 (1992), 66. 146-155.

Allard, et al., "Bending-loss studies of a single-mode triangular-index fiber with a depressed cladding ring with a vector-mode method", Applied Optics, vol. 33, No. 33, Nov. 20, 1994, pp. 7725-7732.

Yip, et al, "Dispersion Studies of a Single-Mode Triangular-Core Fiber with a Trench by the Vector Mode Analysis", 1989 IEEE MTT-S Digest, pp. 1175-1178.

Yip et al., "Dispersion studies of a single-mode triangular-index fiber with a trench by the vector mode analysis", Applied Optics, vol. 29, No. 36, Dec. 20, 1990, pp. 5343-5352.

Bing et al., "Low-loss Holey Fiber", Hitachi Cable Review No. 24, Aug. 2005, pp. 1-5.

S. Matsuo et al., "Low-Bending-Loss and Low-Splice-Loss Single-Mode Fibers Employing a Trench Index Profile", Journal of Lightwave Technology, Vo. 23 n. 11, pp. 3494-3499, (2005).

K. Himeno et al., "Low-Bending-Loss Single Mode Fibers for Fiber-To-The Home", Journal of Lightwave Technology, vol. 23, No. 11, pp. 3494-3499, (2005).

T. Hasegawa et al., "Bend-Insensitive Single-Mode Holey Fiber with SMF-Compatibility for Optical Wiring Applications", Proceedings ECOC'03, paper We2.7.3, Rimini, Italy, pp. 1-2 (2003).

D. Nishioka et al., "Development of Holey Fiber Supporting Extra-Small Diameter Bending," SEI Technical Review, No. 58, pp. 42-47, (2004).

K. Miyake et al., "Bend Resistant Photonic Crystal Fiber Compatible with Conventional Single Mode Fiber," Proceedings ECOC'04, paper Mo3.3.4, Stockholm, Sweden, pp. 1-2 (2004).

Y. Tsuchida et al., "Design and Characterization of Single-Mode Holey Fibers with Low Bending Losses", Optics Express, vol. 13, No. 12, pp. 4470-4479, (2005).

K. Ohsono et al., "High Performance Optical Fibers for Next Generation Transmission Systems," Hitachi Cable Review, No. 22, pp. 1-5, (2003).

K. Nakajima et al., "Hole-Assisted Fiber Design for Small Bending and Splice Loss," IEEE Photonics Technology Letters, vol. 15, No. 12, pp. 1737-1739, (2003).

K. Ieda et al., "Transmission Characteristics of a Hole-Assisted Fiber Cord for Flexible Optical Wiring," Proceedings 54th IWCS, pp. 63-68, (2005).

N. Guan et al., "Hole-Assisted Single Mode Fibers for Low Bending Loss," Proceedings ECOC'04, paper M03.3.5, Stockholm, Sweden, pp. 1-2 (2004).

European Search Report and Written Opinion in commonly owned European Application No. 07006909, dated Jul. 7, 2007, pp. 1-8.

French Search Report and Written Opinion in commonly owned French Application No. 0603128, dated Jul. 20, 2006, pp. 1-8.

Botineau, J. et al, "Effective Stimulated Brillouin Gain in Single Mode Optical Fibers," Electronics Letters, vol. 31, No. 23, pp. 1-3 (Nov. 9, 1995) [Cited in Specification].

Yoshizawa, N. et al., "Stimulated Brillouin Scattering Suppression by Means of Applying Strain Distribution to Fiber with Cabling," IEEE JLT, vol. 11, No. 10, pp. 1518-1522, (1993).

European Search Report for commonly owned European Patent Application No. 06076957, dated Jan. 26, 2007, pp. 1-3.

European Office Action in commonly owned European Patent Application No. 06076957, dated Nov. 2, 2007, pp. 1-7.

Matsuo et al., "Bend-Insensitive and Low Splice-Loss Optical Fiber for Indoor Wiring in FTTH", OFC'04 Proceedings, paper Th13, pp. 1-4 (2004).

Sakabe et al., "Enhanced Bending Loss Insensitive Fiber and New Cables for CWDM Access Networks", 53rd IWCS Proceedings, pp. 112-118 (2004).

Bandou et al., "Development of Premises Optical Wiring Components Using Hole-Assisted Fiber" 53rd IWCS Proceedings, pp. 119-122 (2004) [Cited in Specification].

Yokokawa et al., "Ultra-Low Loss and Bend Insensitive Pure-silica-core Fiber Complying with G.652 C/D and its Applications to a Loose Tube Cable", 53rd IWCS Proceedings, pp. 150-155 (2004).

Matsuo et al., "Low-Bending-Loss and Low-Splice-Loss Single-Mode Fibers Employing a Trench Index Profile", IEICE Trans. Electron., vol. E88-C, No. 5, pp. 889-895, May 2005.

Unger et al., "Low-loss Single mode Fibre with reduced inner cladding", OFC 1987 Post deadline paper, pp. 8-12.

De Montmorillon et al., "Bend-Optimized G.652D Compatible Trench-Assisted Single Mode Fibers", IWCS, Proceedings of the 55th IWCS/Focus, pp. 342-347, Providence, RI, (Nov. 2006).

U.S. Appl. No. 60/841,490, filed Aug. 31, 2006, pp. 1-29.

U.S. Appl. No. 60/879,702, filed Jan. 10, 2007, pp. 1-45.

U.S. Appl. No. 60/841,458, filed Aug. 31, 2006, pp. 1-25.

U.S. Appl. No. 60/861,776, filed Nov. 29, 2006, pp. 1-46.

European Search Report in commonly owned European Application No. 09006121, dated Jul. 30, 2009, pp. 1-8.

European Search Report in commonly owned European Application No. 09006117, dated Jul. 30, 2009, pp. 1-8.

French Search Report in commonly owned French Application No. 0802503, dated Dec. 11, 2008, pp. 1-8.

U.S. Appl. No. 60/986,737, filed Nov. 9, 2007, pp. 1-65 [Cited in Specification].

U.S. Appl. No. 61/041,484, filed Apr. 11, 2008, pp. 1-82 [Cited in Specification].

U.S. Appl. No. 61/112,595, filed Nov. 7, 2008, pp. 1-321 [Cited in Specification].

U.S. Appl. No. 61/101,337, filed Sep. 30, 2008, pp. 1-66 [Cited in Specification].

U.S. Appl. No. 61/112,006, filed Nov. 6, 2008, pp. 1-68 [Cited in Specification].

U.S. Appl. No. 61/112,374, filed Nov. 7, 2008, pp. 1-85 [Cited in Specification].

U.S. Appl. No. 61/096,545, filed Sep. 12, 2008, pp. 1-37 [Cited in Specification].

U.S. Appl. No. 61/096,750, filed Sep. 12, 2008, pp. 1-60 [Cited in Specification].

Draka, Product Specification for BendBright Single Mode Optical Fibre, Issue date Oct. 2007, pp. 1-2.

Draka, Product Specification for Enhanced Single Mode Optical Fibre (ESMF), Issue date Oct. 2007, pp. 1-2.

Draka, Product Specification for BendBright XS Single Mode Optical Fibre, Issue date Oct. 2007, pp. 1-2.

Draka, Product Specification for Cabling Options-Optical Fiber Types, Issue date May 26, 2006, pp. 1.

Overton et al., Microbending-Resistant Fiber, Draka Communications, IWCS Proceedings, pp. 1-21 (Nov. 2008).

Overton, et al., New Optical Fiber Coating System Optimized for FTTx Applications, Draka Comteq, IWCS Proceedings, Orlando, FL, pp. 1-25 (Nov. 2007).

Draka, Product Specification for Enhanced Single Mode Optical Fibre (ESMF), Issue date Sep. 2008, pp. 1-2.

Draka, Product Specification for BendBright XS Single Mode Optical Fibre, Issue date Sep. 2008, pp. 1-2.

U.S. Appl. No. 61/177,996, filed May 13, 2009, pp. 1-57.
International Search Report and Written Opinion in counterpart International Application No. PCT/US2008/082927, dated Mar. 31, 2009, pp. 1-25.
Corning, Product Information for "Corning ClearCurve Optical Fiber With Corning nanoStructures Technology," (Feb. 2009), pp. 1-10.
Ramachandran, et al., "Measurement of Multipath Interference in the Coherent Crosstalk Regime," IEEE Photonics Technology Letters, vol. 15, No. 8, pp. 1171-1173, Aug. 2003.
Zheng et al., "Measurement and System Impact of Multipath Interference From Dispersion Compensating Fiber Modules," IEEE Transaction on Instrumentation and Measurement, vol. 53, No. 1, pp. 15-23, Feb. 2004.
Botineau et al. In "Effective Stimulated Brillouin Gain in Single Mode Optical Fibers," Electronics Letters, vol. 31, No. 23, pp. 2032-2034 (1995).
U.S. Appl. No. 12/098,804, filed Apr. 7, 2008, pp. 1-35.
International Preliminary Report on Patentability in counterpart International Application No. PCT/US2008/082927, mailed May 20, 2010, pp. 1-16.
U.S. Appl. No. 61/147,586, filed Jan. 27, 2009, pp. 1-63.
U.S. Appl. No. 61/147,590, filed Jan. 27, 2009, pp. 1-54.
U.S. Appl. No. 61/154,538, filed Feb. 23, 2009, pp. 1-73.
U.S. Appl. No. 61/248,319, filed Oct. 2, 2009, pp. 1-96.
U.S. Appl. No. 61/239,055, filed Sep. 1, 2009, pp. 1-20.
U.S. Appl. No. 61/242,618, filed Sep. 15, 2009, pp. 1-25.
U.S. Appl. No. 61/155,317, filed Feb. 25, 2009, pp. 1-28.
U.S. Appl. No. 61/185,462, filed Jun. 9, 2009, pp. 1-66.
U.S. Appl. No. 61/230,158, filed Jul. 31, 2009, pp. 1-41.
U.S. Appl. No. 61/241,592, filed Sep. 11, 2009, pp. 1-63.
U.S. Appl. No. 61/243,626, filed Sep. 18, 2009, pp. 1-71.
U.S. Appl. No. 61/242,287, filed Sep. 14, 2009, pp. 1-26.
Corning, "High Temperature/Harsh Environment Single-mode & Multimode Specialty Fibers," PI 1500, Issued Jan. 2008, pp. 1-2.
Commonly owned U.S. Appl. No. 12/774,845, filed May 6, 2010, pp. 1-125.
European Office Action in commonly owned European Application No. 08848453 dated Apr. 27, 2011, pp. 1-8.
International Search Report and Written Opinion in commonly owned International Application No. PCT/NL2009/000214 dated Apr. 28, 2011, pp. 1-12.
International Preliminary Report on Patentability in commonly owned International Application No. PCT/NL2009/000214 dated May 26, 2011, pp. 1-8.
European Office Action in commonly owned European Application No. 08848453.0 dated Jul. 23, 2012, pp. 1-4.
European Patent Office Decision to Grant in commonly owned European Application No. 09006117.7 dated Nov. 24, 2011, pp. 1-2.

* cited by examiner

10 – fiber

11 – central core

12 – first intermediate inner cladding

13 – first depressed inner cladding

14 – second intermediate inner cladding

15 – second depressed inner cladding

16 – outer cladding (refractive index $n_g$)

10 – fiber

11 – central core

12 – intermediate cladding

13 – depressed cladding

14 – external optical cladding (refractive index $n_g$)

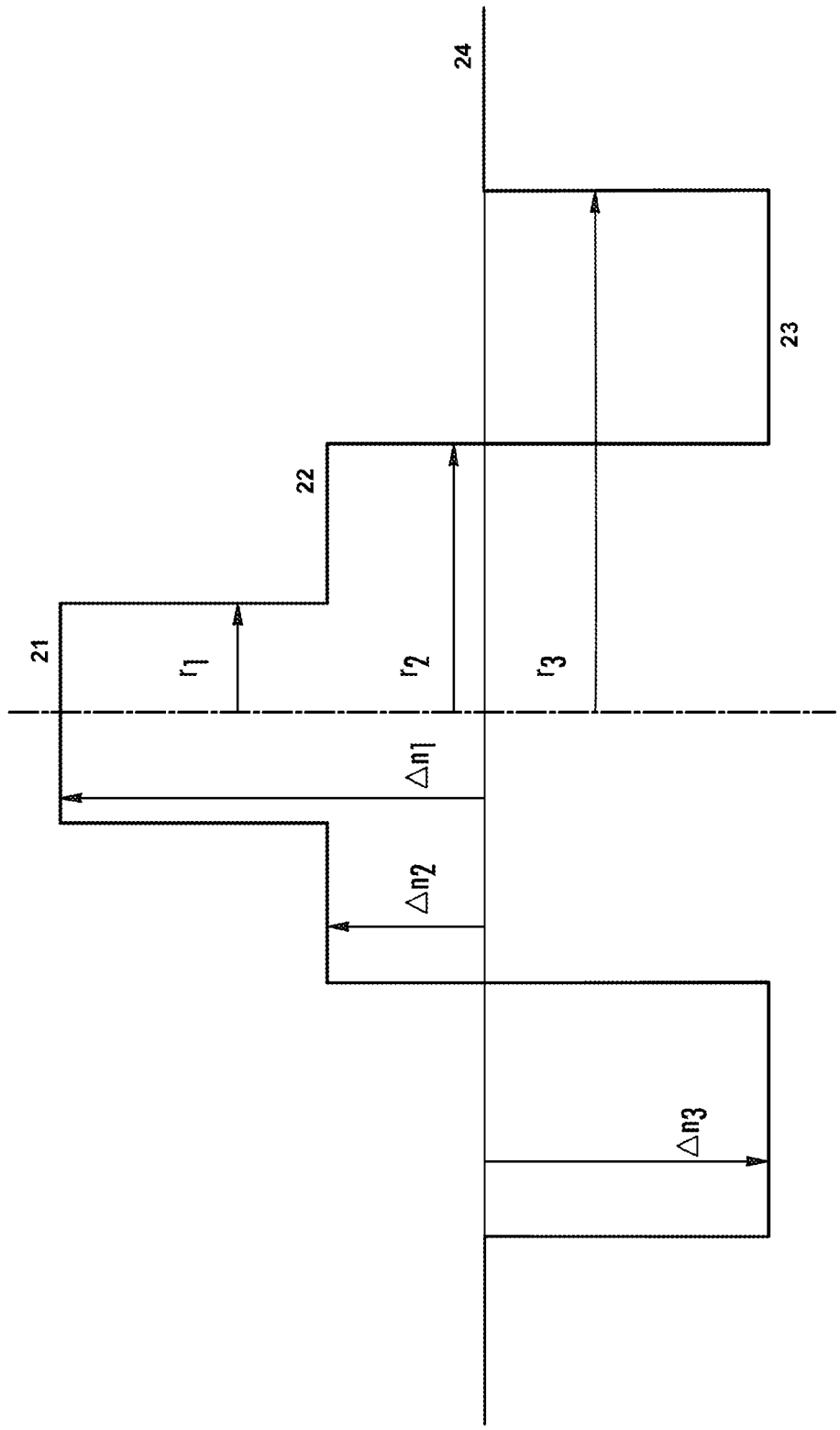

US 8,385,705 B2

MICROBEND-RESISTANT OPTICAL FIBER

CROSS-REFERENCE TO PRIORITY APPLICATIONS

This application is a continuation of commonly-assigned U.S. application Ser. No. 12/774,845, now U.S. Pat. No. 8,145,027, for a Microbend-Resistant Optical Fiber (filed May 6, 2010), which itself is a continuation-in-part of International Patent Application No. PCT/US2008/082927 for a Microbend-Resistant Optical Fiber, filed Nov. 9, 2008, (and published May 14, 2009, as International Publication No. WO 2009/062131 A1), which itself claims the benefit of U.S. patent application No. 60/986,737 for a Microbend-Resistant Optical Fiber (filed Nov. 9, 2007), U.S. Patent Application No. 61/041,484 (filed Apr. 1, 2008) for a Microbend-Resistant Optical Fiber, and U.S. Patent Application No. 61/112,595 for a Microbend-Resistant Optical Fiber (filed Nov. 7, 2008). Each of the foregoing patent applications and patent application publication is hereby incorporated by reference in its entirety.

FIELD OF THE INVENTION

The present invention embraces optical fibers possessing an improved coating system that reduces stress-induced microbending.

BACKGROUND OF THE INVENTION

Fiber to the premises/business/home (i.e., FTTx) provides broadband data transfer technology to the individual end-user. FTTx installations, which are being increasingly deployed throughout the world, are making use of innovative, reduced-cost system designs to promote the spread of the technology. For example, fiber may be delivered in the last link by way of a microcable. Air-blown fibers provide another efficient model for delivering the link to the end-use terminus. There continues to be industry-wide focus on modes of deployment that overcome economic obstacles that impede fiber-based broadband solutions for data transmission to businesses and residences.

Cost-effectiveness is important, of course, for achieving successful FTTx systems. Reduced size for cables, drops, and structures for blowing are often critical, too. Installation of conduits suitable for traditional cable designs is often prohibitive in existing infrastructure. Thus, existing small ducts or tight pathways have to be used for new fiber installations. Low-cost and reduced-size requirements are driving in a direction that reduces protection for the optical fibers (i.e., away from conventionally robust, more bulky cable designs).

Glass designs are now available that offer reduced sensitivity to small bending radius (i.e., decreased added attenuation due to the phenomenon known as macrobending). These include trench-assisted core design or void-assisted fibers. Glass designs with lower mode field diameter are less sensitive to macrobending effects, but are not compatible with the G.652 SMF standard. Single-mode optical fibers that are compliant with the ITU-T G.652.D requirements are commercially available, for instance, from Draka Comteq (Claremont, N.C.).

Microbending is another phenomenon that induces added loss in fiber signal strength. Microbending is induced when small stresses are applied along the length of an optical fiber, perturbing the optical path through microscopically small deflections in the core.

In this regard, U.S. Pat. No. 7,272,289 (Bickham et al.), which is hereby incorporated by reference in its entirety, proposes an optical fiber having low macrobend and microbend losses. U.S. Pat. No. 7,272,289 broadly discloses an optical fiber possessing (i) a primary coating having a Young's modulus of less than 1.0 MPa and a glass transition temperature of less than −25° C. and (ii) a secondary coating having a Young's modulus of greater than 1,200 MPa.

Nonetheless, better protection against microbending is still needed to help ensure successful deployment in more FTTx applications. To this end, it is necessary to discover and implement new coating systems that better address the demands FTTx installations place on fiber and cable structures in a way that is commercially practical (i.e., cost-effective).

SUMMARY OF THE INVENTION

Accordingly, it is an object of the present invention to provide an optical fiber having an improved coating system that provides improved protection against stress-induced microbending.

It is another object to provide an improved coating system that can be readily mated with bend-insensitive optical fiber, as well as G.652-compliant fiber.

It is yet another object to provide an improved optical fiber coating system including a primary coating that possesses a low modulus to provide enhanced cushioning against lateral and axial stresses induced by external forces.

It is yet another object to provide an improved optical fiber coating system including a primary coating that possesses an exceptionally low glass transition temperature (TO that reduces temperature-induced stresses in unusually cold environments.

It is yet another object to provide an improved optical fiber coating system including a primary coating that possesses an improved curing rate.

It is yet another object to provide an improved optical fiber coating system including an ink-free secondary coating that has improved brightness and visibility.

It is yet another object to provide an improved optical fiber coating system that can be applied at commercial processing speeds (e.g., forming the primary coating at rates of at least about 20 meters per second).

It is yet another object to provide an optical fiber possessing coatings that are readily stripped.

It is yet another object to provide an optical fiber having enhanced performance characteristics for use in FTTx installations in which conventional, robust cable designs are impractical.

It is yet another object to provide an optical fiber that synergistically combines a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

It is yet another object to provide an optical fiber that can be advantageously deployed in buffer tubes and/or fiber optic cables.

It is yet another object to provide an optical fiber that requires less external protection (e.g., enclosed within thinner buffer tubes and/or cable jacketing).

It is yet another object to provide a bend-insensitive optical fiber possessing a reduced diameter (e.g., having thinner coating layers).

It is yet another object to provide an optical fiber that can be installed in a way that employs small-radius bends.

It is yet another object to provide an optical fiber that facilitates direct installation onto buildings or other structures (e.g., stapled or otherwise secured to structural surfaces).

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 21b depicts germanium dopant concentration in the exemplary optical fiber of FIG. 21a.

FIG. 21c depicts fluorine dopant concentration in the exemplary optical fiber of FIG. 21a.

FIG. 24 depicts the nominal refractive index profile of the exemplary single-mode fiber of FIG. 23.

DETAILED DESCRIPTION

Figure 1:
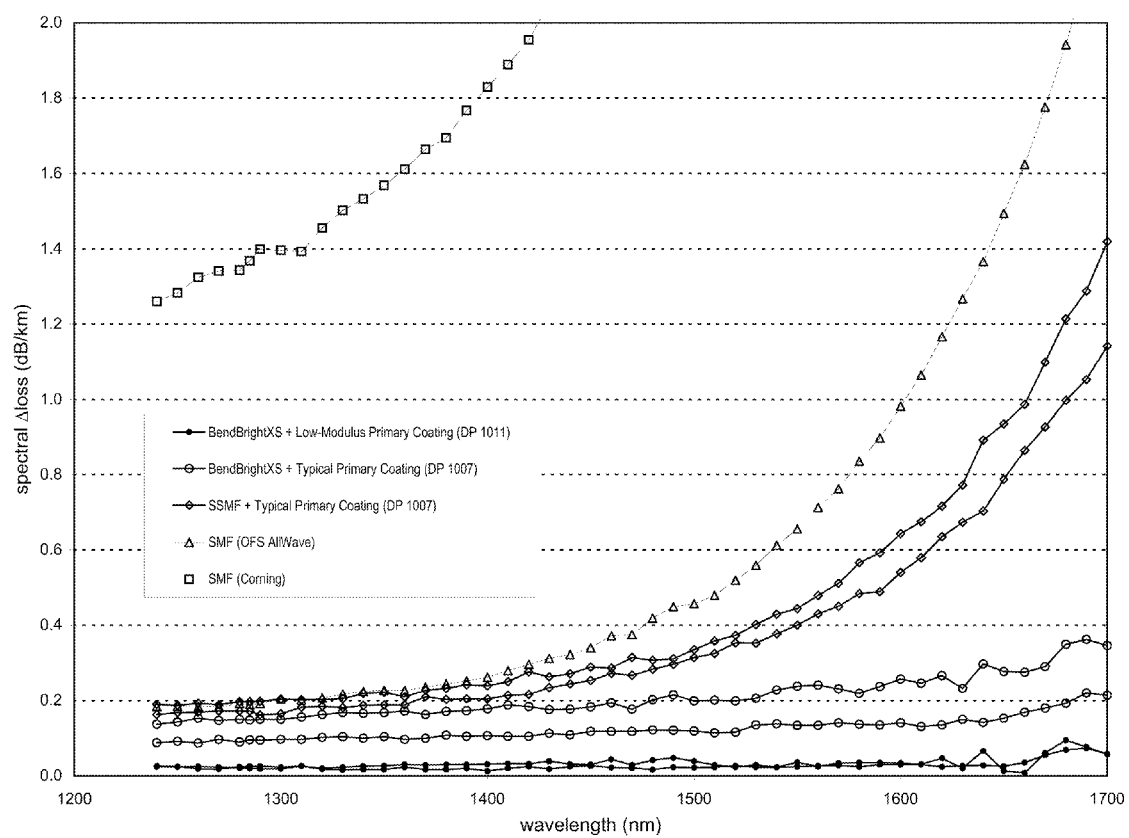
FIG. 1 depicts microbend testing results demonstrating that exceptionally low microbending losses are achieved, in accordance with the present invention, by pairing a bend-insensitive glass fiber with a low-modulus primary coating.

In one aspect, the present invention embraces optical fibers possessing an improved coating system that reduces stress-induced microbending, even in exceptionally cold environments required for FTTx deployments. The coating system according to the present invention includes a primary coating that combines low in situ modulus (e.g., less than about 0.5 MPa as measured on the fiber) and low glass transition temperature ($T_g$) (e.g., less than about −50° C.) to reduce stresses caused by external force and temperature. In addition, the coating system can be processed at high production speeds (e.g., 15-20 m/sec or more).

The present invention achieves a microbend-resistant optical fiber, particularly a single-mode optical fiber, by employing as its primary coating a UV-curable, urethane acrylate composition. In this regard, the primary coating includes between about 40 and 80 weight percent of polyether-urethane acrylate oligomer as well as photoinitiator, such as LUCIRIN TPO, which is commercially available from BASF. In addition, the primary coating includes one or more oligomers and one or more monomer diluents (e.g., isobornyl acrylate), which may be included, for instance, to reduce viscosity and thereby promote processing. A suitable composition for the primary coating according to the present invention is a UV-curable urethane acrylate product provided by DSM Desotech (Elgin, Ill.) under the trade name DeSolite® DP 1011. In this regard and as noted, U.S. Patent Application No. 60/986,737 for a Microbend-Resistant Optical Fiber (Overton), U.S. Patent Application No. 61/041,484 (Overton) for a Microbend-Resistant Optical Fiber, and U.S. Patent Application No. 61/112,595 for a Microbend-Resistant Optical Fiber (Overton) are hereby incorporated by reference in their entirety. Likewise, U.S. Patent Application Publication No. US 2009/0175583A1 and its related U.S. patent application Ser. No. 12/267,732 a Microbend-Resistant Optical Fiber (Overton) are hereby incorporated by reference in their entirety.

Suitable glass fibers for use in the present invention include glass fibers such as those disclosed in U.S. Pat. No. 4,838,643 for a Single Mode Bend Insensitive Fiber for Use in Fiber Optic Guidance Applications (Hodges et al.); U.S. Patent Application Publication No. US 2007/0127878 A1 and its related U.S. patent application Ser. No. 11/556,895 for a Single Mode Optical Fiber (de Montmorillon et al.), now U.S. Pat. No. 7,623,747; U.S. Patent Application Publication No. US 2007/0280615 A1 and its related U.S. patent application Ser. No. 11/697,994 for a Single-Mode Optical Fiber (de Montmorillon et al.), now U.S. Pat. Nos. 7,587,111; 7,356, 234 and its related U.S. patent application Ser. No. 11/743, 365 for Chromatic Dispersion Compensating Fiber (de Montmorillon et al.); U.S. Patent Application Publication No. US 2008/0152288 A1 and its related U.S. patent application Ser. No. 11/999,333 for an Optical Fiber (Flammer et al.), now U.S. Pat. No. 7,555,186; U.S. Patent Application Publication No. US 2009/0279835 A1 and its related U.S. patent application Ser. No. 12/436,423 for a Single-Mode Optical Fiber Having Reduced Bending Losses (de Montmorillon et al.), now U.S. Pat. No. 8,145,025; U.S. Patent Application Publication No. US 2009/0279836 A1 and its related U.S. patent application Ser. No. 12/436,484 for a Bend-Insensitive Single-Mode Optical Fiber (de Montmorillon et al.), now U.S. Pat. No. 7,889,960; U.S. Patent Application No. 61/101, 337 for a Single Mode Optical Fiber (de Montmorillon et al.); U.S. Patent Application No. 61/112,006 for a Bend-Insensitive Single-Mode Optical Fiber (de Montmorillon et al.); and U.S. Patent Application No. 61/112,374 for a Bend-Insensitive Single Mode Optical Fiber (de Montmorillon et al.). Each of these commonly assigned patent documents is hereby incorporated by reference in its entirety. One exemplary glass fiber, for instance, possesses a step-index core having a refractive index that is between about 0.003 and 0.006 higher than the refractive index of its adjacent silica cladding.

Exemplary single-mode glass fibers for use in the present invention are commercially available from Draka Comteq (Claremont, N.C.) under the trade name BendBright®, which is compliant with the ITU-T G.652.D requirements, and the trade name BendBright$^{XS}$®, which is compliant with the ITU-T G.657.A/B and ITU-T G.652.D requirements.

In particular and as set forth herein, it has been unexpectedly discovered that the pairing of a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses (e.g., reductions in microbend sensitivity of at least 10× (e.g., 40× to 100× or more) as compared with a single-mode fiber employing a conventional coating system). Draka Comteq's bend-resistant, single-mode glass fiber available under the trade name BendBright$^{XS}$® employs a trench-assisted design that reduces microbending losses.

FIG. 1 depicts this outstanding result by comparing the aforementioned exemplary single-mode fiber according to the present invention with various single-mode fibers employing conventional coating systems. In this regard, FIG. 1 presents spectral attenuation data by measuring initial spectral attenuation on the optical fiber on a shipping spool, thereby obtaining the peaks and valleys typical of the attenuation across the full spectrum of wavelengths between the limits shown. The optical fiber is then wound onto a sandpaper-covered, fixed-diameter drum (i.e., measurement spool) as described by the IEC fixed-diameter sandpaper drum test (i.e., IEC TR62221, Method B), and another spectral attenuation curve is obtained.

The IEC fixed-diameter sandpaper drum test (i.e., IEC TR62221, Method B) provides a microbending stress situation that affects single-mode fibers even at room temperature. The sandpaper, of course, provides a rough surface that subjects the optical fiber to thousands, if not millions, of stress points. With respect to the test data presented in FIG. 1, a 300-mm diameter fiber spool was wrapped with adhesive-backed, 40-micron grade sandpaper (i.e., approximately equivalent to 300-grit sandpaper) to create a rough surface. Then, 400-meter fiber samples were wound at about 2,940 mN (i.e., a tension of 300 gf on a 300-mm diameter cylinder), and spectral attenuation was measured at 23° C.

The curves presented in FIG. 1 represent the difference between the initial spectral curve and the curve when the fiber is on the sandpaper drum, thereby providing the added loss due to microbending stresses.

* * *

Those having ordinary skill in the art will recognize cable designs are now employing smaller diameter buffer tubes and less expensive materials in an effort to reduce costs. Consequently, when deployed in such cable designs, single-mode optical fibers are less protected and thus more susceptible to stress-induced microbending. As noted, the present invention provides an improved coating system that better protects optical fibers against stresses caused by external mechanical deformations and by temperature-induced, mechanical property changes to the coatings.

As noted, conventional solutions for protecting optical fibers involved using large-diameter buffer tubes, buffer tubes made of high-modulus materials that resist deformation and stresses upon the fiber, and stronger, thicker cable jackets to resist deformations that might pinch or otherwise squeeze the optical fibers. These solutions, however, are not only costly, but also fail to address the temperature-induced stresses caused by changes to the protective coatings. In other words, conventional primary coatings possess high modulus at temperatures below their respective glass transition temperatures.

As disclosed herein, the optical fiber according to the present invention includes a primary coating possessing lower modulus and lower glass transition temperature than possessed by conventional single-mode fiber primary coatings. Even so, the improved primary coating formulation nonetheless facilitates commercial production of the present optical fiber at excellent processing speeds (e.g., 1,000 m/min or more). In this regard, the primary coating employed in the optical fibers of the present invention possesses fast curing rates—reaching 50 percent of full cure at a UV dose of about 0.3 J/cm$^2$, 80 percent of full cure at a UV dose of about 0.5 J/cm$^2$, and 90 percent of full cure at a UV dose of about 1.0 J/cm$^2$ as measured on a standard 75-micron film at 20° C. and atmospheric pressure (i.e., 760 ton) (i.e., standard temperature and pressure—STP).

* * *

Figure 2:
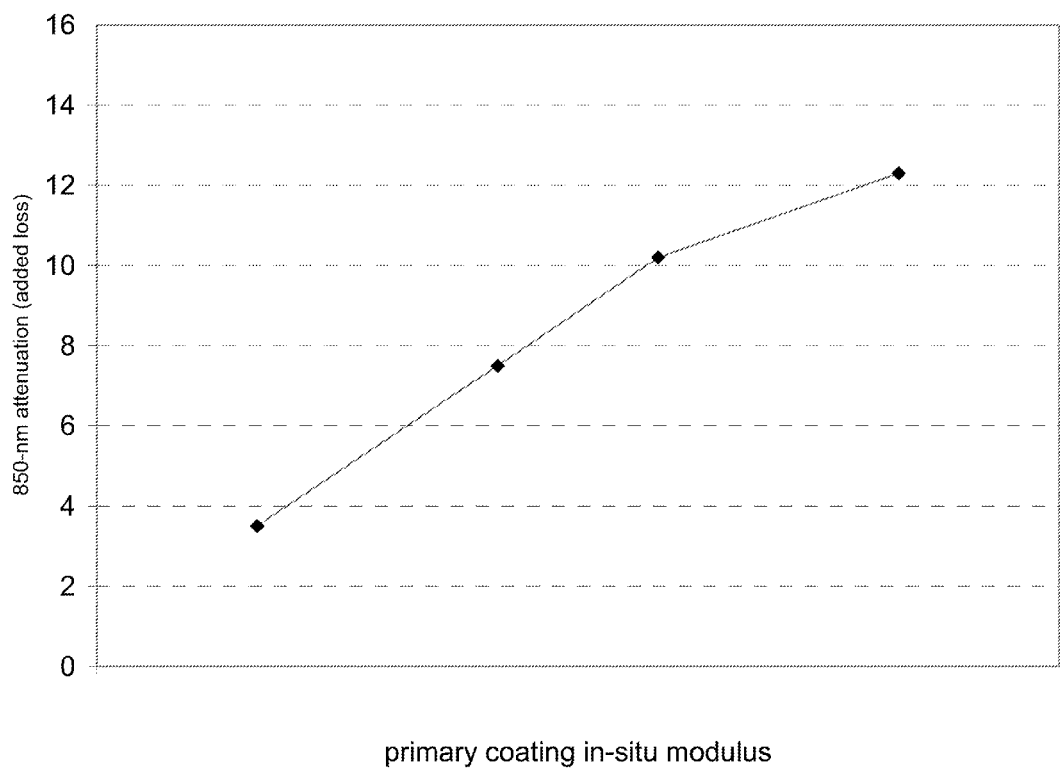
FIG. 2 schematically depicts the relationship between the in situ modulus of a primary coating and added loss for a multimode optical fiber.

FIG. 2 schematically depicts the observed relationship between the in situ modulus of a primary coating and the attenuation (added loss) of the optical fiber, here a 50-micron graded-index multimode fiber. The primary coating modulus is measured as cured on the glass fiber and the added loss is measured using a fixed-diameter sandpaper drum procedure in accordance with the IEC TR62221 microbending-sensitivity technical report and standard test procedures (e.g., IEC TR62221, Method B, Ed. 1), which are hereby incorporated by reference in their entirety.

As will be appreciated by those having ordinary skill in the art, prior, commercially available single-mode fibers typically include a Young's modulus of 100-150 psi measured in situ (i.e., on the fiber). The optical fiber according to the present invention possesses a primary coating having reduced modulus as compared with such commercially available primary coatings. Employing a lower modulus primary coating provides better cushioning around the glass fiber.

Although lower modulus of the in situ primary coating can be achieved by selectively undercuring, the present invention achieves in situ primary coating having lower modulus even approaching full cure (i.e., near full cure). In this regard, the modulus of the in situ primary coating according to the present invention is less than about 0.65 MPa (e.g., less than about 95 psi), typically less than about 0.5 MPa, and more typically less than 0.4 MPa (e.g., between about 0.3 MPa and 0.4 MPa or between about 40 psi and 60 psi). It has been determined that an in situ primary coating having a modulus of less than about 0.5 MPa significantly reduces bend sensitivity of the glass fiber. On the other hand, the modulus of the in situ primary coating according to the present invention is typically greater than about 0.2 MPa (e.g., 0.25 MPa or more).

To achieve its reduced modulus as compared with conventional optical fiber coatings, the present primary coating possesses a lower crosslink density, specifically a reduced concentration of the reactive acrylate groups. Those having ordinary skill in the art will appreciate that acrylate groups crosslink via free radical polymerization during photoinitiation (e.g., UV-induced curing during drawing operations). The reaction kinetics dictate reduced cure rates during processing. This is commercially undesirable, of course, and so the present invention implements processing modifications to provide satisfactory cure rate for the low-modulus primary coating.

There are at least two components of the curing process that retard the rate of polymerization of the primary coating. First, the combination of (i) high curing temperatures induced by exposure to a high-intensity, UV environment and (ii) the exothermic polymerization reaction slows the observed curing rate of the primary coating. Second, close proximity of stacked UV lamps, in effect, creates rapidly superposed, repeated photoinitiation periods. The reaction rate of acrylate groups under this configuration is likewise retarded—a somewhat counterintuitive result. With respect to the latter, disposing (i.e., positioning) UV lamps to increase the period between consecutive UV exposures significantly increases the degree of coating cure as compared with other conventional processes employing the same draw speed and UV dose. In this way, it is possible to process the reduced-modulus, primary coating according to the present invention in a way that achieves near-complete curing at fast fiber draw speeds, which are required for a commercially viable process. An exemplary method and apparatus for curing a coated fiber is disclosed in commonly assigned U.S. Pat. No. 7,322,122, which is hereby incorporated by reference in its entirety.

The temperature dependence of the modulus is an important consideration to ensure that the primary coating provides enhanced microbending protection in FTTx applications. A primary coating having low modulus only at room temperature would be inadequate because deployment in the field will expose the optical fiber to microbend-inducing stresses at extreme environmental temperatures (e.g., −40° C. and below). Therefore, a suitable primary coating according to the present invention possesses an exceptionally low glass transition temperature so that the primary coating remains soft and protective in extremely cold environmental conditions.

* * *

EXAMPLE 1

Comparison of Mechanical Properties

Figure 3:
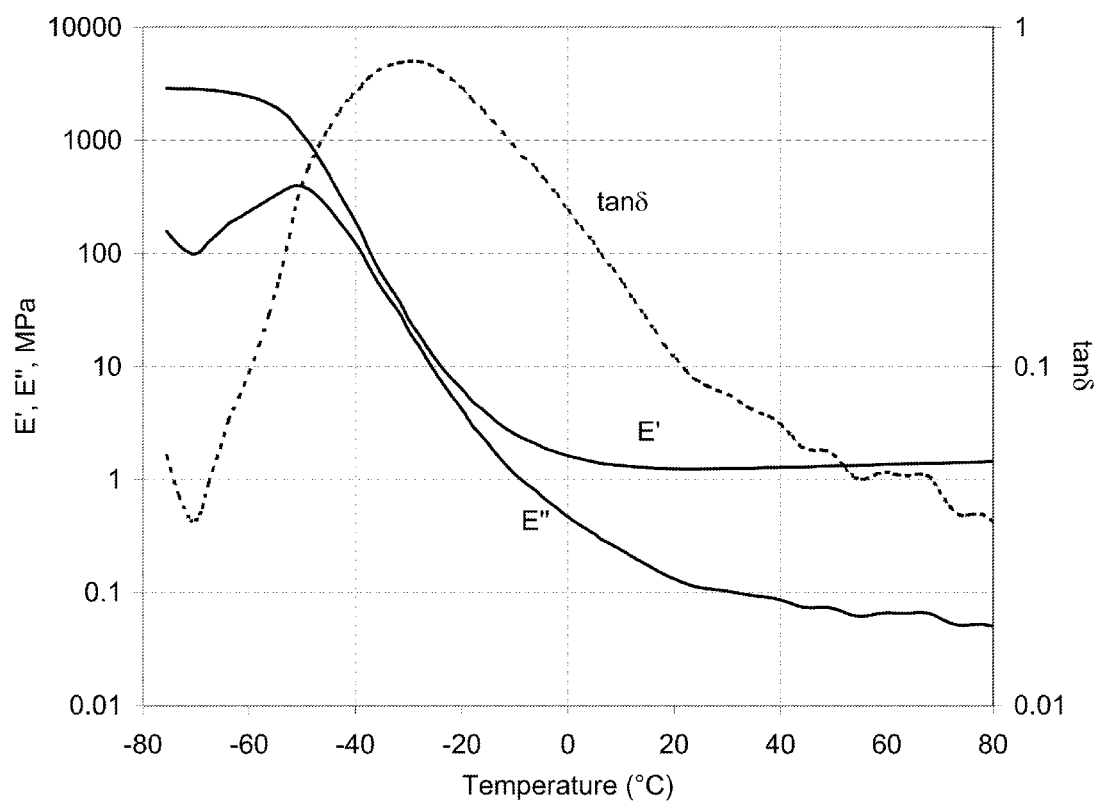
FIG. 3 depicts the dynamic mechanical properties of a typical commercial primary coating (i.e., a conventional primary coating).
Figure 4:
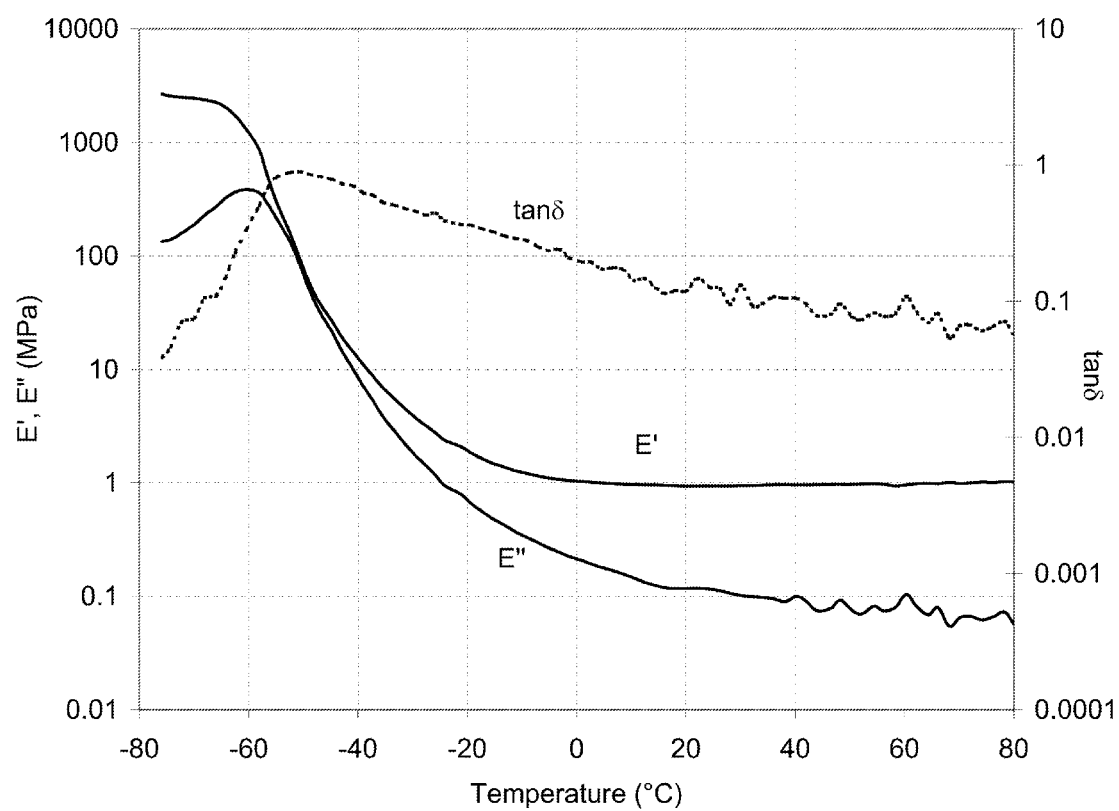
FIG. 4 depicts the dynamic mechanical properties of an exemplary primary coating used in producing optical fibers according to the present invention.

FIGS. 3 and 4, respectively, depict dynamic mechanical properties of a typical commercial primary coating (i.e., the conventional primary coating) and an exemplary primary coating used in making the optical fibers according to the present invention. The conventional primary coating was a UV-curable urethane acrylate provided by DSM Desotech (Elgin, Illinois) under the trade name DeSolite® DP 1007. The exemplary primary coating according to the present invention (i.e., employed to form optical fibers of the present invention) was a UV-curable urethane acrylate provided by DSM Desotech (Elgin, Illinois) under the trade name DeSolite® DP 1011.

The data for the conventional primary coating were obtained on a Dynamic Mechanical Analyzer (DMA) at an oscillatory stress rate of 1 Hz. In doing so, the strain was maintained within the linear region of stress-strain behavior. The sample of conventional primary coating was cured on polyester to form a standard 75-micron film. A UV dose of 1 J/cm$^2$ was applied using a mercury-halide bulb operating at a 300 W/in output. This UV exposure was sufficient to ensure that the coating was on the plateau of the dose-modulus curve.

Referring to FIG. 3, the data show the equilibrium modulus to be approximately 1.5 MPa as measured on a 75-micron film. On a glass fiber (i.e., in situ), this conventional primary coating typically cures well to a modulus of about 0.8 MPa, a level indicative of many single-mode fiber primary coatings in the industry. Those having ordinary skill in the art will appreciate that modulus measurements of softer primary coatings tend to be lower on a glass fiber (i.e., in situ) as compared with on a 75-micron film.

The glass transition temperature of the conventional primary coating is estimated by the peak in tanδ to be approximately −30° C. Thus, the conventional primary coating (and similar formulations) will behave like a glassy polymer at extremely low temperatures (e.g., less than −40° C., particularly less than −50° C.). (Although stress induced by strain is time dependent at low temperatures, estimated glass transition temperature is a useful comparative property.)

A sample of the exemplary primary coating according to the present invention was likewise cured on polyester to form a comparable 75-micron film. As before, a UV dose of 1 J/cm$^2$ was applied to the primary coating using a mercury-halide bulb operating at a 300 W/in output. As noted, FIG. 4 depicts dynamic mechanical properties of the exemplary primary coating according to the present invention.

The exemplary primary coating according to the present invention exhibited an equilibrium modulus at just under 1 MPa in the cured film. The in situ modulus (i.e., measured on the glass fiber), was between about 0.3 MPa and 0.4 MPa. This is significantly lower than the respective modulus measurements for the conventional primary coating.

The glass transition temperature of the exemplary primary coating according to the present invention is estimated by the peak in tanδ at less than about −50° C. (e.g., about −60° C.). This is at least about 20° C. below the glass transition temperature of the comparative, conventional primary coating. Accordingly, primary coatings according to the present invention provide much more rapid stress relaxation during temperature excursions.

* * *

As set forth in Examples 2 and 3 (below), two different methods were used to evaluate the respective microbend sensitivities of glass fibers coated with (i) a typical commercial primary coating (i.e., the conventional primary coating) and (ii) an exemplary primary coating according to the present invention. As with Example 1 (above), the conventional primary coating was a UV-curable urethane acrylate provided by DSM Desotech (Elgin, Ill.) under the trade name DeSolite® DP 1007, and the exemplary primary coating according to the present invention (i.e., employed to form optical fibers of the present invention) was a UV-curable urethane acrylate provided by DSM Desotech (Elgin, Ill.) under the trade name DeSolite® DP 1011.

Each test method provided aggravated lateral stress conditions. Moreover, after measuring the effect on attenuation at room temperature, the test structures were temperature cycled to determine the additional loss induced by such temperature excursions.

EXAMPLE 2

Comparison of Microbending Sensitivity

The first test method employed was a basket-weave, temperature cycling procedure known by those having ordinary skill in the art. According to this test procedure, optical fiber was wound at about 490 mN (i.e., a tension of 50 gf on a 300-mm diameter quartz cylinder with a 9-mm "lay"). Fifty layers were wound on the quartz drum to create numerous fiber-to-fiber crossovers. The testing procedure for Example 2 was an adaptation of IEC TR62221, Method D, which, as noted, is incorporated by reference in its entirety.

Those having ordinary skill in the art will appreciate that, at room temperature, such fiber crossovers can sometimes cause added loss (i.e., if the optical fiber is very sensitive) but that typically little or no added loss is observed. Consequently, the drum (with wound fiber) was temperature cycled twice from about room temperature through (i) −40° C., (ii) −60° C., (iii) +70° C., and (iv) +23° C. (i.e., near room temperature) while making loss measurements at 1550 nanometers. In both temperature cycles, fiber attenuation was measured after one hour at each test temperature.

Figure 5:
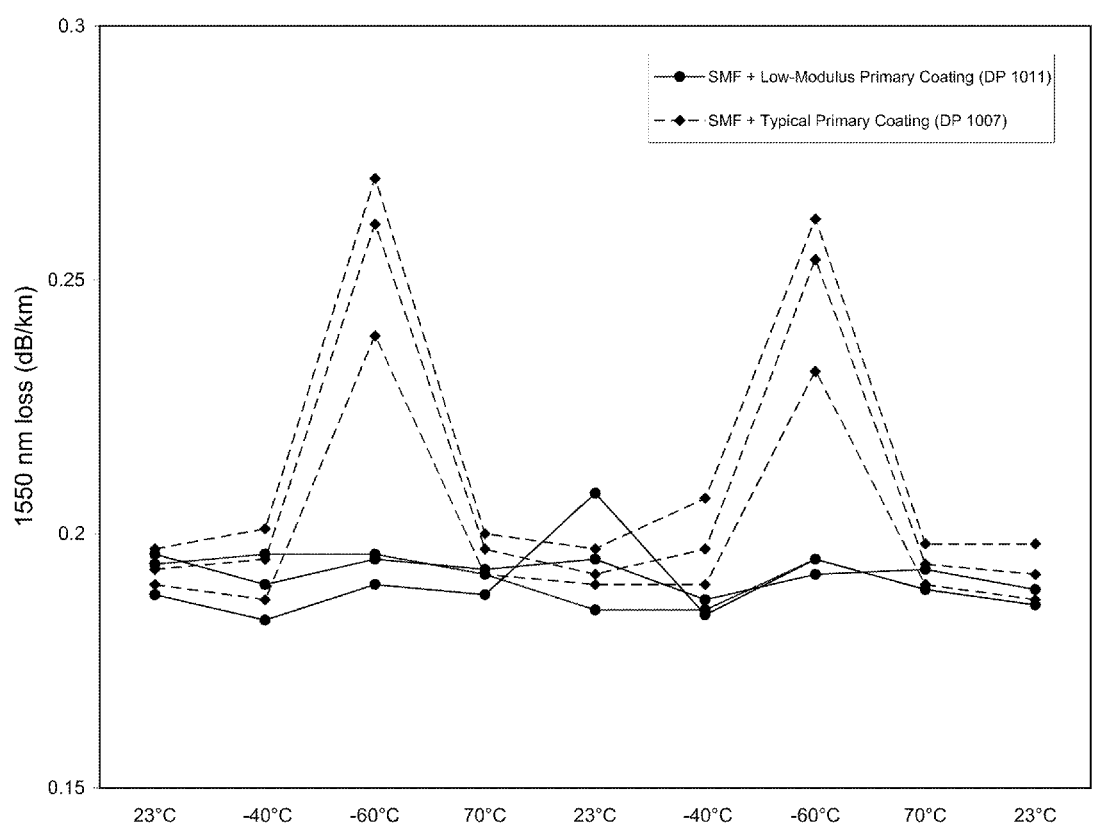
FIG. 5 depicts microbend testing results for optical fibers that include a conventional primary coating and for optical fibers that include an exemplary primary coating according to the present invention.

FIG. 5 depicts exemplary results for single-mode glass fibers coated with, respectively, a conventional primary coating (i.e., DeSolite® DP 1007) and an exemplary primary coating according to the present invention (i.e., DeSolite® DP 1011). The respective fiber specimens were chosen to match the coating geometry, mode field diameter, and cutoff wavelength. Accordingly, the respective optical fibers employed different formulations of colored secondary coatings.

In summary, the conventional primary coating and the exemplary primary coating according to the present invention each provided good protection against microbending stresses at 23° C. Moreover, at −40° C., the optical fiber having the conventional primary coating demonstrated only a small added loss. (It would appear that at −40° C., the conventional primary coating provided adequate protection against microbending by stress relaxing in a reasonable timeframe, even though this was near its glass transition temperature.) By way of comparison, the optical fiber according to the present invention demonstrated essentially no added loss at −40° C. (i.e., better performance).

At −60° C., however, the optical fiber having the conventional primary coating demonstrated significant added loss. (This temperature extreme was well below the glass transition temperature of the conventional primary coating.) By way of comparison, the optical fiber according to the present invention demonstrated essentially no added loss at −60° C., which is close to the glass transition temperature of this embodiment of the primary coating according to the present invention.

EXAMPLE 3

Comparison of Microbending Sensitivity

The second test method employed more aggressive environments (i.e., conditions) in order to evaluate the respective microbend sensitivities of (i) an optical fiber possessing a typical commercial primary coating (i.e., the conventional primary coating) and (ii) an optical fiber possessing an exemplary primary coating according to the present invention.

In particular, the second method modified the IEC fixed-diameter sandpaper drum test (i.e., IEC TR62221, Method B), which, as noted, is incorporated by reference in its entirety, to provide a microbending stress situation sufficiently harsh to affect single-mode fibers even at room temperature (i.e., a rougher drum surface than that used to measure the data depicted in FIG. 1). To do this, a 300-mm diameter quartz drum was wrapped with adhesive-backed, 220-grit sandpaper (i.e., approximately equivalent to 66-micron-grade sandpaper) to create a rough surface.

In an initial test condition, each of the respective fiber samples was wound in a single layer at about 980 mN (i.e., a tension of 100 gf on a 300-mm diameter quartz cylinder). In a modified test condition, three (3) each of the respective fiber samples was wound in a single layer at about 1,470 mN (i.e., a tension of 150 gf on a 300-mm diameter quartz cylinder). Thus, as compared with the first test condition, the second test condition increased the winding tension by 50 percent.

Using matched fiber samples (as with the basket weave/ temperature cycling test of Example 2) fiber attenuation was measured after winding at room temperature (i.e., 23° C.) for each test condition. Then, the drum (with 400 meters of wound fiber) was temperature cycled from about room temperature through (i) −40° C., (ii) −60° C., and (iii) +23° C. (i.e., near room temperature) while making loss measurements at 1550 nanometers using an optical time domain reflectometer (OTDR).

The several samples of each kind of optical fiber were initially measured at 23° C. on the original spools (i.e., before winding on the roughened drum surface to establish baseline spectral attenuation) then were subjected to the foregoing rigorous testing conditions for one hour at each temperature. Fiber attenuation was measured after one hour (as in Example 2) at each test temperature.

Figure 6:
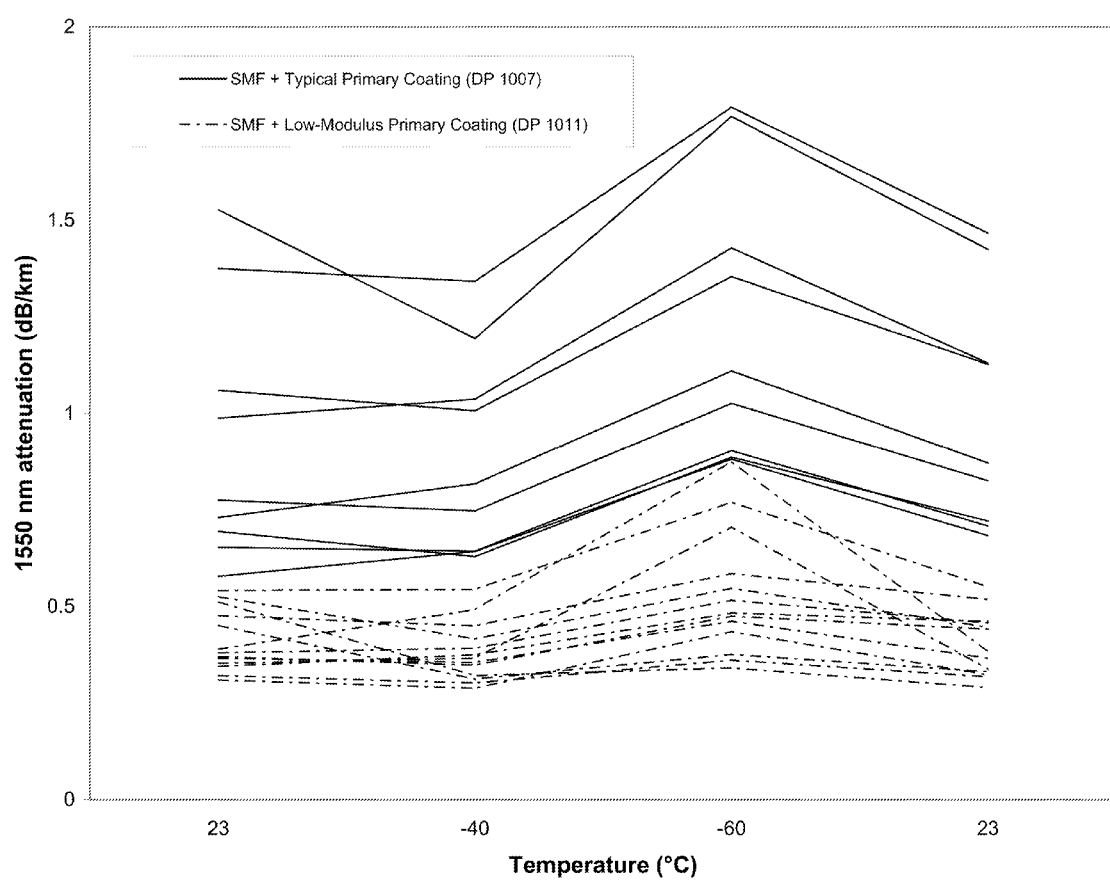
FIG. 6 depicts microbend testing results (under rigorous temperature-cycle testing conditions) for optical fibers that include a conventional primary coating and for optical fibers that include an exemplary primary coating according to the present invention.
Figure 7:
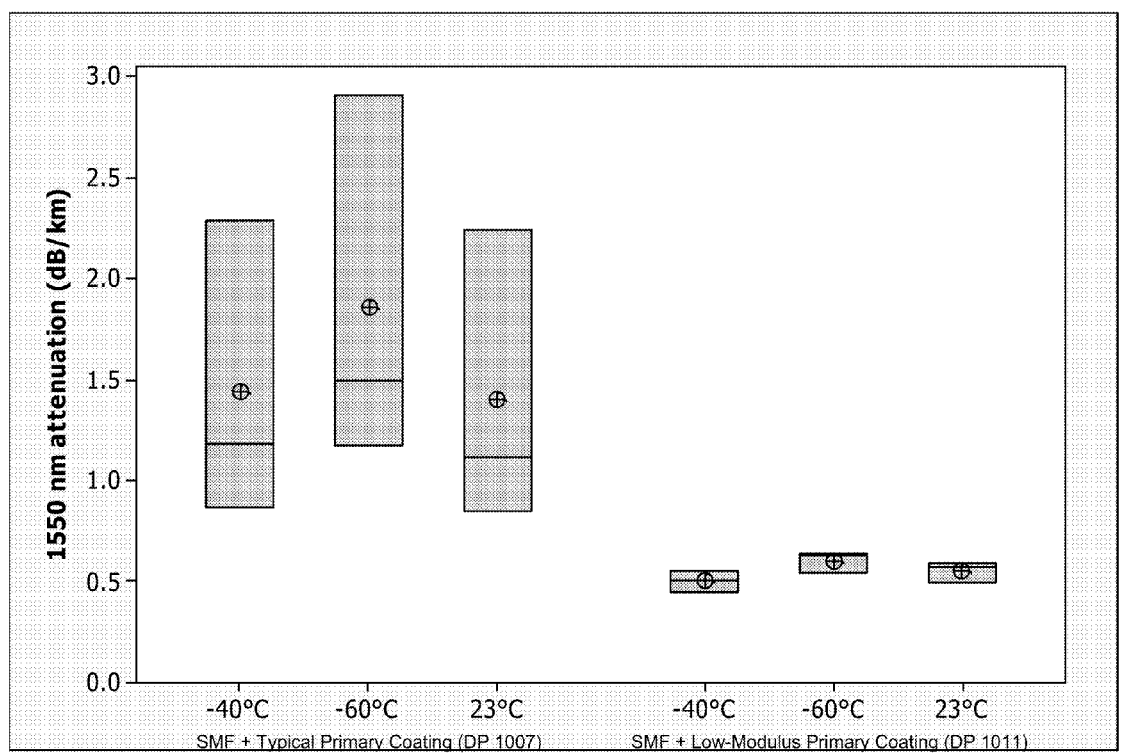
FIG. 7 depicts microbend testing results (under modified temperature-cycle testing conditions) for optical fibers that include a conventional primary coating and for optical fibers that include an exemplary primary coating according to the present invention.

FIG. 6, a line chart, and FIG. 7, a box plot, depict exemplary results under these more rigorous testing conditions for single-mode optical fibers that include a conventional primary coating (i.e., DeSolite® DP 1007 UV-curable urethane acrylate) and for single-mode optical fibers that include an exemplary primary coating according to the present invention (i.e., DeSolite® DP 1011 UV-curable urethane acrylate).

FIG. 6, for instance, shows that, as compared with conventional optical fibers, exemplary optical fibers according to the present invention possess reduced microbend sensitivity (i.e., a reduction of about 40-60 percent).

Likewise, FIG. 7 shows that, as compared with conventional optical fibers, exemplary optical fibers according to the present invention possess substantially reduced microbend sensitivity at a higher winding tension (i.e., 150 gf on a 300-mm diameter quartz cylinder). FIG. 7 thus illustrates that the exemplary primary coating according to the present invention (i.e., DeSolite® DP 1011 UV-curable urethane acrylate) promotes both significantly reduced and significantly more uniform microbending performance.

\* \* \*

In accordance with the foregoing, it has been found that, as compared with a conventional coating system, the present coating system provides significant microbending improvement when used in combination with a conventional single-mode glass fiber.

It has been further found that pairing a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses. Additional testing was performed, therefore, to demonstrate the dramatic and unexpected reductions in microbend sensitivity provided in accordance with the present invention.

EXAMPLE 4

Comparison of Microbending Sensitivity

The respective microbend sensitivities were measured for exemplary optical fibers, including (i) a conventional single-mode glass fiber with a conventional commercial coating, (ii) a bend-insensitive glass fiber with a conventional commercial coating, and (iii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

Figure 8:
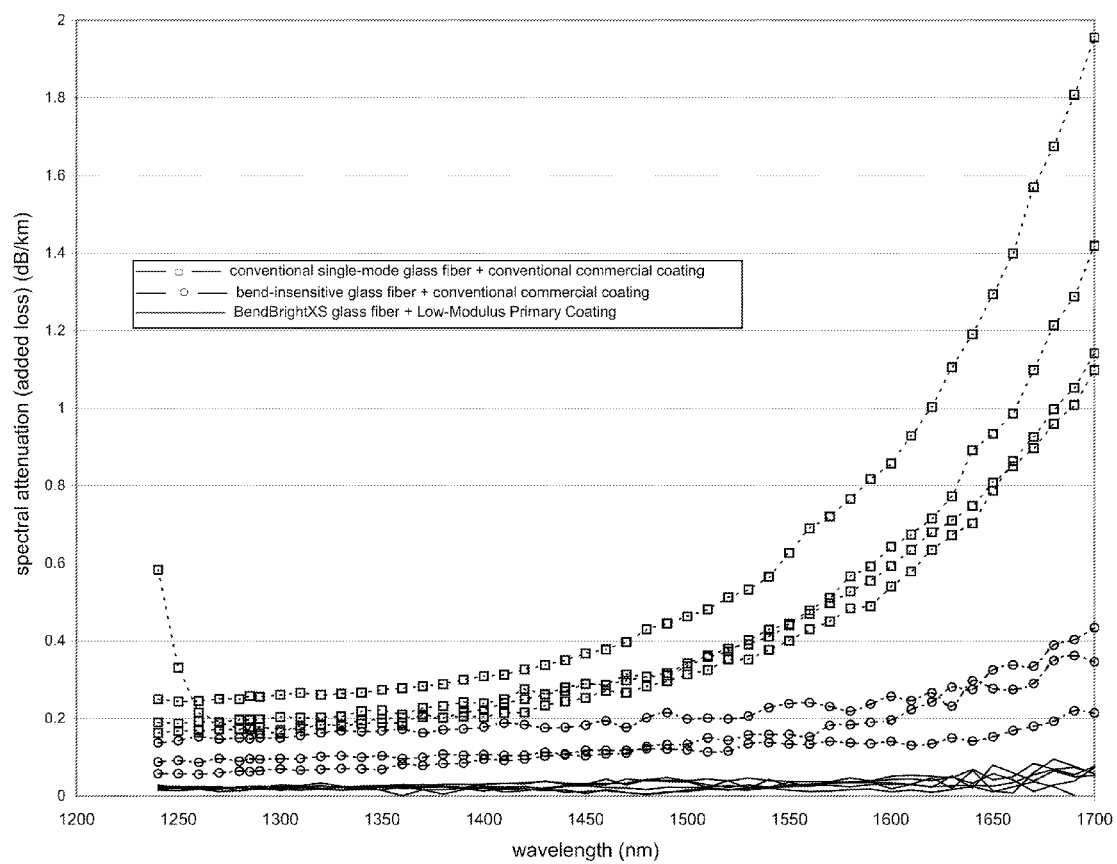
FIG. 8 depicts microbend testing results demonstrating that exceptionally low microbending losses are achieved, in accordance with the present invention, by pairing a bend-insensitive glass fiber with a low-modulus primary coating.

FIG. 8 demonstrates that the optical fiber according to the present invention, namely including a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011), provides exceptionally low attenuation losses as compared with other optical fibers. Moreover, this bend-resistant optical fiber exhibits small wavelength dependence within the transmission window between 1400 nanometers and 1700 nanometers, and is essentially unaffected by the microbend-inducing test conditions across the test spectrum.

FIG. 8 presents exemplary spectral attenuation data obtained adhering to IEC TR62221, Method B (fixed-diameter drum). In accordance with IEC TR62221, Method B, initial spectral attenuation was measured on a 440-meter sample of optical fiber wound on a shipping spool (i.e., obtaining the peaks and valleys typical of the attenuation across the full spectrum of wavelengths between the limits shown). The optical fiber was then wound at about 3 N onto a 300-mm diameter measurement spool wrapped with adhesive-backed, 40-micron grade sandpaper (i.e., approximately equivalent to 300-grit sandpaper), and another spectral attenuation curve was obtained.

Like the curves presented in FIG. 1, the curves depicted in FIG. 8 represent, at 23° C., the difference between the initial spectral curve and the curve when the fiber is on the sandpaper drum of fixed diameter, thereby providing the added loss due to microbending stresses (i.e., delta-attenuation across the spectral range).

EXAMPLE 5

Comparison of Microbending Sensitivity

The respective microbend sensitivities were measured under rigorous test conditions for exemplary optical fibers, including (i) a conventional single-mode glass fiber with a conventional commercial coating and (ii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

Figure 9:
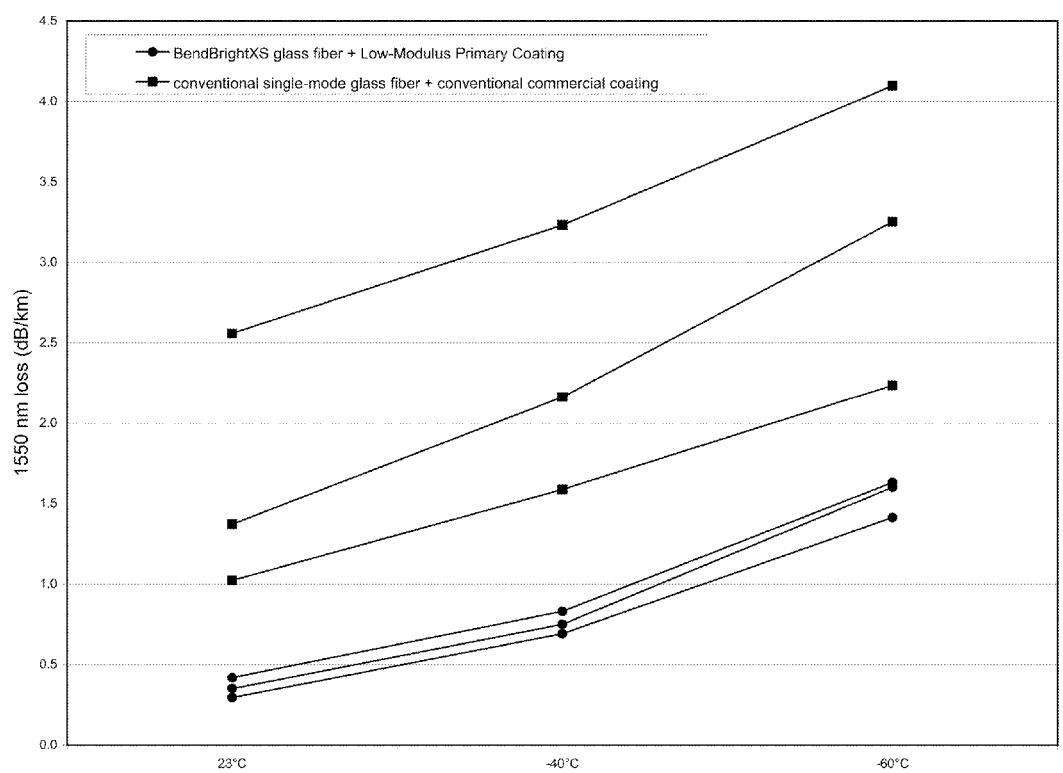
FIG. 9 depicts microbend testing results (under rigorous temperature-cycle testing conditions) for conventional optical fibers and for optical fibers that, in accordance with the present invention, combine a bend-insensitive glass fiber with a low-modulus primary coating.

FIG. 9 demonstrates that, even under extremely harsh conditions, the optical fiber according to the present invention, namely including a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011), provides surprisingly low attenuation losses as compared with other optical fibers.

The testing procedure for Example 5 was an adaptation of IEC TR62221, Method B, which, as noted, is incorporated by reference in its entirety. For this modified IEC fixed-diameter sandpaper drum test, a 300-mm diameter quartz drum was wrapped with adhesive-backed, 180-grit sandpaper (i.e., approximately equivalent to 78-micron-grade sandpaper) to create an even rougher surface than that described in Example 3 (above). Then, 440-meter fiber samples were wound in a single layer at about 1,470 mN (i.e., a controlled back tension of 150 gf on the 300-mm diameter quartz cylinder using a Delachaux optical fiber winding apparatus), and spectral attenuation was measured.

FIG. 9 presents exemplary temperature-cycle data for three specimens of standard single-mode fiber (i.e., a conventional single-mode glass fiber with a conventional commercial coating) and three specimens of optical fiber according to the present invention (i.e., a bend-insensitive glass fiber with improved coating according to the present invention). As noted, 440 meters of optical fiber is wound onto the aforementioned sandpaper-covered, fixed-diameter drum. One hour after winding, fiber attenuation was measured at room temperature (i.e., 23° C.) using an optical time domain reflectometer (OTDR). Then, the drum (with 440 meters of wound fiber) was temperature cycled from about room temperature through (i) −40° C. and (ii) −60° C. in a temperature-controlled chamber. Fiber attenuation at 1550 nanometers was measured by an OTDR after one hour of equilibration at both −40° C. and −60° C.

Microbending sensitivity ($S_m$) may be described as $\alpha R/T$, wherein α is the attenuation increase on the drum (dB/km), R is the radius of the fixed drum (mm), and T is the winding tension applied to the fiber (N). See e.g., IEC TR62221 Technical Report (Microbending Sensitivity). In addition to the parameters α, R, and T, however, the microbending-sensitivity metric obtained from the fixed-diameter sandpaper drum test is dependent on the coarseness of the sandpaper employed on the measurement drum.

Table 1 (below) presents the microbending-sensitivity metric obtained from the attenuation data (at a wavelength of 1550 nanometers) depicted in FIG. 9 (i.e., employing 180-grit sandpaper). Table 1 shows that, as compared with a conventional standard single-mode fiber, the optical fiber according to the present invention provides microbending sensitivity that is about 2×-10× lower at 23° C. and about 2×-5× lower at −40° C.:

TABLE 1

(Microbend Sensitivity)

| Optical Fiber (Coating Color) | 23° C. (dB/km)/(N/mm) | −40° C. (dB/km)/(N/mm) | −60° C. (dB/km)/(N/mm) |
|---|---|---|---|
| Conventional SMF (blue) | 139.9 | 220.6 | 331.8 |
| Conventional SMF (red) | 261.0 | 329.7 | 417.9 |
| Conventional SMF (aqua) | 104.3 | 161.9 | 228.0 |
| BendBright$^{XS}$® w/ ColorLock$^{XS}$ (slate) | 35.8 | 76.5 | 163.4 |
| BendBright$^{XS}$® w/ ColorLock$^{XS}$ (red) | 30.1 | 70.6 | 144.2 |
| BendBright$^{XS}$® w/ ColorLock$^{XS}$ (aqua) | 42.7 | 84.7 | 166.4 |

EXAMPLE 6

Comparison of Microbending Sensitivity

The respective microbend sensitivities were further measured for exemplary optical fibers, including (i) a conventional single-mode glass fiber with a conventional commercial coating and (ii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

The testing procedure for Example 6 was an adaptation of IEC TR62221, Method B, which, as noted, is incorporated by reference in its entirety. For this modified IEC fixed-diameter sandpaper drum test, a 300-mm diameter quartz drum was wrapped with adhesive-backed, 220-grit sandpaper (i.e., approximately equivalent to 66-micron-grade sandpaper) to create a rough surface like that described in Example 3. Each of the fiber samples was wound in a single layer at about 1,470 mN (i.e., a tension of 150 gf on a 300-mm diameter quartz cylinder). As compared with the test conditions of Example 5, the test conditions of Example 6 employed finer grade sandpaper (i.e., 220-grit rather than 180-grit).

As in Example 3, using matched fiber samples, fiber attenuation was measured after winding at room temperature (i.e., 23° C.). Then, the drum (with about 400 meters of wound fiber) was temperature cycled from about room temperature through (i) −40° C., (ii) −60° C., and (iii) +23° C. (i.e., near room temperature) while making loss measurements at 1550 nanometers using an optical time domain reflectometer (OTDR).

Three (3) samples of each kind of optical fiber were initially measured at 23° C. on the original spools (i.e., before winding on the roughened drum surface to establish baseline spectral attenuation) and then were subjected to the foregoing rigorous testing conditions for one hour at each temperature. Fiber attenuation was measured after one hour at each temperature.

Figure 10:
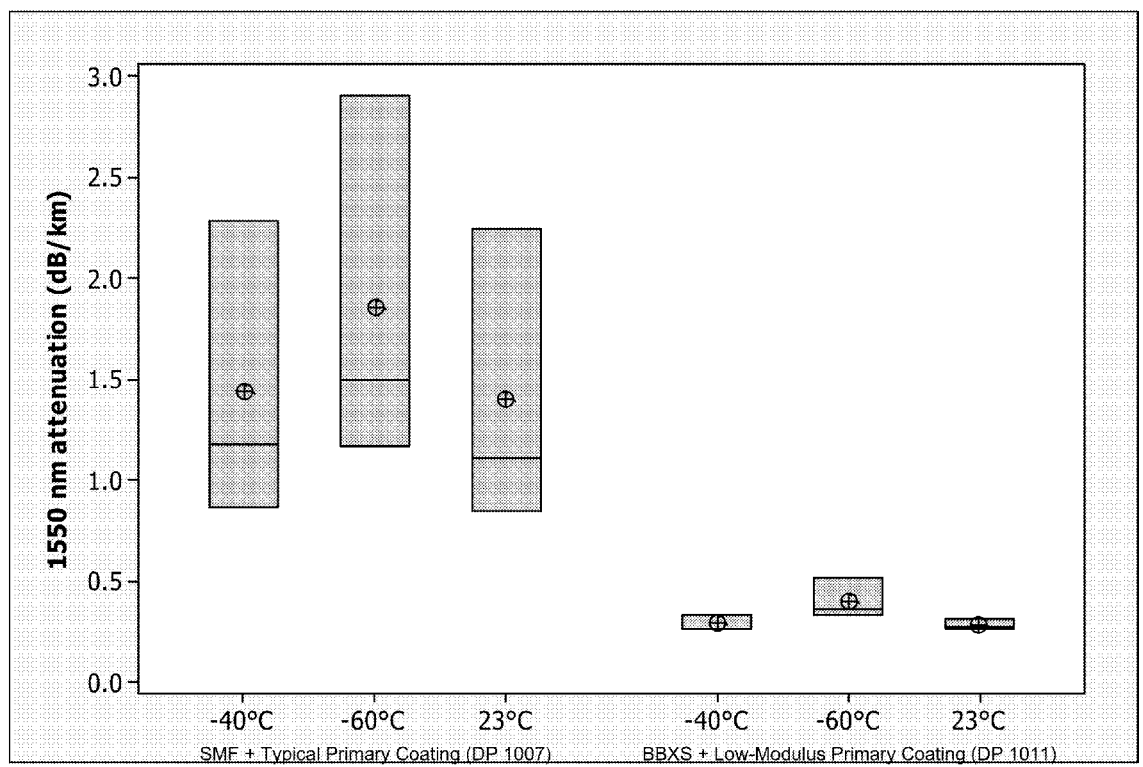
FIG. 10 depicts microbend testing results (under modified temperature-cycle testing conditions) for conventional optical fibers and for optical fibers that, in accordance with the present invention, combine a bend-insensitive glass fiber with a low-modulus primary coating.

FIG. 10 depicts exemplary results for single-mode optical fibers that include a conventional primary coating (i.e., DeSolite® DP 1007 UV-curable urethane acrylate) and for bend-insensitive glass fibers (e.g., Draka Comteq's single-mode glass fibers available under the trade name BendBright$^{XS}$®) that include a primary coating having very low modulus (i.e., DSM Desotech's UV-curable urethane acrylate product provided under the trade name DeSolite® DP 1011).

FIG. 10 demonstrates that the optical fiber according to the present invention, namely Draka Comteq's single-mode glass fibers available under the trade name BendBright$^{XS}$® with a primary coating having very low modulus (e.g., DSM Desotech's UV-curable urethane acrylate product provided under the trade name DeSolite® DP 1011), provides exceptionally low attenuation losses as compared with standard single-mode optical fibers (SSMF).

Figure 11:
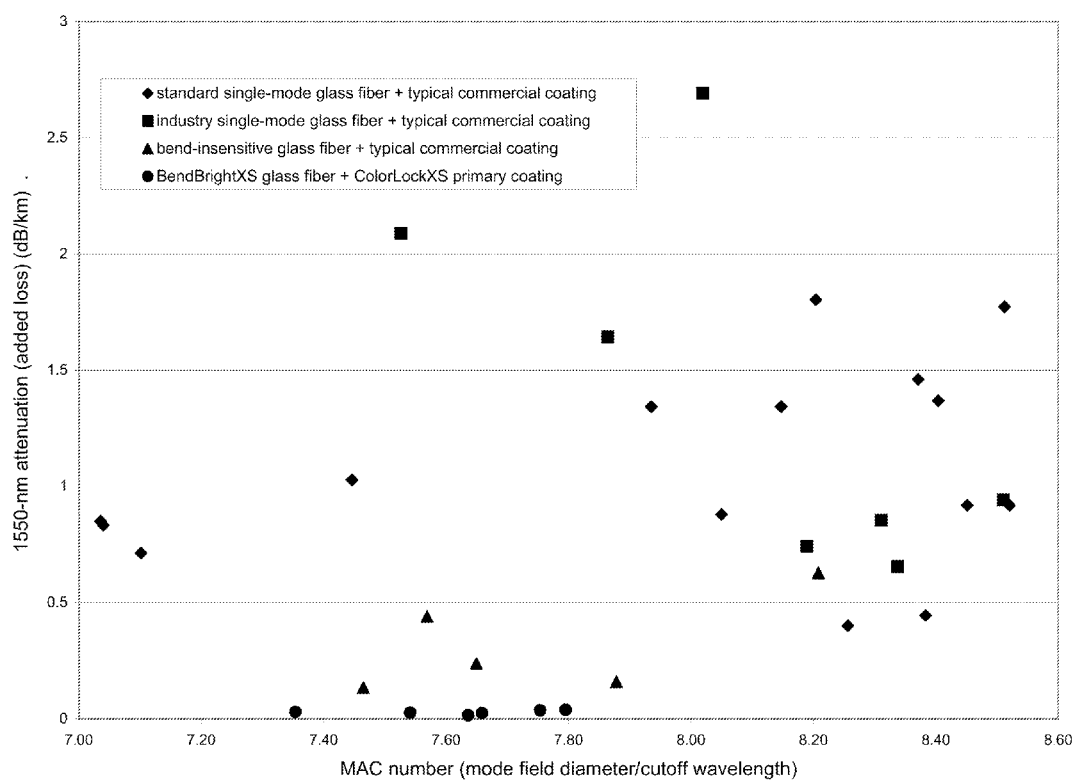
FIG. 11 depicts attenuation (added loss) as a function of MAC number (i.e., mode field diameter divided by cutoff wavelength) for various exemplary optical fibers.
Figure 12:
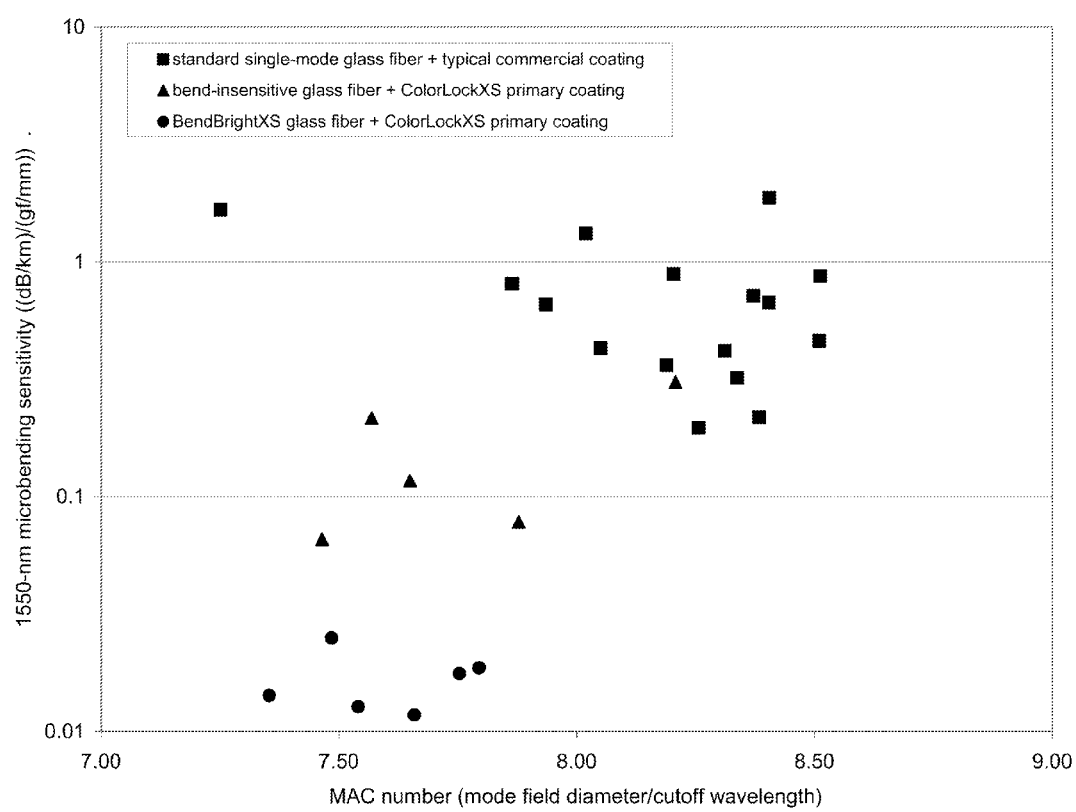
FIG. 12 depicts, on a logarithmic scale, microbend sensitivity as a function of MAC number (i.e., mode field diameter divided by cutoff wavelength) for various exemplary optical fibers.

In addition, FIGS. 11 and 12 depict attenuation and microbend sensitivity, respectively, at a wavelength of 1550 nanometers as a function of MAC number (i.e., mode field diameter divided by cutoff wavelength) for various exemplary optical fibers in accordance with the standard IEC fixed-diameter sandpaper drum test (i.e., IEC TR62221, Method B). The respective attenuation data depicted in FIG. 11 (added loss) and FIG. 12 (microbend sensitivity) were obtained at 23° C. under the test conditions previously described with respect to FIG. 1 (i.e., 400-meter fiber samples were wound at about 2,940 mN—a tension of 300 gf—on a 300-mm diameter fiber spool wrapped with adhesive-backed, 40-micron grade sandpaper).

FIG. 11 shows that Draka Comteq's bend-resistant, single-mode glass fiber available under the trade name BendBright$^{XS}$® in combination with Draka Comteq's ColorLock$^{XS}$ brand coating system provides outstanding performance with respect to added loss.

FIG. 12 shows that Draka Comteq's bend-resistant, single-mode glass fiber available under the trade name BendBright$^{XS}$® in combination with Draka Comteq's ColorLock$^{XS}$ brand coating system provides superior microbend sensitivity (i.e., microbend sensitivity of 0.01 to 0.03 (dB/km)/(gf/mm))

\* \* \*

The optical fibers according to the present invention typically further include a tough secondary coating to protect the primary coating and glass fiber from damage during handling and installation. For example, the secondary coating might have a modulus of between about 800 and 1,000 MPa (e.g., about 900 MPa) as measured on a standard 75-micron film. As disclosed herein, this secondary coating may be inked as a color code or, preferably, may be color-inclusive to provide identification without the need for a separate inking process.

In one embodiment according to the present invention, the secondary coating, which surrounds the primary coating to thereby protect the fiber structure, features an inclusive coloring system (i.e., not requiring an extra layer of ink to be added for color coding). The colors, which conform to Munsell standards for optical fiber color-coding, are enhanced for brightness and visibility under dim lighting (e.g., in deep shade or in confined spaces, such as manholes) and are easily distinguished against both light and dark backgrounds.

Furthermore, the secondary coating features a surface that provides an excellent interface with ribbon matrix material so that the matrix separates easily from the colored fiber in a way that does not sacrifice robustness. The mechanical properties of the colored secondary coating are balanced with those of the primary coating so that, in heat stripping, the coating/matrix composite separates cleanly from the glass fibers.

\* \* \*

Employing Draka Comteq's bend-resistant, single-mode glass fiber available under the trade name BendBright$^{XS}$® (or the trade name BendBright-Elite™) with the present dual-coating system, which includes a low-modulus primary coating, has been found to reduce microbending sensitivity by between about one to two orders of magnitude relative to standard single-mode fiber (SSMF) at the key transmission frequencies of 1550 nanometers and 1625 nanometers. As noted, such optical fiber not only provides outstanding resistance to microbending and macrobending, but also complies with the ITU-T G.657.A/B and ITU-T G.652.D requirements.

In particular, Draka Comteq's bend-resistant, single-mode glass fiber available under the trade name BendBright$^{XS}$® (e g., enhanced with Draka Comteq's ColorLock$^{XS}$ brand coating system) provides resistance to macrobending required for sustained bends having a radius as low as five (5) millimeters with an estimated failure probability of less than two (2) breaks per million full circle bends (i.e.,)360° over 30 years in a properly protected environment. These bend-resistant optical fibers facilitate the rapid deployment of small, flexible cables for the delivery of fiber to the premises/business/home (i.e., FTTx) by virtue of the optical fiber's ability to sustain a loss-free transmission through small-radius bends. Cables employing such bend-resistant optical fibers may be routed around sharp bends, stapled to building frame, coiled, and otherwise employed in demanding environments while retaining clear and strong signal transmission.

* * *

The bend-insensitive optical fibers according to the present invention facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size. In this regard, U.S. patent application Ser. No. 61/248,319 and U.S. patent application Ser. No. 12/614,011 for a Reduced-Diameter Optical Fiber (Overton), now U.S. Patent Application Publication No. 2010/0119202, are hereby incorporated by reference in their entirety.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the optical fiber according to the present invention, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns) and the secondary coating typically has an outer diameter of between about 235 microns and about 265 microns (i.e., a secondary coating thickness of between about 20 microns and 45 microns). Optionally, the optical fiber according to the present invention may include an outermost ink layer, which is typically between two and ten microns in thickness.

In an alternative embodiment, an optical fiber according to the present invention may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.) By way of example, in such embodiments the primary coating layer may have an outer diameter of between about 135 microns and about 175 microns (e.g., about 160 microns), and the secondary coating layer may have an outer diameter of between about 150 microns and about 230 microns (e.g., more than about 165 microns, such as 190-210 microns or so). In other words, the total diameter of the optical fiber is reduced to less than about 230 microns (e.g., about 200 microns).

* * *

As discussed previously, combining (i) a coating system according to the present invention with (ii) a glass fiber having a refractive index profile that itself provides bend resistance (e.g., low macrobending sensitivity) has been found to provide unexpectedly superior reductions in microbend sensitivity. Indeed, bend-insensitive glass fibers are especially suitable for use with the coating system of the present invention (e.g., Draka Comteq's ColorLock$^{XS}$ brand coating system). The respective refractive-index profiles of exemplary bend-insensitive glass fibers (i.e., exemplary bend-insensitive glass designs) are further discussed hereinafter.

As will be understood by those having ordinary skill in the art, a refractive index profile of an optical fiber is a graphical representation of the value of the refractive index as a function of optical fiber radius. Conventionally, the distance r to the center of the fiber is shown along the abscissa, and the difference between the refractive index and the refractive index of the fiber cladding is shown along the ordinate axis. The optical fiber refractive index profile is referred to as a "step" profile, a "trapezoidal" profile, a "parabolic" profile, or a "triangular" profile for graphs having the respective shapes of a step, a trapezoid, a parabola, or a triangle. These curves are generally representative of the theoretical or reference index profile (i.e., set profile) of the fiber. The fiber manufacturing constraints and stresses may lead to a slightly different profile.

An optical fiber conventionally includes an optical core, whose function is to transmit and possibly to amplify an optical signal, and an optical cladding, whose function is to confine the optical signal within the core. For this purpose, the refractive indexes of the core $n_c$ and the outer cladding $n_g$ are such that $n_c > n_g$. As is well known, the propagation of an optical signal in a single-mode optical fiber is divided into a fundamental mode (i.e., dominant mode, known as LP01) guided in the core and into secondary modes (i.e., cladding modes) guided over a certain distance in the core—cladding assembly.

Conventionally, step-index fibers are used as line fibers for optical fiber transmission systems. These optical fibers exhibit a chromatic dispersion and a chromatic dispersion slope corresponding to specific telecommunication recommendations. As noted, for compatibility between the optical systems of different manufacturers, the International Telecommunication Union (ITU) has established a recommendation with a norm referenced ITU-T G.652, which must be met by a Standard Single Mode Fiber (SSMF).

This G.652 standard for transmission fibers, recommends inter alia, a nominal range of 8.6 microns to 9.5 microns for the Mode Field Diameter (MFD) at a wavelength of 1310 nanometers, which can vary with +/−0.4 microns due to manufacturing tolerances; a maximum of 1260 nanometers for the cabled cut-off wavelength; a range of 1300 nanometers to 1324 nanometers for the dispersion cancellation wavelength (denoted $\lambda_0$); and a maximum chromatic dispersion slope of 0.092 ps/(nm²·km) (i.e., ps/nm²/km).

The cabled cut-off wavelength is conventionally measured as the wavelength at which the optical signal is no longer single mode after propagation over 22 meters of fiber, such as defined by subcommittee 86A of the International Electrotechnical Commission under standard IEC 60793-1-44.

In most cases, the secondary mode most resistant to bending losses is the LP 11 mode. The cable cut-off wavelength is, therefore, the wavelength beyond which the LP 11 mode is sufficiently weakened after propagation over 22 meters of fiber. The method proposed by the standard involves considering that the optical signal is single mode when the attenuation of the LP 11 mode is greater than or equal to 19.3 dB.

In addition, as previously noted, it is desirable to reduce bending sensitivity of optical fibers for use as termination fibers. Typical solutions to reduce bending losses are to influence the MAC value. For a given fiber, the so-called MAC value is defined as the ratio of the mode field diameter of the fiber at 1550 nanometers to the effective cut-off wavelength $\lambda_{ceff}$. The effective cut-off wavelength is conventionally measured as the wavelength at which the optical signal is no longer single mode after propagation over two meters of fiber such as defined by sub-committee 86A of the International Electrotechnical Commission under standard IEC 60793-1-44. The MAC value is used to assess fiber performance, particularly to achieve a compromise between mode field diameter, effective cut-off wavelength, and bending losses.

Figure 13:
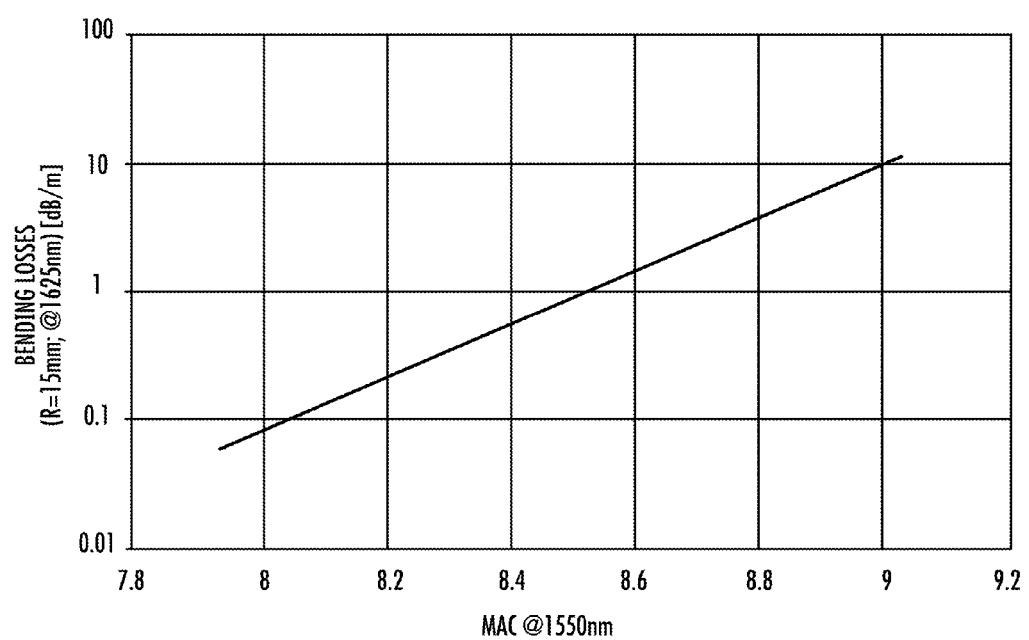
FIG. 13 depicts bending losses at a wavelength of 1625 nanometers with a bending radius of 15 millimeters in a standard single-mode fiber (SSMF) versus the MAC value at the wavelength of 1550 nanometers.

In this regard, FIG. 13 depicts the experimental results that illustrate bending losses at a wavelength of 1625 nanometers with a bend radius of 15 millimeters in a SSMF fiber in relation to the MAC value at a wavelength of 1550 nanometers. FIG. 13 shows that the MAC value influences fiber bending and that these bending losses may be reduced by lowering the MAC value.

* * *

An exemplary bend-insensitive glass fiber for use in the present invention is disclosed in U.S. Patent Application Publication No. US 2007/0127878 A1 and its related U.S. patent application Ser. No. 11/556,895 for a Single Mode Optical Fiber (de Montmorillon et al.), now U.S. Pat. No. 7,623,747. As noted, each of these commonly assigned patent documents is incorporated by reference in its entirety. Combining (i) a bend-insensitive glass fiber having the refractive index profile as disclosed in U.S. Patent Application Publication No. US 2007/0127878 A1 and a coating according to the present invention can achieve optical fibers having exceptional reductions in microbend sensitivity.

The bend-insensitive glass fiber disclosed in U.S. Patent Application Publication No. US 2007/0127878 A1 (i.e., the "disclosed fiber") includes a central core, a first inner cladding, a deeply buried second inner cladding, which contains germanium, and an outer cladding. Even though germanium is used as a dopant to increase the index of silica, the presence of germanium in the deeply buried cladding makes it possible to increase the elastic-optical coefficient of the buried cladding. Therefore when stresses are applied to the fiber, in particular when the fiber undergoes bending or micro-bending, the presence of the deeply buried cladding containing germanium limits the effects of stresses on the changes in refractive index in the fiber. The optical losses are therefore reduced when such stresses are applied to a fiber having a second deeply buried inner cladding containing germanium.

More particularly, the optical transmission fiber possesses (i) a central core having an index difference $\Delta n_1$ with an outer optical cladding; (ii) a first inner cladding having an index difference $\Delta n_2$ with the outer cladding; (iii) a second, buried inner cladding having an index difference $\Delta n_3$ with the outer cladding of less than $-3.10^{-3}$, and (iv) containing germanium in a weight concentration of between 0.5 percent and 7 percent.

According to one embodiment of the fiber, the index difference $\Delta n_3$ of the second inner cladding with the outer cladding is greater than $-15.10^{-3}$. The index difference between the central core and the first inner cladding ($\Delta n_1$-$\Delta n_2$) may lie between $3.9 \times 10^{-3}$ and $5.9 \times 10^{-3}$. According to another embodiment, the second buried cladding has a radius of between 12 microns and 25 microns.

The central core may have a radius of between 3.5 microns and 4.5 microns, and show an index difference with the outer cladding of between $4.2 \times 10^{-3}$ and $6.1 \times 10^{-3}$.

In yet another embodiment, the first inner cladding has a radius of between 7.5 microns and 14.5 microns and shows an index difference with the outer cladding between $-1.2 \times 10^{-3}$ and $1.2 \times 10^{-3}$.

The fiber disclosed herein may be described in terms of the integral $I_1$ of the central core, which is defined as:

$$I_1 = \int_0^{r_1} Dn(r) \cdot dr \approx r_1 \times Dn_1$$

and, in preferred embodiments, lies between $17 \times 10^{-3}$ microns and $24 \times 10^{-3}$ microns.

In terms of yet another characteristic, at a wavelength of 1310 nanometers, the present fiber shows a chromatic dispersion slope of 0.093 ps/nm²/km or less. The present fiber may also show (i) cancellation of chromatic dispersion at a wavelength of between 1300 nanometers and 1324 nanometers and/or (ii) a cable cut-off wavelength of 1260 nanometers or less.

The disclosed optical fiber may be further described in terms of its bending losses under various operating conditions. At a wavelength of 1625 nanometers, the bending losses for a winding of 100 turns around a bending radius of 15 millimeters are 1 dB or less. At a wavelength of 1625 nanometers, the present fiber shows bending losses for a winding of 1 turn around a bend radius of 11 millimeters, of 0.5 dB or less. Along these lines, again at a wavelength of 1625 nanometers, the present fiber shows bending losses for a winding of 1 turn around a bend radius of 5 millimeters, of 2 dB or less. Finally, to address yet another characteristic of this optical fiber, up to a wavelength of 1625 nanometers, the disclosed optical fiber shows microbending losses, measured by the so-called fixed diameter drum method, of 0.8 dB/km or less.

More particularly, the bend-insensitive glass fiber disclosed in U.S. Patent Application Publication No. US 2007/0127878 A1 has a central core, a first inner cladding, and a second, buried, inner cladding. By buried cladding is meant a radial portion of a fiber with a refractive index that is lower than the index of the outer cladding. The second, buried, inner cladding has an index difference with the outer cladding that is less than $-3 \times 10^{-3}$ and may reach $-15 \times 10^{-3}$. Also, the buried cladding contains germanium in a weight concentration of between 0.5 percent and 7 percent.

As known per se, an optical fiber is obtained by the drawing of a preform. For example, the preform may be a glass tube (pure silica) of very high quality which forms part of the outer cladding and surrounds the central core and the inner claddings of the fiber; this tube can then be sleeved or refilled to increase its diameter before proceeding with the drawing operation on a draw tower. To manufacture the preform, the tube is generally mounted horizontally and held in place at its two ends by glass rods in a lathe; the tube is then rotated and locally heated to deposit components determining the composition of the preform. This composition determines the optical characteristics of the future fiber.

The depositing of components in the tube is commonly called "doping," i.e., "impurities" are added to the silica to modify its refractive index. Hence, germanium (Ge) or Phosphorus (P) increase the refractive index of the silica; they are often used to dope the central core of the fiber. Also, fluorine (F) or Boron (B) lower the refractive index of the silica; they are often used to form buried claddings or as co-dopants with germanium when it is desired to compensate for the increase in refractive index in a photosensitive cladding.

A preform with a buried cladding is difficult to manufacture. Fluorine does not incorporate easily into silica when heated beyond a certain temperature, whereas a high temperature is required to manufacture glass. The compromise between the high temperature required for glass-making and the low temperature that promotes proper incorporation of the fluorine makes it practically impossible to obtain indexes much lower than that of silica.

It is proposed herein to manufacture the preform of the present fiber using a PCVD technique (Plasma Chemical Vapor Deposition) since it allows reactions at lower temperatures than conventional techniques (CVD, VAD, OVD) by ionizing the reaction components. This manufacturing technique is described in U.S. Pat. Nos. RE 30,635 and 4,314,833; the technique allows major incorporation of fluorine in the silica in order to form deeply buried claddings.

The use of the PCVD technique to manufacture the fiber disclosed herein also makes it possible to add germanium to the buried cladding. As indicated previously, germanium increases the refractive index of the silica; it is therefore generally highly unadvisable to incorporate the same in a fiber section for which it is sought to obtain a lower refractive index than silica. PCVD makes it possible however to produce a high number of highly reactive fluorine ions; it then becomes possible to add germanium to the reaction and nonetheless to obtain a buried inner cladding.

Therefore, the present fiber comprises germanium within the assembly of inner claddings including the cladding with an index of refraction less than $-3 \times 10^{-3}$. The presence of germanium in the buried cladding modifies the viscosity of the silica and the elastic-optical coefficient in this cladding layer.

Figure 14:
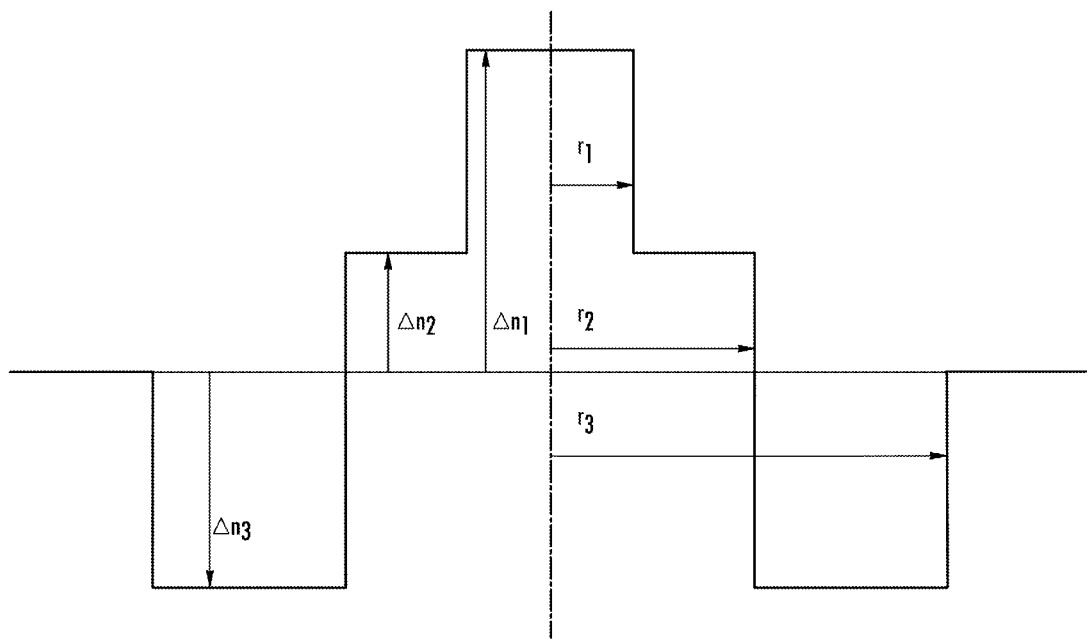
FIG. 14 depicts the nominal refractive index profile of an exemplary single-mode fiber.

FIG. 14 illustrates an index profile for this transmission fiber. The illustrated profile is a set profile, i.e., it represents the theoretical profile of the fiber. The fiber actually obtained after drawing from a preform possibly has a substantially different profile.

The single-mode transmission fiber includes (i) a central core having an index difference $\Delta n_1$ with an outer cladding that serves as an optical cladding; (ii) a first inner cladding having an index difference $\Delta n_2$ with the outer cladding; and (iii) a second inner cladding which is deeply buried and has an index difference $\Delta n_3$ with the outer cladding. The refractive indexes in the central core, the first cladding, and the second inner cladding are substantially constant over their entire width; the set profile is therefore truly a single-mode fiber. The width of the core is defined by its radius $r_1$ and the width of the claddings by their respective outer radii $r_2$ and $r_3$.

To define a set index profile for an optical fiber, the index of the outer cladding is generally taken as reference. The index values of the central core, buried claddings and the ring (i.e., the first inner cladding) are then given as index differences $\Delta n_{1,2,3}$. Generally, the outer cladding is formed of silica, but this outer cladding may be doped to increase or reduce its refractive index, for example, to modify the signal propagation characteristics.

Each section of the fiber profile can therefore be defined using integrals which associate the variations in indexes with the radius of each fiber section.

Three integrals can be defined for the present fiber. The integral values represent the core surface $I_1$, the surface of the first inner cladding $1_2$ and the surface of the second, buried, inner cladding $1_3$. The expression "surface" is not to be construed geometrically but corresponds to a value taking two dimensions into account. These three integrals can be expressed as follows:

$$I_1 = \int_0^{r_1} Dn(r) \cdot dr \approx r_1 \times Dn_1$$

$$I_2 = \int_{r_1}^{r_2} Dn(r) \cdot dr \approx (r_2 - r_1) \times Dn_2$$

$$I_3 = \int_{r_2}^{r_3} Dn(r) \cdot dr \approx (r_3 - r_2) \times Dn_3$$

Table 2 below gives the limit values of radii and index differences, and the limit values of the integral $I_1$ that are required so that the fiber shows reduced bending losses and microbending losses while meeting the optical propagation criteria of G.652 standard for transmission fibers. The values given in the table correspond to the set profiles of the fibers.

TABLE 2

| $r_1$ (μm) | $r_2$ (μm) | $r_3$ (μm) | $r_1/r_2$ | $\Delta n_1$ ($\times 10^3$) | $\Delta n_2$ ($\times 10^3$) | $\Delta n_3$ ($\times 10^3$) | $\Delta n_1 - \Delta n_2$ | $I_1$ (μm × $10^3$) |
|---|---|---|---|---|---|---|---|---|
| 3.5 | 7.5 | 12.0 | 0.27 | 4.2 | −1.2 | −15 | 3.9 | 17 |
| 4.5 | 14.5 | 25.0 | 0.5 | 6.2 | 1.2 | −3 | 5.9 | 24 |

The value of the integral $I_1$ of the central core influences the shape and size of the fundamental propagation mode of the signal in the fiber. An integral value for the central core of between $17 \times 10^{-3}$ microns and $24 \times 10^{-3}$ microns makes it possible, in particular, to maintain a mode field diameter that is compatible with the G.652 standard.

Table 3 below gives examples of possible index profiles for the disclosed transmission fiber. The first column allocates a reference to each profile. The following columns give the radii values of each section ($r_1$ to $r_3$); and the following columns give the values of the index differences of each section with the outer cladding ($\Delta n_1$ to $\Delta n_3$). The index values are measured at the wavelength of 633 nanometers.

TABLE 3

| Example | $r_1$ (μm) | $r_2$ (μm) | $r_3$ (μm) | $\Delta n_1$ (×10³) | $\Delta n_2$ (×10³) | $\Delta n_3$ (×10³) |
|---------|-----------|-----------|-----------|---------------------|---------------------|---------------------|
| 1 | 2.86 | 6.90 | 13.24 | 5.41 | 2.00 | −3.70 |
| 2 | 3.86 | 9.50 | 15 | 5.16 | 0.69 | −5.0 |
| 3 | 4.02 | 9.55 | 15 | 5.31 | 0.45 | −5.0 |
| 4 | 3.86 | 8.66 | 15 | 5.41 | 0.85 | −5.0 |

The present transmission fiber, having an index profile such as described previously, shows reduced bending losses and microbending losses at useful wavelengths. In addition, the present fiber meets the criteria of G.652 standard. Tables III and IV below illustrate the simulated optical characteristics for transmission fibers corresponding to the index profiles in Table 3.

In Table 4, column one reproduces the references of Table 3. The following columns, for each fiber profile, give the values of the effective cut-off wavelength $\lambda_{ceff}$, cable cut-off wavelength $\lambda_{CC}$, mode field diameters 2W02 for the wavelengths 1310 nanometers and 1550 nanometers, the cancellation wavelength of the chromatic dispersion $\lambda_0$, the dispersion slope $P_0$ at $\lambda_0$, and the chromatic dispersions C for the wavelengths 1550 nanometers and 1625 nanometers.

In Table 5, column one reproduces the references of Table 4. The following column gives the MAC values at a wavelength of 1550 nanometers. The three following columns give the values for the bending losses BL for the respective bending radii of 5, 11, and 15 millimeters at a wavelength of 1625 nanometers. The following column, for a radius of 15 millimeters, gives the relative bending losses normalized with respect to the standard bending losses of a SSMF fiber having the same MAC value at a wavelength of 1550 nanometers. The second to last column gives the microbending losses obtained with the pin-array test (10 pins of 1.5 millimeters) at a wavelength of 1550 nanometers.

The pin-array test uses an array of ten polished needles, of diameter 1.5 millimeters and spaced apart by 1 cm. The fiber is woven across the array orthogonally to the axis of the needles. The fiber and the array are pressed between two rigid plates coated with a layer of approximately 3 millimeters of high density polyethylene foam. The layers of the assembly (plates, array, fiber) are positioned horizontally and the assembly is covered with a 250-gram weight. The last column indicates the microbending losses measured using the fixed diameter drum method at a wavelength of 1625 nanometers. This method is described in the technical recommendations of the International Electrotechnical Commission, sub-committee 86A under reference IEC TR-62221. The diameter of the drum used is 60 cm; the drum is covered with extra-fine sandpaper. The values of the bending losses (BL) are indicated at a wavelength of 1625 nanometers.

TABLE 4

| N | $\lambda_{ceff}$ (μm) | $\lambda_{CC}$ (μm) | 2W02 @1310 nm (μm²) | 2W02 @1550 nm (μm²) | $\lambda_0$ (nm) | $P_0$ (ps/nm²/km) | C @ 1550 nm (ps/nm/km) | C @ 1625 nm (ps/nm/km) |
|---|------|-------|------|-------|------|-------|------|------|
| 1 | 1.13 | <1.26 | 9.10 | 10.18 | 1308 | 0.097 | 19.2 | 23.9 |
| 2 | 1.23 | <1.26 | 9.16 | 10.36 | 1312 | 0.091 | 18.1 | 22.9 |
| 3 | 1.25 | <1.26 | 9.01 | 10.13 | 1318 | 0.089 | 17.3 | 22.0 |
| 4 | 1.25 | <1.26 | 9.00 | 10.08 | 1318 | 0.091 | 17.8 | 22.5 |

TABLE 5

| N° | MAC @1550 nm | BL R = 5 mm @1625 nm (dB/turn) | BL R = 11 mm @1625 nm (dB/turn) | BL R = 15 mm @1625 nm (dB/100 turns) | BLrel R = 15 mm @1625 nm | BLμ Pin-array test @1550 nm (dB) | BLμ Drum method @1625 nm (dB/km) |
|----|------|------|------|------|-----|------|------|
| 1 | 9.0 | ≦5 | ≦2 | | 1/5 | | |
| 2 | 8.4 | 2 | ≦0.5 | ≦1 | 1/5 | 0.025 | ≦0.8 |
| 3 | 8.1 | 1 | ≦0.1 | ≦0.4 | 1/5 | ≦0.025 | ≦0.8 |
| 4 | 8.1 | 1 | ≦0.1 | ≦0.4 | 1/5 | ≦0.025 | ≦0.8 |

It can be seen in Table 4 that examples 2-4 indeed comply with the G.652 standard; example 1 shows a dispersion slope $P_O$ lying slightly outside the G.652 standard.

In particular, the fiber in examples 2 to 4 shows cancellation of chromatic dispersion for a wavelength of between 1300 nanometers and 1324 nanometers; this is in agreement with the G.652 standard. The fiber in examples 2 to 4 also shows, for a wavelength of 1310 nanometers, a chromatic dispersion slope that is 0.093 ps/nm² km or less, which complies with the G.652 standard. Also the fiber in examples 2 to 4 shows a cable cut-off wavelength that is 1260 nanometers or less, meeting the criteria of the G.652 standard which requires a cabled cut-off wavelength of 1260 nanometers or less.

In addition, it can be seen in Table 5 that examples 2 to 4 exhibit distinctly improved bending losses with respect to the losses of standard SSMF transmission fiber. The microbending losses are also improved.

Figure 15A:
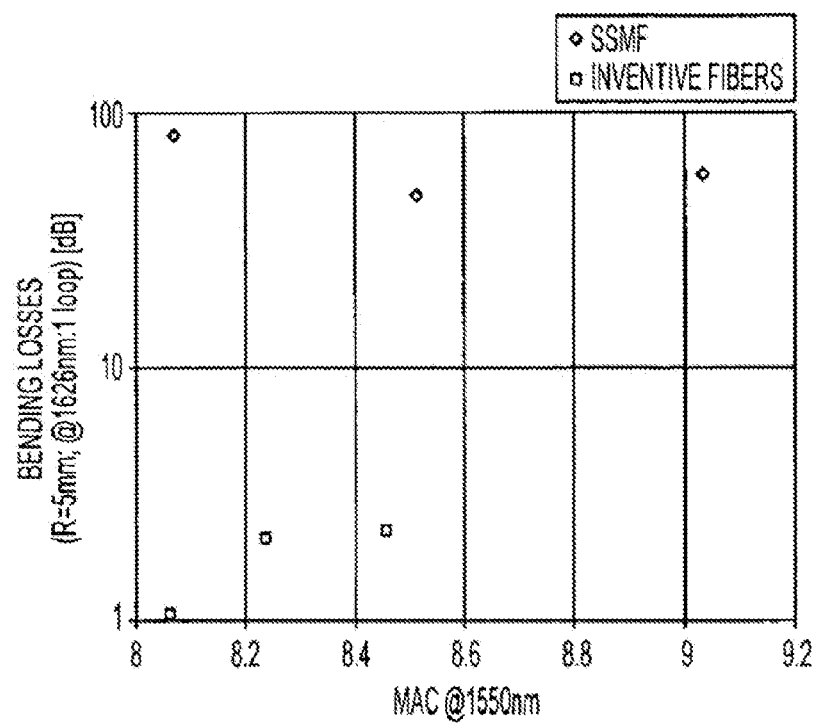
FIGS. 15a, 15b, and 15c are graphs illustrating, for different bending radii, the bending losses at a wavelength of 1625 nanometers in relation to the MAC value at a wavelength of 1550 nanometers for different standard single-mode fibers (SSMF) and for different optical fibers.
Figure 15B:
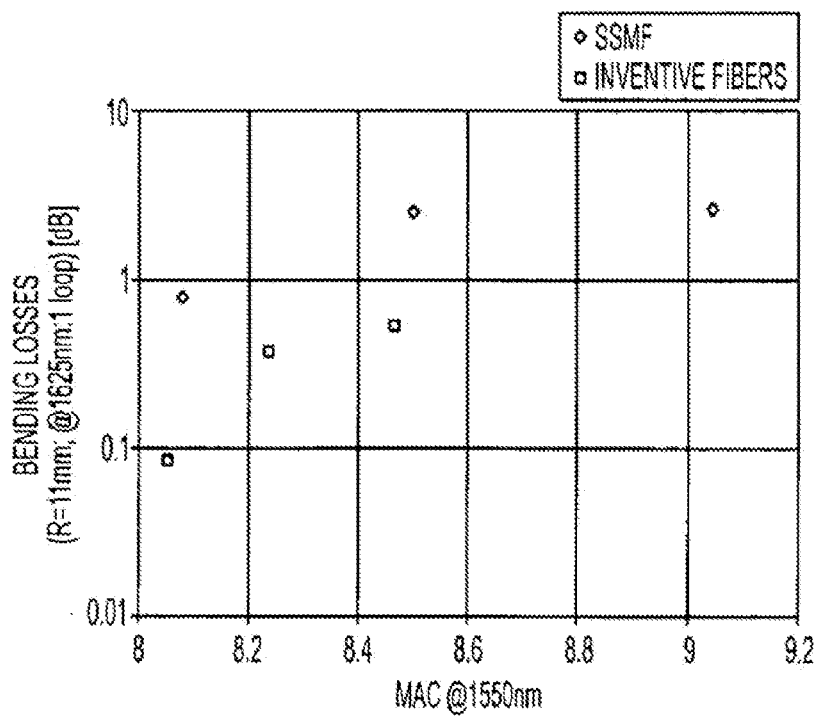
Figure 15C:
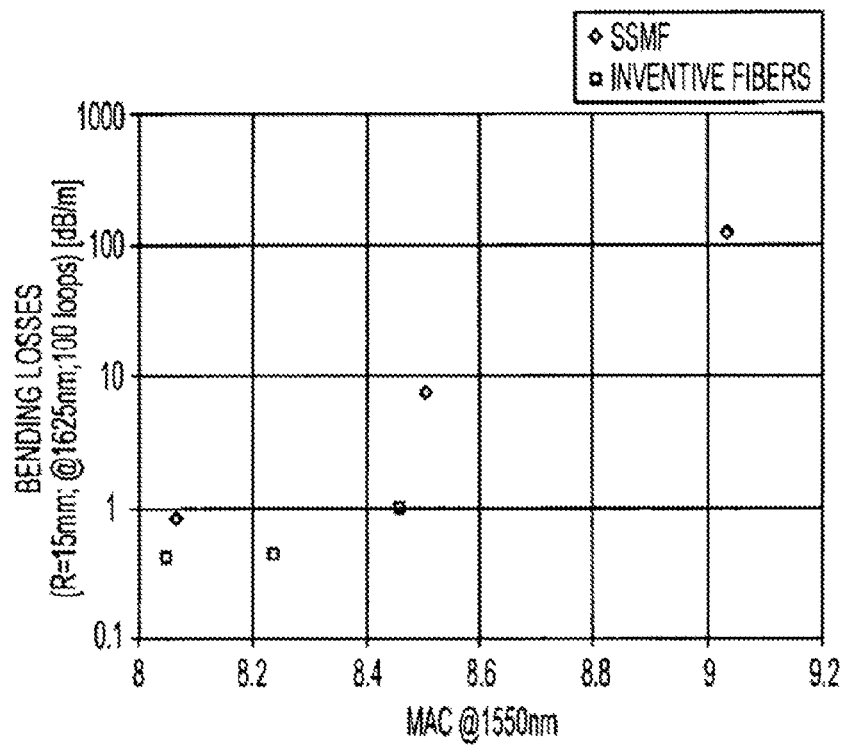

The graphs in FIGS. 15a, 15b, and 15c show bending loss measurements obtained with the disclosed optical fibers as well as bending loss measurements for standard fibers. The measurements correspond to bending radii of R=5 mm, R=11 mm and R=15 mm at a wavelength of 1625 nanometers. The bending losses here are given at the end of one loop (for R=5 mm and R=11 mm) or at the end of 100 loops (for R=15 mm)

Figure 16A:
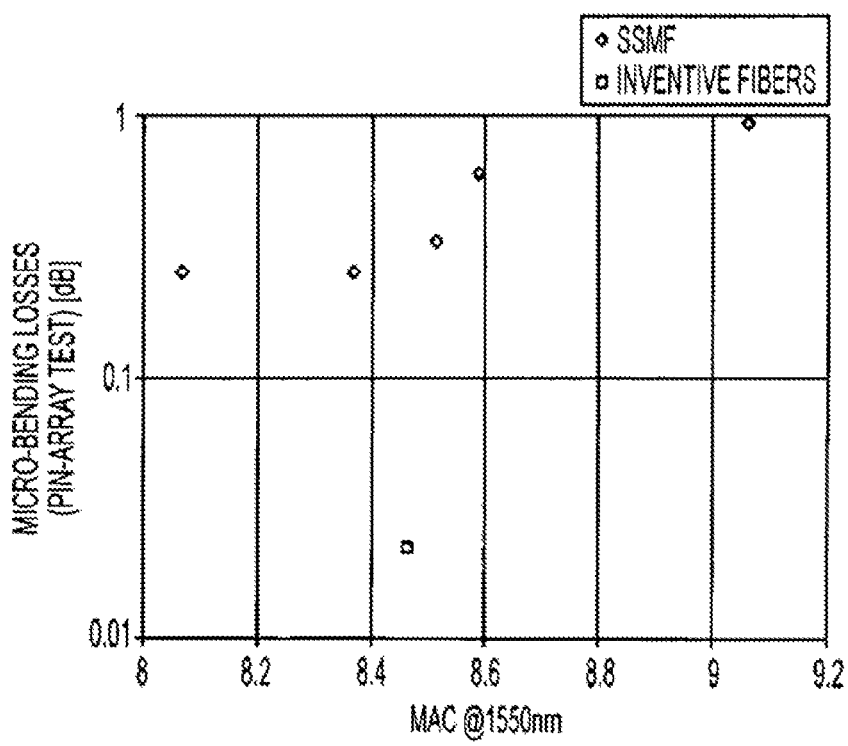
FIGS. 16a and 16b are graphs illustrating losses through microbending.

FIG. 16a shows microbending losses for the disclosed optical fibers and characterized by the pin-array test as measured at a wavelength of 1550 nanometers. The microbending loss values are shown in relation to the MAC value at a wavelength of 1550 nanometers for different SSMF fibers and for the glass fiber disclosed in U.S. Patent Application Publication No. US 2007/0127878 A1.

Figure 16B:
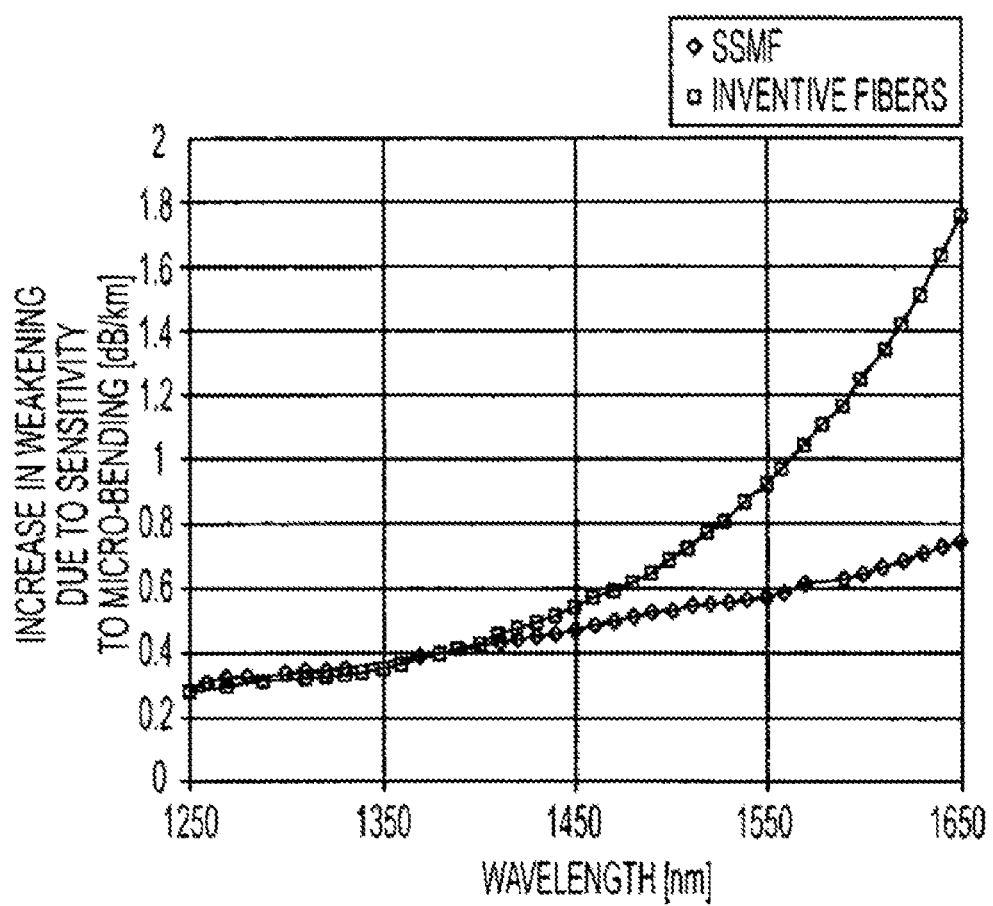

FIG. 16b shows microbending losses using the fixed diameter drum test in relation to the wavelength for a SSMF fiber and for the disclosed fiber having MAC values at a wavelength of 1550 nanometers of 8.11 and 8.31, respectively.

Also, the graphs in FIGS. 16a and 16b clearly show that the sensitivity of the present fiber to microbending is markedly reduced with respect to that of a SSMF fiber. It can be seen in FIG. 16a that the microbending losses (pin-array test) measured for the fiber disclosed in U.S. Patent Application Publication No. US 2007/0127878 A1, having a MAC value of 8.44 at a wavelength of 1550 nanometers, amounts to 0.025 dB, whereas the microbending losses are ten times higher for a SSMF fiber having the same MAC value. It can also be seen in FIG. 16b that microbending losses (fixed drum method) for the disclosed fiber increase much more slowly with the wavelength than for a SSMF fiber which has a greater MAC value however at the 1550 nanometers wavelength. In this graph, it can be seen that the present fiber guarantees a sensitivity to microbending up to long wavelengths, greater than 1650 nanometers, which is equivalent to the sensitivity that can be guaranteed for a SSMF fiber up to a wavelength of 1550 nanometers.

The present transmission fiber may be manufactured by drawing a preform having one of the above-described index profiles. The preform profiles may be made, for example, from a sleeve of silica in which layers of doped silica are deposited. Deposition may be made by a Plasma Chemical Vapor Deposition (PCVD) type deposition method mentioned previously. This chemical deposition in the vapor form activated by plasma (PCVD) is particularly suitable for obtaining a buried inner cladding layer for the present fiber. In preferred embodiments, this buried cladding layer includes germanium in a weight concentration between 0.5 percent and 7 percent. The weight concentration of germanium is preferably between 0.5 percent and 1.5 percent since this allows an optimum balance between lower costs and more ease of manufacturing on the one hand and good fiber characteristics on the other hand.

* * *

Another exemplary bend-insensitive glass fiber for use in the present invention is disclosed in U.S. Patent Application Publication No. US 2007/0280615 A1 and its related U.S. patent application Ser. No. 11/697,994 for a Single-Mode Optical Fiber (de Montmorillon et al.), now U.S. Pat. No. 7,587,111. As noted, each of these commonly assigned patent documents is incorporated by reference in its entirety. Combining (i) a bend-insensitive glass fiber having the refractive index profile as disclosed in U.S. Patent Application Publication No. US 2007/0280615 A1 and a coating according to the present invention can achieve optical fibers having exceptional reductions in microbend sensitivity.

The bend-insensitive glass fiber disclosed in U.S. Patent Application Publication No. US 2007/0280615 A1 (i.e., the "disclosed fiber") embraces a particular step-index profile with a first highly depressed section and a weakly depressed second section. With such a structure, it is possible to effectively reduce the bending losses at constant MAC while strongly minimizing the leakage modes of a higher order. Thus, unlike the fibers from the prior art having a step-index structure with a depressed section, this disclosed fiber has a cable cut-off wavelength which remains less than 1260 nanometers. This disclosed fiber thus complies with the G.652 standard.

Figure 17:
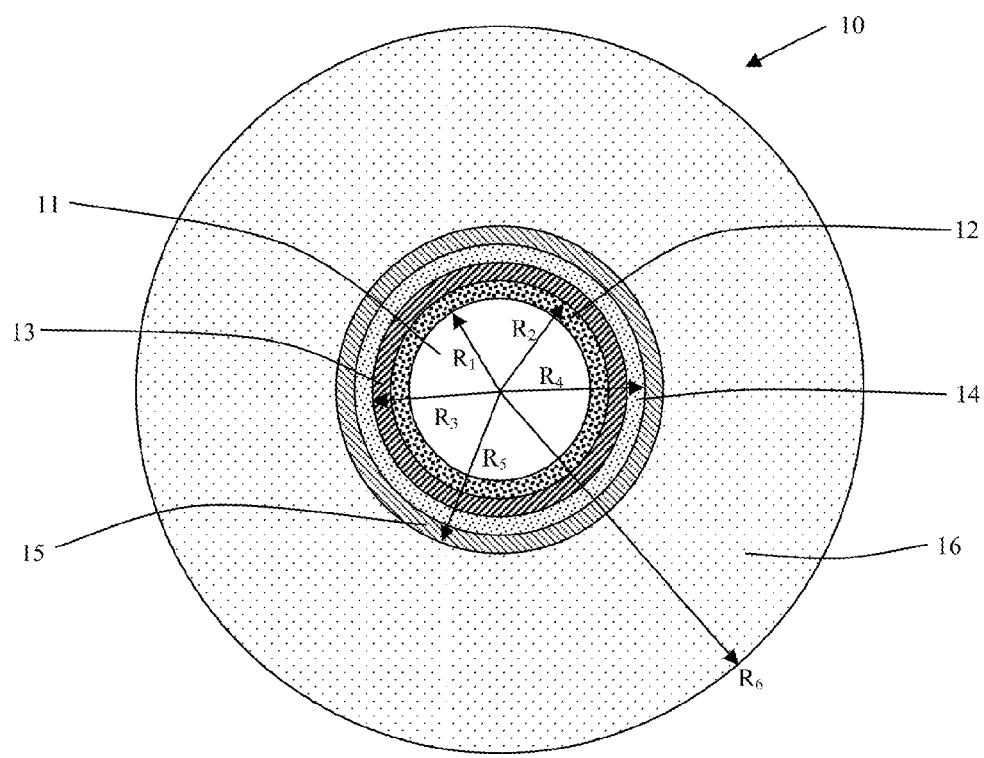
FIG. 17 depicts the cross-section (not to scale) of an exemplary optical fiber.

More particularly and as schematically depicted in FIG. 17, the disclosed optical transmission fiber 10 includes: a central core 11 having an index difference ($Dn_1$) with an outer optical cladding 16; a first intermediate inner cladding 12 having an index difference ($Dn_2$) with the outer optical cladding 16; a first depressed inner cladding 13 having an index difference ($Dn_3$) with the outer optical cladding 16 that is less than or equal to $-5 \times 10^{-3}$; a second intermediate inner cladding 14 having an index difference ($Dn_4$) with the outer optical cladding 16; a second depressed inner cladding 15 having an index difference ($Dn_5$) with the outer optical cladding 16 that is inferior, in absolute value, to the index difference $Dn_3$ between the first depressed inner cladding 13 and the outer optical cladding 16; and wherein, for a wavelength of 1625 nanometers, the optical fiber 10 has bending losses less than or equal to 0.1 dB/10 turns for a bending radius of 15 millimeters and bending losses less than or equal to 0.5 dB/turn for a bending radius of 7.5 millimeters.

The glass fiber disclosed in U.S. Patent Application Publication No. US 2007/0280615 A1 may include one or more of the following characteristics: the index difference between the second depressed inner cladding and the outer optical cladding is between $-0.3 \times 10^{-3}$ and $-3 \times 10^{-3}$; the index difference between the central core and the first intermediate inner cladding is between $4.5 \times 10^{-3}$ and $6.0 \times 10^{-3}$; the central core has a radius between 3.5 microns and 4.5 microns for an index difference with the outer optical cladding between $5.0 \times 10^{-3}$ and $5.6 \times 10^{-3}$; the first intermediate inner cladding has a radius between 9 microns and 12 µm; the first depressed inner cladding has a radius between 14 microns and 16 µm; the second intermediate inner cladding has a substantially zero index difference with the outer optical cladding; the second intermediate inner cladding has a radius between 18 microns and 20 µm; the second depressed inner cladding has a radius between 25 microns and 40 µm; bending losses less than or equal to 0.1 dB/100 turns for a bending radius of 20 millimeters, at the wavelength of 1625 nanometers; bending losses less than or equal to 1 dB/turn for a bending radius of 5 millimeters, at the wavelength of 1625 nanometers; microbending losses, according to the so-called method of the fixed diameter drum ("touret a diameter fixe"), less than or equal to 0.8 dB/km up to a wavelength of 1625 nanometers; a cable cut-off wavelength less than or equal to 1260 nanometers; a mode field diameter between 8.6 microns and 9.5 microns for a wavelength of 1310 nanometers; a ratio (MAC) of the mode field diameter of the fiber at 1550 nanometers over the effective cut-off wavelength ($\lambda_{ceff}$) less than 8.2; a zero chromatic dispersion wavelength ($\lambda_0$) between 1300 nanometers and 1324 nanometers with a chromatic dispersion slope inferior or equal to 0.092 ps/nm²/km at this wavelength.

Regarding the bend-insensitive glass fiber disclosed in U.S. Patent Application Publication No. US 2007/0280615 A1 and with reference to FIG. 17, the optical fiber 10 has a central core 11, a first intermediate inner cladding 12, and a first depressed inner cladding 13. The fiber also has a second intermediate inner cladding 14 and a second depressed inner cladding 15. By depressed inner cladding, it is meant that a radial portion of the fiber 10 has a refractive index less than the index of the outer optical cladding 16. The first depressed inner cladding 13 has an index difference with the outer optical cladding 16 that is typically less than $-5 \times 10^{-3}$ but that may reach $-15 \times 10^{-3}$. The second depressed inner cladding 15 has a smaller index difference with the outer cladding 16 than with the first depressed inner cladding 13; this index difference is typically between $-0.3 \times 10^{-3}$ and $-3 \times 10^{-3}$.

As will be appreciated by those having ordinary skill in the art, FIG. 17 is a schematic representation of an exemplary fiber. FIG. 17 is intended to depict the relative positions of the central core 11 and the respective cladding layers 11-16 within the fiber 10. Accordingly, the central core 11 and cladding layers 11-16 are not necessarily drawn to scale (e.g., the outer cladding 16).

Figure 18:
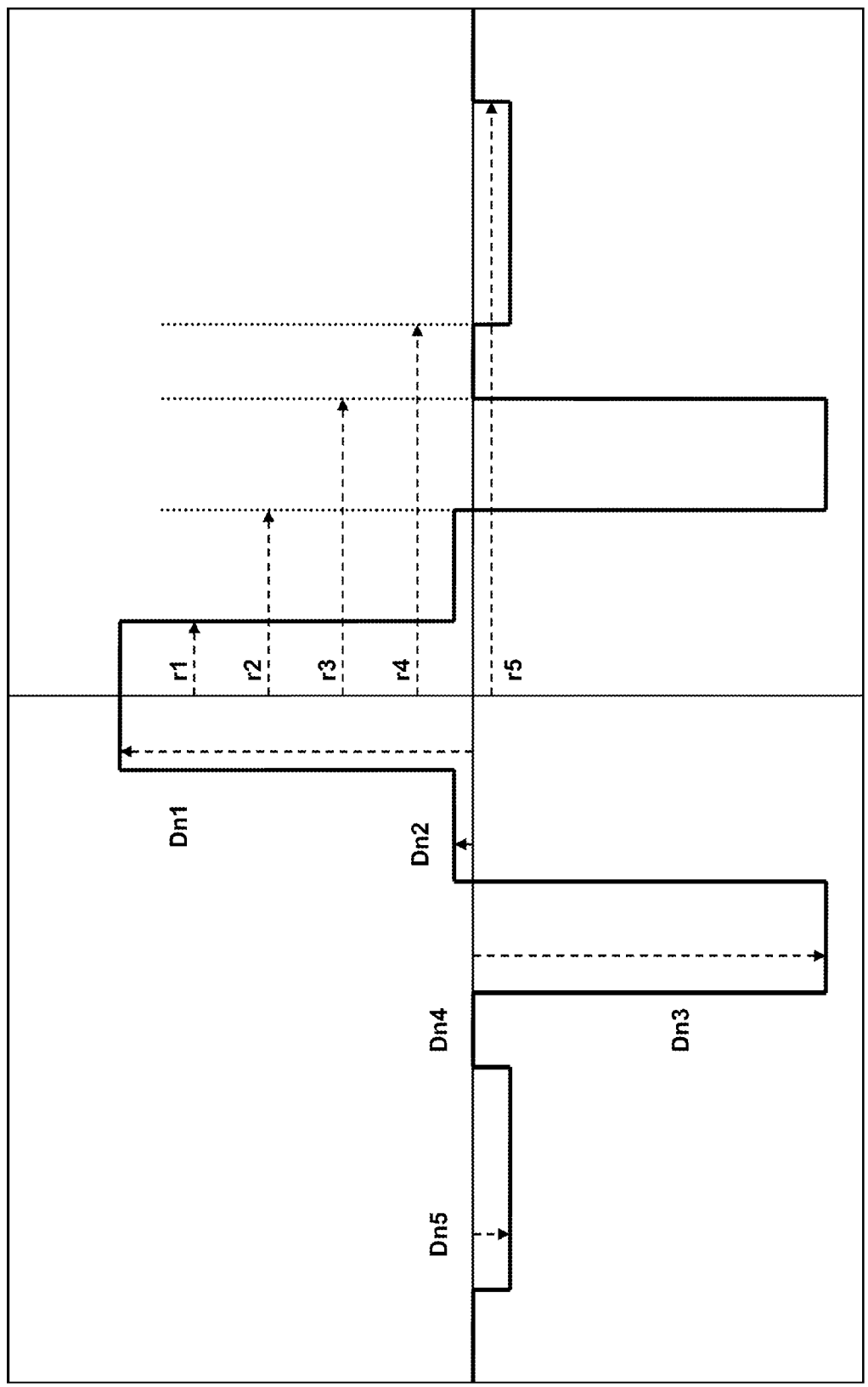
FIG. 18 depicts the set profile of a step-index fiber.

FIG. 18 illustrates an index profile for a transmission fiber disclosed in U.S. Patent Application Publication No. US 2007/0280615 A1. The illustrated profile is a set profile (i.e., representative of the theoretical profile of the fiber). Fiber actually obtained after fiber drawing of a preform may have a slightly different profile.

The disclosed step-index transmission fiber includes a central core having an index difference ($Dn_1$) with an outer optical cladding, which acts as an optical cladding; a first intermediate inner cladding having an index difference ($Dn_2$) with the outer optical cladding; a first depressed inner cladding having a index difference ($Dn_3$) with the outer optical cladding; a second intermediate inner cladding having an index difference ($Dn_4$) with the outer optical cladding and a second depressed inner cladding having a index difference $Dn_5$ with the outer optical cladding. The index difference ($Dn_5$) is in absolute value less than the index difference ($Dn_3$). The refractive indexes in the central core, in the first and second depressed inner claddings, and in the first and second intermediate inner claddings are substantially constant over the whole of their widths. The set profile is a step-index fiber. The width of the core is defined by its radius ($r_1$) and the width of the claddings is defined by their respective outer radii, (i.e., $r_2$-$r_5$).

In order to define a set index profile for an optical fiber, the index value of the outer cladding is generally taken as a reference. FIG. 18 shows only a small part of the outer optical cladding and is intended to schematically illustrate the index differences in the core. The outer optical cladding of substantially constant index stretches out until the outside of the optical fiber. In other words, there is no further optical cladding having different refractive indices outside of the outer optical cladding. The index values for the central core, the depressed inner claddings, and the intermediate claddings are then shown as index differences ($Dn_{1,2,3,4,5}$). Generally, the outer optical cladding consists of silica, but this cladding may be doped in order to increase or reduce its refractive index, (e.g., to change the propagation characteristics of the signal).

The Table (below) provides typical limiting values for the radii and the index differences that allow a fiber profile to be achieved so that the fiber has reduced bending losses while meeting the criteria for optical propagation from the G.652 standard for transmission fibers. The r values correspond to set fiber profiles:

TABLE 6

|  | $r_1$ (μm) | $r_2$ (μm) | $r_3$ (μm) | $r_4$ (μm) | $r_5$ (μm) | $Dn_1$ ($10^{-3}$) | $Dn_1 - Dn_2$ ($10^{-3}$) | $Dn_3$ ($10^{-3}$) | $Dn_5$ ($10^{-3}$) |
|---|---|---|---|---|---|---|---|---|---|
| min | 3.5 | 9.0 | 14.0 | 18.0 | 25.0 | 5.0 | 4.5 | −5 | −0.3 |
| max | 4.5 | 12.0 | 16.0 | 20.0 | 40.0 | 5.6 | 6.0 | −15 | −3 |

The presence of the second depressed inner cladding ($r_5$, $Dn_5$), which is less depressed than the first depressed inner cladding, provides a limitation of the presence of leakage modes capable of propagating along the fiber and inducing an increase in the effective cut-off wavelength. By the presence of the first intermediate inner cladding ($r_2$, $Dn_2$), it is possible to ensure proper confinement of the single mode signal in the central core and to retain a mode field diameter compatible with the G.652 standard. By the presence of the first, deeply depressed inner cladding ($r_3$, $Dn_3$) the bending losses may be further reduced.

The transmission fiber disclosed in U.S. Patent Application Publication No. US 2007/0280615 A1, having an index profile such as described previously, has reduced bending losses at wavelengths of use.

In particular, for a wavelength of 1625 nanometers, the disclosed fiber has bending losses less than or equal to 0.1 dB for a winding of 100 turns around a spool with a bending radius of 20 millimeters; bending losses less than or equal to 0.1 dB for a winding of 10 turns around a spool with a bending radius of 15 millimeters; bending losses less than or equal to 0.2 dB for a winding of one turn around a spool with a bending radius of 10 millimeters; bending losses than or equal to 0.5 dB for a winding of one turn around a spool with a bending radius of 7.5 millimeters; bending losses than or equal to 1 dB for a winding of one turn around a spool with a bending radius of 5 millimeters.

The disclosed fiber has even smaller bending losses at the wavelength of 1550 nanometers. In particular, for a wavelength of 1550 nanometers, the fiber has bending losses less than or equal to 0.02 dB for a winding of 10 turns around a spool with a bending radius of 15 millimeters; bending losses less than or equal to 0.05 dB for a winding of one turn around a spool or a bending radius of 10 millimeters; bending losses less than or equal to 0.2 dB for a winding of one turn around a spool with a bending radius of 7.5 millimeters.

Further, the disclosed fiber also has reduced microbending losses as compared with an SSMF. The microbending losses may be estimated with a so-called grid test (10 needles of 1.5 millimeters) at the wavelength of 1550 nanometers. This test uses a grid, formed with ten polished needles with a diameter of 1.5 millimeters, and spaced apart by 1 cm. The fiber passes through the grid over two passages, orthogonally to the axis of the needles. The fiber and the grid are pressed between two rigid plates covered with a layer of about 3 millimeters of high density polyethylene foam. The layers of the assembly (i.e., plates, grids, fiber) are positioned horizontally and the whole is covered with a 250 gram mass. With this test, the fiber has microbending losses less than or equal to 0.025 dB at 1550 nanometers.

Microbending losses may also be estimated by the so-called fixed diameter drum method at a wavelength of 1625 nanometers. This method is described in the technical recommendation of the International Electrotechnical Commission from subcommittee 86A under reference IEC TR-62221. The diameter of the drum used is 60 cm; the drum is covered with extra fine sand paper. With this method, the disclosed fiber has microbending losses less than or equal to 0.8 dB/km at 1625 nanometers.

Further, the disclosed fiber meets the criteria of the G.652 standard.

In particular, it has an effective cut-off wavelength ($\lambda_{ceff}$) less than 1330 nanometers so that the cable cut-off wavelength ($\lambda_{CC}$) is less than 1260 nanometers, in compliance with the G.652 standard. The disclosed fiber also has an MFD between 8.6 microns and 9.5 microns for a wavelength of 1310 nanometers.

The disclosed fiber may also have a MAC ratio of up to about 8.2. The yield for manufacturing this fiber is therefore better because there is no longer any requirement to exclusively select fibers with a MAC less than 7.9.

Figure 19:
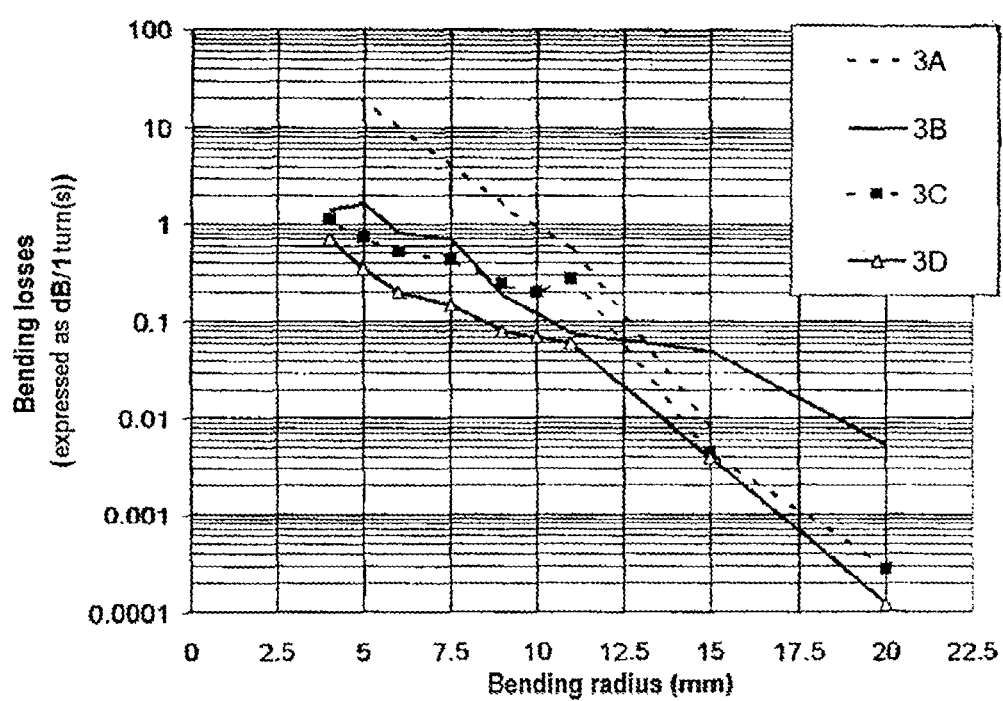
FIG. 19 depicts bending losses at the wavelength of 1625 nanometers versus the bending radius for optical fibers.

FIG. 19 graphically illustrates the bending losses at 1625 nanometers versus the bending radius for a SSMF, for a fiber identical with the fiber disclosed in U.S. Patent Application Publication No. US 2007/0280615 A1, but without the second depressed section, and for two fibers as disclosed in U.S. Patent Application Publication No. US 2007/0280615 A1.

A first curve (3A) shows the bending losses of a step-index SSMF. This fiber has a MAC of 8.1. It is noted that for small bending radii less than 7.5 millimeters, the bending losses considerably increase and exceed the value of 1 dB for a winding of one turn. Such a conventional fiber, currently used for long distance transmissions, is therefore not very suited for an FFTH or FTTC application as it may neither be wound in a miniature box of an optical module nor be subject to possible accidental bendings related to the installation without inducing strong optical losses.

A second curve (3B) shows the bending losses of a fiber without any second depressed section. This fiber has a MAC of 8.2 and meets the criteria of the G.652 standard. It is noted that for small bending radii less than 7.5 millimeters, the bending losses are less than 1 dB/turn. On the other hand, the bending losses remain relatively significant for larger bending radii. Thus, the fiber has bending losses of the order of 0.5 dB for a winding of ten turns around a spool with a radius equal to 20 millimeters and of the order of 0.4 dB for a winding of 100 turns around a spool with a radius equal to 20 millimeters. These bending loss values for bending radii of 15 millimeters and 20 millimeters do not allow this fiber to be used in storage boxes with such winding radii.

A third curve (3C) shows the bending losses of a fiber as disclosed. The fiber corresponding to this curve has a MAC of 8.2 and meets the criteria of the G.652 standard. It is noted that for small bending radii, less than 7.5 millimeters, the bending losses are of the order of 0.4 dB/turn, less than the preferred maximum value of 0.5 dB/turn; and for a bending radius of 10 millimeters, the disclosed fiber has bending losses of the order of 0.2 dB/turn (i.e., the targeted upper limiting value). Also, for larger bending radii, bending losses remain limited; thus, for a bending radius of 15 millimeters, the fiber has bending losses of the order of 0.04 dB/10 turns, less than the preferred maximum value of 0.1 dB/10 turns; and for a bending radius of 20 millimeters, the disclosed fiber has bending losses of the order of 0.03 dB/100 turns, less than the preferred maximum value of 0.1 dB/100 turns.

A fourth curve (3D) shows the bending losses of another fiber according to U.S. Patent Application Publication No. US 2007/0280615 A1. The fiber corresponding to this curve has a MAC of 8.1 and meets the criteria of the G.652 standard. It is noted that for small bending radii less than 7.5 millimeters, the bending losses are of the order of 0.1 dB/turn, less than the preferred maximum value of 0.5 dB/turn; and for a bending radius of 10 millimeters, the disclosed fiber has bending losses of the order of 0.07 dB/turn, less than the preferred maximum value of 0.2 dB/turn. Also, for larger bending radii, the bending losses remain limited; thus, for a bending radius of 15 millimeters, the disclosed fiber has bending losses of the order of 0.04 dB/10 turns, less than the preferred maximum value of 0.1 dB/10 turns; and for a bending radius of 20 millimeters, the disclosed fiber has bending losses of the order of 0.01 dB/100 turns, less than the preferred maximum value of 0.1 dB/100 turns.

\* \* \*

Yet another exemplary bend-insensitive glass fiber for use in the present invention is disclosed in U.S. Patent Application Publication No. US 2008/0152288 A1 and its related U.S. Patent Application Ser. No. 11/999,333 for an Optical Fiber (Flammer et al.), now U.S. Pat. No. 7,555,186. As noted, each of these commonly assigned patent documents is incorporated by reference in its entirety. Combining (i) a bend-insensitive glass fiber having the refractive index profile as disclosed in U.S. Patent Application Publication No. US 2008/0152288 A1 and a coating according to the present invention can achieve optical fibers having exceptional reductions in microbend sensitivity.

The bend-insensitive glass fiber disclosed in U.S. Patent Application Publication No. US 2008/0152288 A1 (i.e., the "disclosed fiber") possesses (i) a core having a radius $r_1$ that includes at least two core dopants, wherein the core has a refractive index difference $\Delta n_1$ with an outer optical cladding (e.g., an external optical cladding); (ii) a first inner cladding (i.e., an intermediate cladding) having a radius $r_2$ and a refractive index difference $\Delta n_2$ with the outer cladding; and (iii) a depressed, second inner cladding (i.e., a depressed trench) having a radius $r_3$ and a refractive index difference $\Delta n_3$ with the outer cladding of less than $-3 \times 10^{-3}$; and wherein the radial concentration of at least one of the core dopants varies substantially continuously over the core region.

According to exemplary embodiments, the disclosed fiber may include one or more of the following additional features:
 The radial concentration of at least one of the core dopants varies continuously over the entire core region;
 The radial concentration of each of at least two core dopants varies continuously over the entire core region;
 The radial variation of at least one core dopant concentration is such that its first derivative is proportional to the radial power fraction P(r) of the optical signal transmitted in the optical fiber;

The optical fiber has, at a wavelength of 1550 nanometers, a spontaneous Brillouin spectrum width greater than or equal to 100 MHz;

The variation of at least one core dopant concentration corresponds to an refractive index variation greater than or equal to $1\times10^{-3}$;

The core dopants are selected from germanium (Ge), fluorine (F), phosphorus (P), aluminum (Al), chlorine (Cl), boron (B), nitrogen (N), and/or alkali metals;

One of the core dopants is germanium (Ge), the germanium concentration varying radially in the core between about 1 and 20 weight percent based upon the core's total composition (i.e., mass). In other words, at any position within the core, the germanium concentration ranges between 1 and 20 weight percent (i.e., a radial concentration of about 1-20 weight percent germanium).

One of the core dopants is fluorine (F), the fluorine concentration varying radially in the core between about 0.3 and 8 weight percent based upon the core's total composition (i.e., mass). In other words, at any position within the core, the fluorine concentration ranges between 0.3 and 8 weight percent (i.e., a radial concentration of about 0.3-8 weight percent fluorine).

One of the core dopants is phosphorus (P), the phosphorus concentration varying radially in the core between about 1 and 10 weight percent based upon the core's total composition (i.e., mass). In other words, at any position within the core, the phosphorus concentration ranges between 1 and 10 weight percent (i.e., a radial concentration of about 1-10 weight percent phosphorus).

The depressed, second inner cladding includes germanium in a radial concentration of between 0.5 weight percent and 7 weight percent based upon the second inner cladding's total composition (i.e., mass). Stated differently, at any position within the second inner cladding, the germanium concentration is between about 0.5 and 7 weight percent.

The refractive index difference $\Delta n_a$ between the second inner cladding and the outer cladding is greater than about $-15\times10^{-3}$;

The optical fiber has, at a wavelength of 1550 nanometers, an effective area greater than or equal to 50 µm²;

The optical fiber has, at a wavelength of 1550 nanometers, an attenuation less than or equal to 0.3 dB/km;

The optical fiber has, at a wavelength of 1625 nanometers, bending losses that are less than about 0.1 dB for a winding of ten turns around a bend radius of 15 millimeters; less than about 0.2 dB for a winding of one turn around a bend radius of 10 millimeters; and less than about 0.5 dB for a winding of one turn around a bend radius of 7.5 millimeters;

The optical fiber has, at a wavelength of 1550 nanometers, bending losses that are less than about 0.02 dB for a winding of ten turns around a bend radius of 15 millimeters; less than about 0.05 dB for a winding of one turn around a bend radius of 10 millimeters; and less than about 0.2 dB for a winding of one turn around a bend radius of 7.5 millimeters;

The optical fiber has, up to a wavelength of 1625 nanometers, microbending losses, measured by the so-called fixed diameter drum method, of 0.8 dB/km or less.

In one aspect (and with reference to FIG. 20), the bend-insensitive glass fiber disclosed in U.S. Patent Application Publication No. US 2008/0152288 A1, includes a core 11 (i.e., the central core region in which the optical signal to be transmitted is guided) and a cladding region for confining the optical signal in the core 11. The cladding region includes a first inner cladding 12, a depressed trench 13 (or depressed, second inner cladding), and an outer cladding 14 (e.g., an external optical cladding). The depressed trench 13 typically has a refractive index difference with the outer cladding 14 that is less than $-3\times10^{-3}$ (e.g., less than about $-15\times10^{-3}$).

The core region of the disclosed fiber includes at least two dopants, the concentrations of which, in effect, vary continuously over the entire radius of the core region. Typically, the substantially continuous variation in radial dopant concentration is progressive (e.g., increasing continuously in a radial direction) or regressive (e.g., decreasing continuously in a radial direction). That said, the radial dopant concentration can both increase and decrease in a radial direction.

The variation of the first dopant (e.g., germanium) is compensated by variation of the second dopant (e.g., fluorine) to obtain a predetermined refractive index profile of the core region. The core region remains longitudinally homogeneous along the optical fiber (i.e., concentrations of the core dopants are constant along the optical fiber's length).

As will be appreciated by those having ordinary skill in the art, depending on the application, the optical fiber has a target refractive index profile that is defined according to various parameters (i.e., mode field diameter, chromatic dispersion parameters, effective cut-off wavelength, and effective area).

Variation of dopant concentration in the optical fiber's radial direction, particularly in its core, broadens the Brillouin spectrum and thereby increases the Brillouin threshold. A smooth dopant variation ensures uniform mode power distribution for the different dopant concentrations and limits fiber losses. Use of at least two dopants in the optical fiber facilitates the achievement of a target refractive index profile and reduces the impact of SBS reduction on other optical parameters, particularly mode field diameter and chromatic dispersion parameters. The disclosed fiber possesses a refractive index profile that meets the aforementioned G.652 standard.

Figure 20:
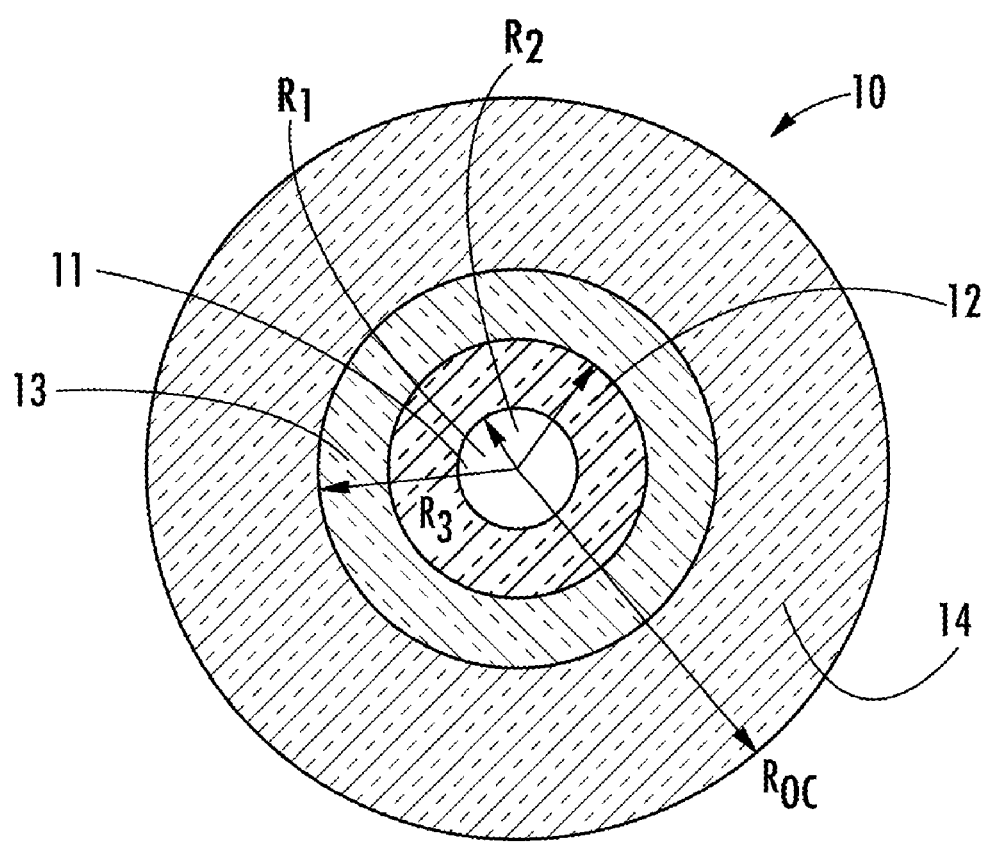
FIG. 20 schematically depicts a cross-section (not to scale) of an exemplary optical fiber.

FIG. 14 depicts a nominal refractive index profile of an exemplary single-mode transmission optical fiber. As schematically depicted in FIG. 20, the exemplary optical fiber 10 includes (i) a central core 11 having refractive index difference $\Delta n_1$ with an outer cladding 14; (ii) a first inner cladding 12 (i.e., an intermediate cladding) having a refractive index difference $\Delta n_e$ with the outer cladding 14; and (iii) a depressed trench 13 having an a refractive index difference $\Delta n_a$ with the outer cladding 14. The width of the core 11 is defined by its radius $r_1$ and the widths of the claddings by their respective outer radii $r_2$ and $r_3$.

To define a nominal refractive index profile for an optical fiber, the index of the outer cladding is generally taken as a reference. The index values of the central core and of the claddings are then provided as index differences (i.e., $\Delta n_{1,2,3}$) with the outer cladding. Generally, the outer cladding is formed of silica, but may be doped to increase or reduce its refractive index, such as to modify the signal propagation characteristics.

Each section of the refractive index profile of the optical fiber can therefore be defined using integrals that associate the variations in refractive indexes with the radius of each fiber section. See FIG. 20.

Three integrals thus can be defined for the optical fiber, which represent the core surface $I_1$, the surface of the first inner cladding $I_2$ and the surface of the depressed, second inner cladding $I_3$ In this regard, the expression "surface" is not to be interpreted geometrically (i.e., structurally) but should be understood instead to describe the area under the curve (i.e., $r \cdot \Delta n$) such as depicted in FIG. 14.

These three integrals can be expressed as follows:

$$I_1 = \int_0^{r_1} \Delta n(r) \cdot dr \approx r_1 \times \Delta n_1$$

$$I_2 = \int_{r_1}^{r_2} \Delta n(r) \cdot dr \approx (r_2 - r_1) \times \Delta n_2$$

$$I_3 = \int_{r_2}^{r_3} \Delta n(r) \cdot dr \approx (r_3 - r_2) \times \Delta n_3$$

Table 7 (below) gives the limit values of radii and refractive index differences, and the limit values of the integral $I_1$ that are required so that the optical fiber shows reduced bending losses and microbending losses while meeting the optical propagation criteria of standard G.652 for transmission fibers. The values provided in Table 7 are the nominal profiles of exemplary optical fibers.

TABLE 7

|  | $r_1$ (μm) | $r_2$ (μm) | $r_3$ (μm) | $r_1/r_2$ | $\Delta n_1$ ($10^{-3}$) | $\Delta n_2$ ($10^{-3}$) | $\Delta n_3$ ($10^{-3}$) | $\Delta n_1 - \Delta n_2$ ($10^{-3}$) | $I_1$ (μm · $10^{-3}$) |
|---|---|---|---|---|---|---|---|---|---|
| Min | 3.5 | 7.5 | 12.0 | 0.27 | 4.2 | −1.2 | −15 | 3.9 | 17 |
| Max | 4.5 | 14.5 | 25.0 | 0.5 | 6.2 | 1.2 | −3 | 5.9 | 24 |

The integral $I_1$ of the central core influences the shape and size of the fundamental propagation mode of the signal in the optical fiber. An integral value for the central core of between $17 \times 10^{-3}$ microns and $24 \times 10^{-3}$ microns makes it possible in particular to maintain a mode field diameter that is compatible with the G.652 standard. In addition, the depressed trench $\Delta n_3$ makes it possible to improve bending losses and microbending losses in SSMF.

The core region of the disclosed fiber includes at least two dopants whose respective concentrations vary substantially continuously over essentially the entire core region while maintaining the core region's pre-determined refractive index profile. Those having ordinary skill in the art will appreciate that radial dopant concentration might be unchanged over small increments (i.e., radial segments). That said, as a practical matter, radial dopant concentration typically varies continuously over the core radius. See FIGS. 21b-21c.

As noted, this allows broadening the Brillouin spectrum and thereby increases the Brillouin threshold. Because the dopant concentration variation is compensated so as to keep a pre-determined refractive index profile, notably in the core region, the optical propagation criteria of the G.652 standard are not jeopardized by the presence of at least two dopants in the core. Moreover, the first inner cladding ($\Delta n_2$, $r_2$) ensures that the optical power remains in the core region without the depressed trench ($\Delta n_3$, $r_3$) adversely impacting optical power throughput.

For a signal propagating at a wavelength of 1550 nanometers, the disclosed fiber has a spontaneous Brillouin spectrum width that is at least about 100 MHz. Such a broadened Brillouin spectrum effectively increases the Brillouin threshold by at least a factor of two (or by about three dB in logarithmic scale) as compared to a standard single mode fiber (SSMF). The disclosed fiber achieves a much higher Brillouin threshold compared to standard transmission fibers with limited fiber loss (e.g., less than 0.3 dB/km at a wavelength of 1550 nanometers) without significant change to the optical transmission parameters.

The first core dopant (e.g., germanium) is chosen to achieve strong and continuous variations in density and elasticity in the fiber material. According to one embodiment, the radial distribution of the first dopant concentration $C_d(r)$ is such that its first derivative is proportional to the radial power fraction P(r) of the optical signal transmitted in the fiber in accordance with the following equation (in which α is a constant):

$$\frac{dC_d(r)}{dr} = \alpha \cdot P(r)$$

This radial power fraction P(r) is expressed in watt per meters, the integral of which is equal to the total transmitted power P according to the following relationship:

$$\int P(r)dr = P$$

According to another embodiment, the depressed trench (i.e., the second inner cladding) can include germanium at a concentration of between about 0.5 and 7 weight percent, typically in a concentration of less than about 1.5 weight percent (e.g., between about 0.5 and 1.5 weight percent), even if the index needs to be less than $-3 \times 10^{-3}$. The presence of germanium in the depressed trench modifies the viscosity of silica and the depressed trench's elasto-optical coefficient, thereby improving microbending sensitivity.

Figure 21A:
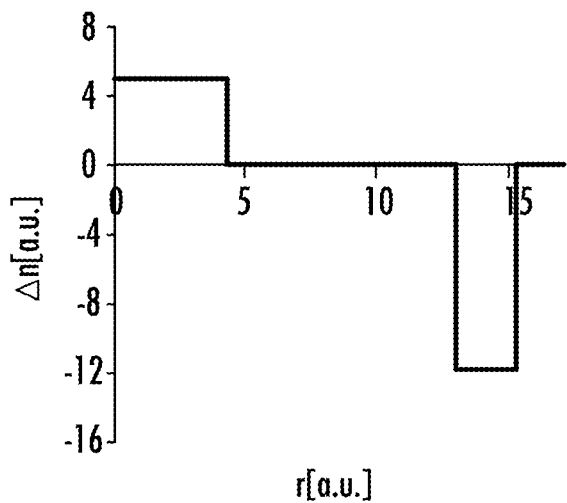
FIG. 21a depicts a reference refractive index profile of an exemplary optical fiber.
Figure 21B:
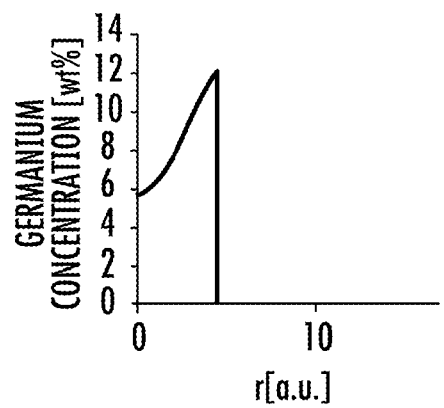
Figure 21C:
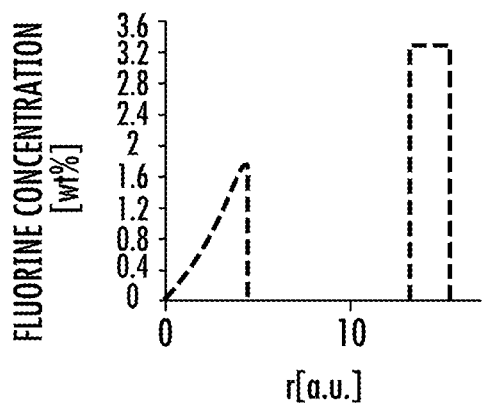

FIGS. 21a, 21b, and 21c relate to an exemplary optical fiber as disclosed. The optical fiber of FIGS. 21a-21c possesses a step-core profile. The core has a given constant refractive index value; the depressed trench is separated from the core by an intermediate inner cladding (i.e., the first inner cladding). FIG. 21a illustrates the exemplary optical fiber's refractive index profile using arbitrary units.

Turning to FIG. 21b and FIG. 21c, the core region of the fiber includes a first dopant, germanium (Ge), which is known to increase the value of the refractive index of silica, and a second dopant, fluorine (F), which is known to decrease the value of the refractive index of silica. FIG. 21b and FIG. 21c illustrate dopant concentrations in weight percent. The concentration of at least one of the core dopants varies essentially continuously over the entire core region.

With respect to the exemplary optical fiber depicted in FIGS. 21a, 21b, and 21c, both dopants vary continuously (and progressively) over the entire core region. The use of at least two dopants ensures that the core refractive index profile is maintained to a nominal profile such to achieve desirable optical transmission characteristics. Indeed, because the second dopant can compensate for the refractive index variation introduced by the variation of concentration of the first dopant, a target refractive index profile can be achieved.

The variation of at least one core dopant concentration introduces density and elasticity variation in the optical fiber section that broadens the Brillouin spectrum and thereby increases the Brillouin threshold. The variation of core dopant concentration should be large enough to introduce sufficient density and elasticity variation in order to reduce SBS.

The inventors have achieved satisfactory results if at least one of the core dopants has a concentration variation over the entire core region that corresponds to a refractive index variation that is at least about $1\times10^{-3}$ (i.e., variation in core dopant concentration sufficient to achieve this refractive index variation if not compensated by another core dopant). In other words, the variation in first dopant concentration (i.e., between the maximum and minimum radial dopant concentrations) should be such that, without compensation by a second dopant, a refractive index variation of at least about $1\times10^{-3}$ would be achieved in the core.

As schematically depicted in FIGS. 21b-21c, the germanium concentration varies progressively from 5.8 weight percent to 12 weight percent, and the fluorine concentration varies progressively from 0.1 weight percent to 1.7 weight percent.

The smooth and regular variation of dopant concentration ensures uniform mode power distribution for the different dopant concentration and limits fiber losses. Simulations performed on an optical fiber exemplified in FIGS. 21a, 21b, and 21c gives, at a signal wavelength of 1550 nanometers, a spontaneous Brillouin spectrum width larger than 100 MHz and an increased SBS threshold power (i.e., increased by at least a factor of two compared as compared to a standard single mode fiber), and a limited Rayleigh loss increase of about 0.013 dB/km. Despite this Rayleigh loss increase, the disclosed fiber maintains compliance with the G.652 standard, having attenuation losses of less than about 0.3 dB/km at 1550 nanometers.

As noted, FIGS. 21a, 21b, and 21c represent one example of the disclosed fiber. Dopants other than germanium (Ge) and fluorine (F) can be used to achieve an optical fiber with reduced SBS. In this regard, the core region includes at least two dopants that may be selected from germanium (Ge), fluorine (F), phosphorus (P), aluminum (Al), chlorine (Cl), boron (B), nitrogen (N), and/or alkali metals. To the extent one of the core dopants is germanium (Ge), the concentration typically falls between about one and 20 weight percent; to the extent one of the core dopants is fluorine (F), the concentration is typically less than ten weight percent (e.g., between about 0.3 and eight weight percent); to the extent one of the core dopants is phosphorus (P) the concentration typically falls between about one and ten weight percent.

The exemplary optical fiber represented in FIGS. 21a-21c possesses a depressed trench to reduce its sensitivity to bending losses. The disclosed fiber therefore combines low bending losses and high Brillouin threshold.

Conventionally, starting from the teaching of J. Botineau et al. in "Effective Stimulated Brillouin Gain in Single Mode Optical Fibers," Electronics Letters, Vol. 31, No. 23 (1995), one having ordinary skill in the art would choose a refractive index profile with triangular shape or parabolic shape to increase the Brillouin threshold and might apply an external trench to reduce bending losses. This conventional approach, however, renders compliance with the G.652 specifications difficult.

Figure 22:
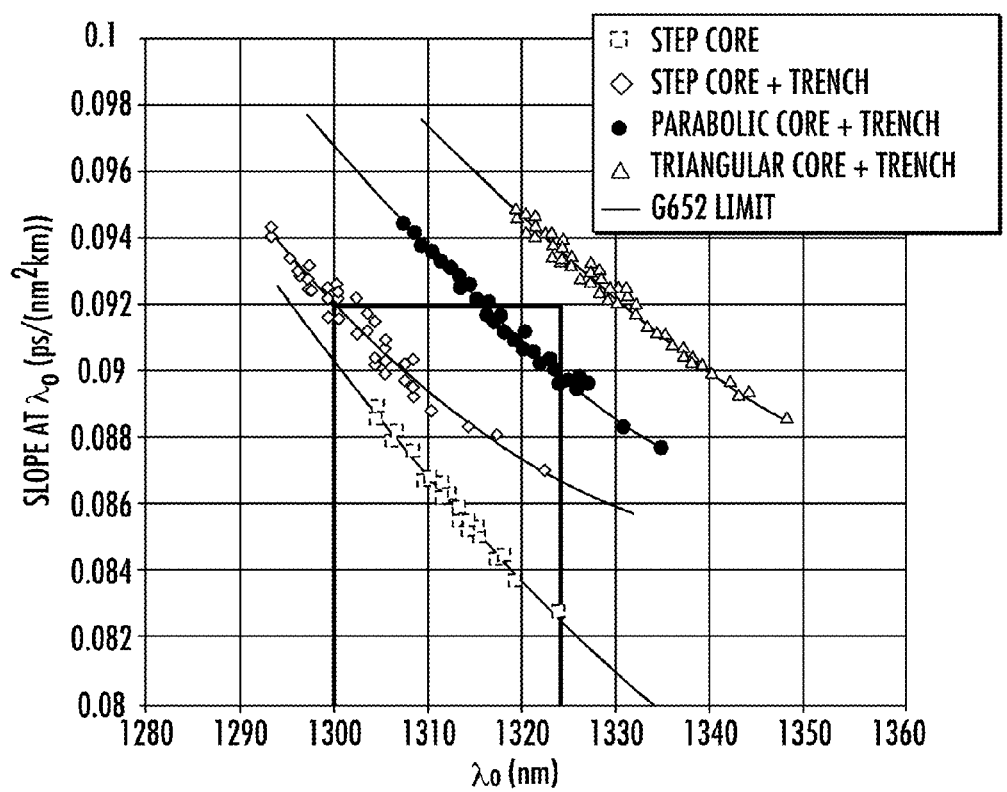
FIG. 22 depicts dispersion characteristics for four different kinds of optical fibers.

FIG. 22 compares four different kinds of refractive index profile shapes: a typical step refractive index profile without trench (i.e., SSMF); a step-core refractive index profile with a trench in the cladding (e.g., the optical fiber of FIGS. 21a-21c); a triangular core refractive index profile with a trench in the cladding; and a parabolic core profile with a trench in the cladding. For each, numerous refractive index profiles with different core diameter and maximum dopant level were simulated.

FIG. 22 depicts the zero dispersion wavelength $\lambda_0$ and the slope of the dispersion at the zero dispersion wavelength. The rectangle area indicates the parameters of the G.652 specifications for those optical characteristics. Fiber profiles having too high cut-off wavelengths and non-conforming nominal mode-field diameter at 1310 nanometers so as to be non-compliant with the G.652 specifications were omitted.

FIG. 22 shows that adding a depressed trench to a SSMF profile restricts the profile flexibility for production and thus increases fiber rejection rate. Using a triangular core refractive index profile with a trench in the cladding results in optical fibers that do not meet the G.652 requirements. A parabolic core refractive index profile with a trench in the cladding does yields some optical fibers within the G.652 specifications, but the zone of tolerance is narrow and many rejects would be expected.

The bend-insensitive glass fiber disclosed in U.S. Patent Application Publication No. US 2008/0152288 A1 achieves reduced bending and microbending losses, as well as a much higher Brillouin threshold, compared to standard transmission optical fibers. The disclosed fiber may be used in a receiver module of a FTTH system or in a transmitter module to input high power signals into a telecommunication system, or in a high bit-rate long-haul optical transmission cable, with reduced optical losses. Moreover, the disclosed fiber is compatible with marketed systems as it meets standard G.652.

In one embodiment, the disclosed fiber exhibits, at a wavelength of 1310 nanometers, a chromatic dispersion slope of 0.092 ps/(nm$^2$·km) or less; a cancellation of chromatic dispersion at a wavelength of between 1300 and 1324 nanometers; and a cabled cut-off wavelength of 1260 nanometers or less.

In another embodiment, the disclosed fiber has, at a wavelength of 1550 nanometers, an effective area superior or equal to 50 µm$^2$, typically 80 µm$^2$, and attenuation at 1550 nanometers of less than or equal to 0.3 dB/km. Such optical fiber according to this embodiment is suitable for use in data transmission in telecommunication systems.

In this regard, an exemplary optical transmission system may include an optical transmitter emitting optical signals in a predetermined range of wavelength, a transmission optical fiber, and an optical receiver receiving the optical signal with improved signal-to-noise ratio (SNR) due to reduced SBS and limited increase in fiber losses (e.g., attenuation). As compared to conventional systems, the optical transmitter may input into the optical fiber an optical signal with higher power, the Brillouin threshold power for the transmission optical fiber being increased by at least a factor of two compared with a conventional SMF.

In yet another embodiment, the disclosed fiber has, at a wavelength of 1625 nanometers, improved bending losses as follows: less than about 0.1 dB for a winding of ten turns around a bend radius of 15 millimeters; less than about 0.2 dB for a winding of one turn around a bend radius of ten millimeters; and less than about 0.5 dB for a winding of one turn around a bend radius of 7.5 millimeters.

Likewise, the disclosed fiber has, at a wavelength of 1550 nanometers, improved bending losses as follows: less than about 0.02 dB for a winding of ten turns around a bend radius of 15 millimeters; less than about 0.05 dB for a winding of one turn around a bend radius of ten millimeters; and less than about 0.2 dB for a winding of one turn around a bend radius of 7.5 millimeters.

Moreover, for wavelengths of up to 1625 nanometers, the disclosed fiber demonstrates microbending losses of less than about 0.8 dB/km measured by the so-called fixed diameter drum method. Accordingly, such optical fiber is suitable for implementation in optical modules or storage boxes for use in FTTH or FTTC systems.

* * *

Yet another exemplary bend-insensitive glass fiber for use in the present invention is disclosed in U.S. patent application No. 61/112,006 for a Bend-Insensitive Single-Mode Optical Fiber (de Montmorillon et al.) and its related patent application Ser. No. 12/436,423, published as U.S. Patent Application Publication No. US 2009/0279835 A1, now U.S. Pat. No. 8,145,025. As noted, each of these commonly assigned patent documents is incorporated by reference in its entirety. Combining (i) a bend-insensitive glass fiber having the refractive index profile as disclosed in U.S. Patent Application No. 61/112,006 and coating according to the present invention can achieve optical fibers having virtually negligible sensitivity to microbend-inducing stresses.

The bend-insensitive glass fiber disclosed in U.S. Patent Application No. 61/112,006 (i.e., the "disclosed fiber") includes a central core, an intermediate cladding, and a depressed trench. The refractive index profile is optimized to improve the bending losses by a factor of ten relative to the constraints imposed by the G.657B standard, while retaining a mode field diameter compatible with the G.652 standard and ensuring a sufficient attenuation of the LP11 mode.

In particular, the surface of the core, as well as the surface and the volume of the depressed trench, are optimized to improve the bending losses considerably. The surface of the core or the surface of the depressed trench should not extend geometrically but should correspond to values taking two dimensions into account—the product of the radius and the index difference. Similarly, the volume of the depressed trench corresponds to a value taking three dimensions into account—the product of the square of the radius and the index difference.

The disclosed fiber includes, from its center toward its periphery, a central core, an intermediate cladding, a depressed trench, and an external optical cladding. The central core has a radius $r_1$ and a positive index difference $\Delta n_1$ with the external optical cladding. The intermediate cladding has a radius $r_2$ and a positive index difference $\Delta n_2$ with the external optical cladding. The difference $\Delta n_2$ is less than the index difference $\Delta n_1$ of the core. The depressed trench has a radius $r_3$ and a negative index difference $\Delta n_3$ with the external optical cladding. The disclosed fiber is further characterized in that it has (i) a mode field diameter (MFD) between 8.6 microns and 9.5 microns at a wavelength of 1310 nanometers and (ii) bending losses less than $0.25 \times 10^{-3}$ dB/turn for a radius of curvature of 15 millimeters and a wavelength of 1550 nanometers. The length of fiber required for the attenuation of the LP11 mode to reach 19.3 dB at a wavelength of 1260 nanometers is less than 90 meters.

According to one fiber embodiment, the surface integral of the central core ($V_{01}$), defined as $$V_{01} = \int_0^{r_1} \Delta n(r) \cdot dr \approx r_1 \times \Delta n_1,$$

is between $20.0 \times 10^{-3}$ microns and $23.0 \times 10^{-3}$ microns. The surface integral of the depressed trench ($V_{03}$), defined as $$V_{03} = \int_{r_2}^{r_3} \Delta n(r) \cdot dr \approx (r_3 - r_2) \times \Delta n_3,$$

is between $-55.0 \times 10^{-3}$ microns and $-30.0 \times 10^{-3}$ microns. The volume integral of the depressed trench ($V_{13}$), defined as, $$V_{13} = 2 \cdot \int_{r_2}^{r_3} \Delta n(r) \cdot r \cdot dr \approx (r_3^2 - r_2^2) \times \Delta n_3,$$

is between $-1200 \times 10^{-3}$ µm² and $-750 \times 10^{-3}$ µm².

In preferred embodiments, the fiber has physical properties and operational parameters with improved resistance to bending losses. For instance, the fiber has an effective cut-off wavelength $\lambda_{ceff}$ greater than 1350 nanometers, the effective cut-off wavelength being measured as the wavelength at which the optical signal becomes single mode after propagation over two meters of fiber. The fiber has, for a wavelength of 1550 nanometers, bending losses less than or equal to $7.5 \times 10^{-3}$ dB/turn for a radius of curvature of 10 millimeters, bending losses less than or equal to 0.05 dB/turn for a radius of curvature of 7.5 millimeters, and bending losses less than 0.15 dB/turn for a radius of curvature of 5 millimeters.

The fiber disclosed herein also shows reduced bending losses at higher wavelengths. For example, at a wavelength of 1625 nanometers, the fiber has bending losses less than $1.5 \times 10^{-3}$ dB/turn for a radius of curvature of 15 millimeters, bending losses less than or equal to $25 \times 10^{-3}$ dB/turn for a radius of curvature of 10 millimeters, bending losses less than or equal to 0.08 dB/turn for a radius of curvature of 7.5 millimeters, and bending losses less than 0.25 dB/turn for a radius of curvature of 5 millimeters. Accordingly, in a preferred embodiment, the fiber has a cut-off wavelength between 1300 nanometers and 1400 nanometers, with the cutoff wavelength measured as the wavelength at which the optical signal is no longer single mode after propagation over 5 meters of fiber. Cut-off wavelength is distinguished from cable cut-off, measured as the wavelength at which the attenuation of the LP11 mode is greater than or equal to 19.3 dB after propagation over 22 meters of fiber. The fiber has a cable cut-off wavelength between 1250 nanometers and 1300 nanometers.

A third measurement at issue here is the theoretical cut-off wavelength measured as the wavelength from which the LP11 mode is propagated in leaky mode. In one embodiment, the fiber has a theoretical cut-off wavelength less than or equal to 1250 nanometers. The fiber has an attenuation of the LP11 mode greater than 5 dB after propagation over 22 meters of fiber at a wavelength of 1260 nanometers.

The operational parameters described above result from preferred physical properties of the fiber. In one embodiment, the central core of the fiber has a radius between 3.8 microns and 4.35 µm; the intermediate cladding has a radius between 8.5 microns and 9.7 µm; the depressed trench has a radius between 13.5 microns and 16 µm, which can be less than or equal to 15 µm, and the central core has an index difference with the external optical cladding between $5.3 \times 10^{-3}$ and $5.7 \times 10^{-3}$.

As noted above, the refractive index profile of a fiber is plotted in terms of the difference between refractive index values at points on the radius of the fiber and the external optical cladding. The intermediate cladding has an index difference with the optical cladding between $0.1 \times 10^{-3}$ and $0.6 \times 10^{-3}$. The depressed trench has an index difference with the optical cladding between $-10.0 \times 10^{-3}$ and $-5.0 \times 10^{-3}$. The fiber has a zero chromatic dispersion wavelength between 1300 nanometers and 1324 nanometers; the fiber has a chromatic dispersion slope value at the zero chromatic dispersion wavelength of less than 0.092 ps/(nm²·km).

Figure 23:
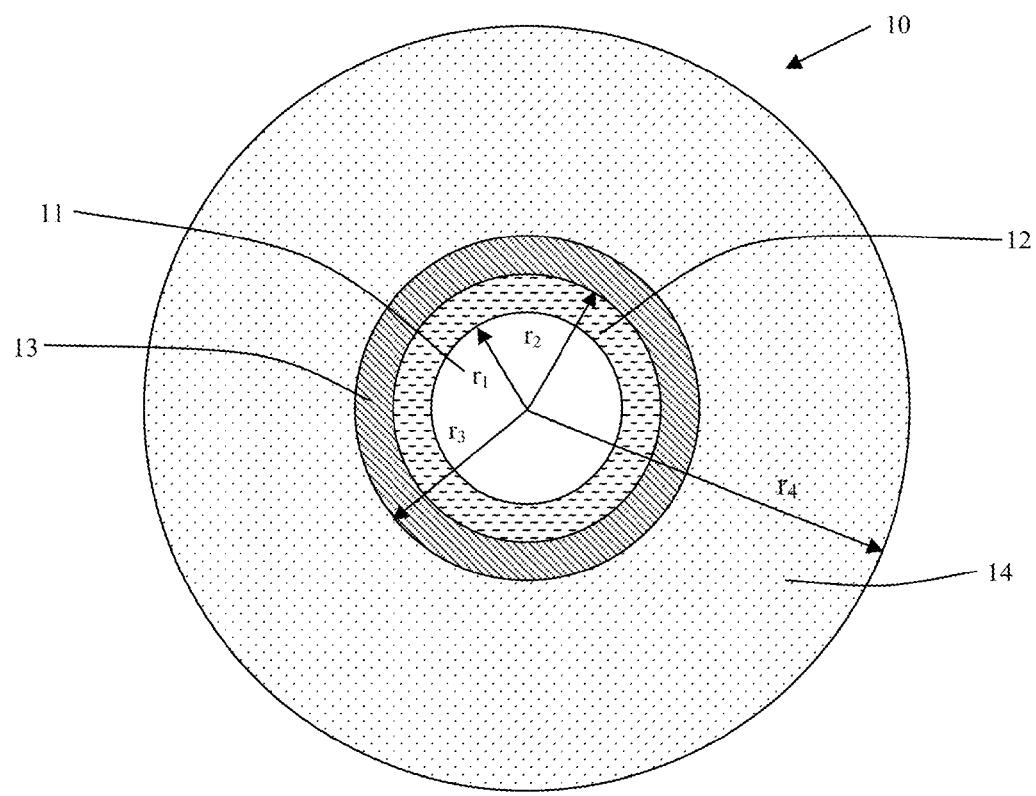
FIG. 23 depicts a cross section of a single-mode fiber with cladding layers at respective radii extending from the center.

As depicted in FIG. 23, the bend-insensitive glass fiber (10) disclosed in U.S. Patent Application No. 61/112,006 has a central core (11), an intermediate cladding (12) and a depressed cladding (13). For purposes herein, depressed cladding means a radial portion of the fiber (10) having a refractive index less than the index of the external optical cladding (14). Typically, the central core (11), the intermediate cladding (12), and the depressed cladding (13) are obtained by chemical vapor deposition in a silica tube. The external optical cladding (14) includes the silica tube and the overcladding on the tube. In preferred embodiments, the overcladding is generally natural or doped silica, but can also be obtained by any other deposition technique ((vapor axial deposition ("VAD") or outside vapor deposition ("OVD")).

FIG. 24 illustrates a refractive index profile for the transmission fiber (10) of FIG. 23. The profile of FIG. 24 is a set profile, i.e., representative of the theoretical profile of the fiber, but the fiber actually obtained after fiber drawing of a preform may have a slightly different profile.

In a manner known in the art per se, an optical fiber (10) is obtained by preform drawing. By way of example, the preform may be a very high-quality glass tube (pure silica) which eventually forms part of the external optical cladding (14). The external optical cladding (14) surrounds the central core (11) and the internal claddings (12, 13) of the fiber (10). This tube can then be overcladded to increase its diameter before going through the fiber-drawing operation on a fiber-drawing tower. For the production of the preform, the tube is generally mounted horizontally and held at both ends by glass bars on a lathe; then the tube is rotated and heated locally for the deposition process determining the composition of the preform. This composition determines the optical characteristics of the future fiber.

The fiber includes a central core (11) having an index difference $\Delta n_1$ with an external cladding (14) functioning as an optical cladding. The fiber (10) further includes an intermediate cladding (12) having an index difference $\Delta n_2$ with the external optical cladding (14) and a depressed trench cladding (13) having an index difference $\Delta n_3$ with the external optical cladding (14). The refractive indexes in the central core (11), the intermediate cladding (12) and the depressed trench (13) are substantially constant throughout their respective widths, as set forth in FIG. 24. FIG. 23 illustrates that the width of the core (11) is defined by its radius $r_1$ and the width of the claddings by their respective external radii, $r_2$, and $r_3$. The external optical cladding is denoted as $r_4$.

In order to define a set refractive index profile for an optical fiber, the index value of the external optical cladding is generally taken as a reference ($n_g$). The index values of the central core (11), the intermediate cladding (12), and the depressed trench cladding (13) are then presented in FIG. 24 as index differences $\Delta n_{1,2,3}$. Generally, the external optical cladding (14) is composed of silica but this cladding can be doped to increase or reduce its refractive—index for example, to modify the propagation characteristics of the signal.

Each fiber profile section shown in FIG. 24 (21-24) can also be defined on the basis of integrals that link the index variations with the radius of each section of the fiber (10). It is thus possible to define three surface integrals for the disclosed fiber (10), representative of the surface of the core $V_{01}$, the surface of the intermediate cladding $V_{02}$ and the surface of the depressed trench $V_{03}$. The expression "surface" is not to be understood geometrically but corresponds to a value taking two dimensions into account.

These three surface integrals can be expressed as follows:

$$V_{01} = \int_0^{r_1} \Delta n(r) \cdot dr \approx r_1 \times \Delta n_1$$

$$V_{02} = \int_{r_1}^{r_2} \Delta n(r) \cdot dr \approx (r_2 - r_1) \times \Delta n_2$$

$$V_{03} = \int_{r_2}^{r_3} \Delta n(r) \cdot dr \approx (r_3 - r_2) \times \Delta n_3.$$

Similarly, it is possible to define three volume integrals for the disclosed fiber (10), representative of the volume of the core $V_{11}$, the volume of the intermediate cladding $V_{12}$ and the volume of the depressed trench $V_{13}$. The expression "volume" is not to be understood geometrically but corresponds to a value taking three dimensions into account. These three volume integrals can be expressed as follows:

$$V_{11} = 2 \cdot \int_0^{r_1} \Delta n(r) \cdot r \cdot dr \approx r_1^2 \times \Delta n_1$$

$$V_{12} = 2 \cdot \int_{r_1}^{r_2} \Delta n(r) \cdot r \cdot dr \approx (r_2^2 - r_1^2) \times \Delta n_2$$

$$V_{13} = 2 \cdot \int_{r_2}^{r_3} \Delta n(r) \cdot r \cdot dr \approx (r_3^2 - r_2^2) \times \Delta n_3.$$

Table 8 (below) shows 30 examples of fiber profiles according to preferred embodiments in comparison with three SSMF fiber profiles and one fiber profile corresponding to the G.657A and G.657B standards (noted as "BIF" for Bend Insensitive Fiber). As noted, Draka Comteq markets bend-insensitive optical fibers having excellent resistance to bending losses under the trade name BendBright[XS]®. The values in the tables correspond to the set profiles for each fiber.

The first column of Table 8 assigns a reference to each example; the next three columns give the values of the radii of the core (11), the intermediate cladding (12), and the depressed trench (13), respectively. The next three columns give the corresponding values of the index differences with the external optical cladding (14). The index values are measured at a wavelength of 633 nanometers. Table 8 also shows the surface integral and volume integral values of the core (11), the intermediate cladding (12) and the depressed trench (13), as defined above.

TABLE 8

| | $r_1$ (μm) | $r_2$ (μm) | $r_3$ (μm) | $Dn_1$ [$10^{-3}$] | $Dn_2$ [$10^{-3}$] | $Dn_3$ [$10^{-3}$] | $V_{01}$ (μm) [$10^{-3}$] | $V_{02}$ (μm) [$10^{-3}$] | $V_{03}$ (μm) [$10^{-3}$] | $V_{11}$ (μm$^2$) [$10^{-3}$] | $V_{12}$ (μm$^2$) [$10^{-3}$] | $V_{13}$ (μm$^2$) [$10^{-3}$] |
|---|---|---|---|---|---|---|---|---|---|---|---|---|
| BIF | 3.93 | 9.38 | 14.72 | 5.26 | 0.13 | −5.01 | 20.7 | 0.7 | −26.8 | 81.1 | 9.4 | −645 |
| SSMF1 | 4.35 | 13.92 | | 5.00 | −0.20 | | 21.8 | −1.9 | 0.0 | 94.6 | −35.0 | 0 |
| SSMF2 | 4.51 | 13.92 | | 5.00 | −0.20 | | 22.5 | −1.9 | 0.0 | 101.5 | −34.7 | 0 |
| SSMF3 | 4.55 | 13.92 | | 5.24 | −0.20 | | 23.8 | −1.9 | 0.0 | 108.4 | −34.6 | 0 |
| Ex1 | 3.97 | 9.38 | 14.25 | 5.56 | 0.11 | −9.74 | 22.1 | 0.6 | −47.4 | 87.7 | 8.3 | −1120 |
| Ex2 | 3.98 | 8.65 | 13.83 | 5.52 | 0.21 | −9.56 | 22.0 | 1.0 | −49.5 | 87.3 | 12.6 | −1113 |
| Ex3 | 4.01 | 8.95 | 14.39 | 5.38 | 0.20 | −9.27 | 21.6 | 1.0 | −50.4 | 86.5 | 13.1 | −1177 |

TABLE 8-continued

|      | $r_1$ (μm) | $r_2$ (μm) | $r_3$ (μm) | $Dn_1$ [$10^{-3}$] | $Dn_2$ [$10^{-3}$] | $Dn_3$ [$10^{-3}$] | $V_{01}$ (μm) [$10^{-3}$] | $V_{02}$ (μm) [$10^{-3}$] | $V_{03}$ (μm) [$10^{-3}$] | $V_{11}$ (μm$^2$) [$10^{-3}$] | $V_{12}$ (μm$^2$) [$10^{-3}$] | $V_{13}$ (μm$^2$) [$10^{-3}$] |
|------|------|------|-------|------|------|-------|------|-----|-------|------|------|-------|
| Ex4  | 3.98 | 8.77 | 13.79 | 5.56 | 0.33 | −9.25 | 22.1 | 1.6 | −46.5 | 87.9 | 19.9 | −1049 |
| Ex5  | 3.90 | 8.70 | 14.31 | 5.58 | 0.44 | −7.93 | 21.8 | 2.1 | −44.5 | 84.8 | 26.6 | −1024 |
| Ex6  | 4.03 | 9.17 | 14.04 | 5.45 | 0.21 | −9.62 | 21.9 | 1.1 | −46.8 | 88.3 | 14.0 | −1087 |
| Ex7  | 4.04 | 8.61 | 14.39 | 5.56 | 0.15 | −7.05 | 22.4 | 0.7 | −40.7 | 90.5 | 8.7  | −937  |
| Ex8  | 3.83 | 8.94 | 13.92 | 5.69 | 0.52 | −8.51 | 21.8 | 2.6 | −42.4 | 83.7 | 33.8 | −969  |
| Ex9  | 4.01 | 8.97 | 14.39 | 5.38 | 0.39 | −8.45 | 21.6 | 1.9 | −45.8 | 86.4 | 25.1 | −1071 |
| Ex10 | 3.84 | 9.30 | 14.38 | 5.49 | 0.48 | −9.38 | 21.1 | 2.6 | −47.7 | 81.0 | 34.2 | −1129 |
| Ex11 | 3.82 | 9.01 | 13.55 | 5.67 | 0.57 | −9.63 | 21.7 | 2.9 | −43.7 | 82.8 | 37.7 | −986  |
| Ex12 | 4.03 | 8.84 | 14.28 | 5.30 | 0.11 | −9.52 | 21.3 | 0.5 | −51.8 | 85.9 | 6.6  | −1197 |
| Ex13 | 3.96 | 8.61 | 13.86 | 5.58 | 0.31 | −7.87 | 22.1 | 1.4 | −41.3 | 87.6 | 17.9 | −928  |
| Ex14 | 3.92 | 8.78 | 13.84 | 5.55 | 0.32 | −8.75 | 21.7 | 1.5 | −44.3 | 85.2 | 19.7 | −1002 |
| Ex15 | 3.88 | 9.09 | 14.35 | 5.62 | 0.34 | −7.84 | 21.8 | 1.8 | −41.2 | 84.5 | 23.1 | −965  |
| Ex16 | 4.02 | 9.65 | 14.35 | 5.37 | 0.14 | −9.72 | 21.6 | 0.8 | −45.7 | 86.7 | 10.6 | −1097 |
| Ex17 | 4.01 | 9.19 | 14.39 | 5.32 | 0.36 | −8.74 | 21.3 | 1.9 | −45.4 | 85.6 | 24.9 | −1072 |
| Ex18 | 3.93 | 9.30 | 14.48 | 5.30 | 0.51 | −7.76 | 20.8 | 2.7 | −40.1 | 81.7 | 36.0 | −955  |
| Ex19 | 3.93 | 9.26 | 13.53 | 5.34 | 0.51 | −9.74 | 21.0 | 2.7 | −41.6 | 82.3 | 36.0 | −949  |
| Ex20 | 3.93 | 9.25 | 13.53 | 5.31 | 0.50 | −9.93 | 20.8 | 2.7 | −42.5 | 81.9 | 35.3 | −967  |
| Ex21 | 3.93 | 9.28 | 14.47 | 5.31 | 0.53 | −7.51 | 20.9 | 2.8 | −39.0 | 82.0 | 37.5 | −926  |
| Ex22 | 3.93 | 8.50 | 15.00 | 5.48 | 0.50 | −5.00 | 21.5 | 2.3 | −32.5 | 84.6 | 28.4 | −764  |
| Ex23 | 3.93 | 9.25 | 13.65 | 5.37 | 0.50 | −9.90 | 21.1 | 2.7 | −43.5 | 83.0 | 35.1 | −997  |
| Ex24 | 3.93 | 8.50 | 15.50 | 5.33 | 0.51 | −5.00 | 21.0 | 2.3 | −35.0 | 82.4 | 28.8 | −840  |
| Ex25 | 3.93 | 9.27 | 13.65 | 5.31 | 0.52 | −9.80 | 20.9 | 2.8 | −42.9 | 82.1 | 36.9 | −983  |
| Ex26 | 3.94 | 8.50 | 15.00 | 5.43 | 0.50 | −5.00 | 21.4 | 2.3 | −32.5 | 84.3 | 28.6 | −764  |
| Ex27 | 3.94 | 9.25 | 13.54 | 5.30 | 0.56 | −9.87 | 20.9 | 3.0 | −42.3 | 82.3 | 39.2 | −964  |
| Ex28 | 3.94 | 9.26 | 13.50 | 5.33 | 0.51 | −9.88 | 21.0 | 2.7 | −41.9 | 82.8 | 35.5 | −954  |
| Ex29 | 3.95 | 9.29 | 13.91 | 5.30 | 0.50 | −8.93 | 20.9 | 2.7 | −41.2 | 82.6 | 35.4 | −957  |
| Ex30 | 3.93 | 8.50 | 15.50 | 5.32 | 0.57 | −5.00 | 20.9 | 2.6 | −35.0 | 82.1 | 32.2 | −840  |

The disclosed fiber (10) is a step-index fiber comprising a central core (11), an intermediate cladding (12) and a depressed trench (13). It is noted from Table 8 that the central core (11) has a radius $r_1$ between 3.8 microns and 4.35 microns and preferably between 3.8 microns and 4.05 μm, i.e., narrower than the core of an SSMF fiber. The fiber (10) has an index difference $\Delta n_1$ (21) with the external optical cladding (14) between $5.3 \times 10^{-3}$ and $5.7 \times 10^{-3}$, i.e., greater than an SSMF fiber. The surface integral of the core $V_{01}$ is between $20.0 \times 10^{-3}$ microns and $23.0 \times 10^{-3}$ μm, and the volume integral of the core $V_{11}$ is between $81 \times 10^{-3}$ μm$^2$ and $91 \times 10^{-3}$ μm$^2$.

It is also noted from Table 8 that the disclosed fiber has a depressed trench (13). The depressed trench (13) has a large volume and makes it possible to greatly limit the bending losses. Table 8 thus shows that the depressed trench (13) has a radius $r_3$ between 13.5 microns and 16 microns and an index difference $\Delta n_3$ (23) with the external optical cladding (14) between $-10.0 \times 10^{-3}$ and $-5.0 \times 10^{-3}$. Table 8 also shows that the surface integral of the depressed trench $V_{03}$, as defined above, is between $-55.0 \times 10^{-3}$ microns and $-30.0 \times 10^{-3}$ μm, and the volume integral of the depressed trench $V_{13}$, as defined above, is between $-1200 \times 10^{-}$μm$^2$ and $-750 \times 10^{-3}$ μm$^2$.

According to a preferred embodiment, the radius of the depressed cladding $r_3$ can be limited to 15 microns to further reduce the cost of production of the fiber (only the examples 24 and 30 have a depressed cladding with a radius greater than 15 μm). In fact, the depressed trench (13) can be produced by plasma chemical vapor deposition (PCVD) making it possible to incorporate a large quantity of fluorine in the silica to form deeply depressed claddings. The part of the fiber (10) corresponding to the tube and to the PCVD deposition is, however, the most expensive; it is therefore sought to limit this part as much as possible. It is also possible to envisage producing the depressed trench (13) by incorporation of micro-holes or micro-bubbles rather than by fluorine doping. Fluorine doping, however, remains easier to control for industrial production than the incorporation of micro-bubbles.

A depressed trench (13) corresponding to the surface and volume criteria defined above makes it possible to achieve a good compromise between greatly reduced bending losses relative to the existing fibers and a sufficiently consistent leakage regime of the LP11 mode at a wavelength of 1260 nanometers.

As is clear from Table 11, which is discussed in detail hereafter, the disclosed fiber has bending losses which are ten times (10×) smaller than the limits imposed by the G.657B standard. On the other hand, the disclosed fiber does not strictly comply with the G.657 standard in terms of cut-off wavelength. As is clear from Table 10, which is also discussed in detail hereafter, the disclosed fiber has an effective cut-off wavelength $\lambda_{ceff}$ greater than 1350 nanometers and a cable cut-off wavelength $\lambda_{cc}$ between 1250 nanometers and 1300 nanometers. Nevertheless, the fiber disclosed herein ensures that the higher order LP11 modes are propagated in the 1260 nanometers leaky mode regime.

It is also noted from Table 8 that a preferred embodiment of the fiber has an intermediate cladding (12) between the central core (11) and the depressed trench (13). This intermediate cladding (12) makes it possible to limit the effects of the depressed trench (13) on the propagation of the optical signal in the core. Table 8 shows that the intermediate cladding (12) has a radius $r_2$ between 8.5 microns and 9.7 microns and an index difference $\Delta n_2$ (22) with the optical cladding between $0.1 \times 10^{-3}$ and $0.6 \times 10^{-3}$. Table 8 shows that the surface integral of the intermediate cladding $V_{02}$, as defined above, is between $0.5 \times 10^{-3}$ microns and $3.0 \times 10^{-3}$ microns. The volume integral of the intermediate cladding $V_{12}$, as defined above, is between $6 \times 10^{-3}$ μm$^2$ and $40 \times 10^{-3}$ μm$^2$.

The central core (11) of the disclosed fiber (10) is optimized, in combination with the intermediate cladding (12), to guarantee parameters of optical transmission in the fiber in conformity with the G.652 and G657A standards, particularly in terms of mode field diameter and chromatic dispersion. This also helps ensure compatibility with fibers of other optical systems.

Table 9 (below) shows the optical transmission characteristics for exemplary fibers. The first column repeats the references of Table 8. The following columns provide, for each fiber profile, the mode field diameter (MFD) values for wavelengths of 1310 nanometers and 1550 nanometers, zero dispersion wavelength (ZDW) and zero dispersion slope (ZDS).

TABLE 9

|  | MFD1310 (µm) | MFD1550 (µm) | ZDW (nm) | ZDS ps/(nm$^2$·km) |
|---|---|---|---|---|
| BIF | 8.80 | 9.90 | 1320 | 0.0878 |
| SSMF1 | 9.14 | 10.31 | 1314 | 0.0855 |
| SSMF2 | 9.27 | 10.39 | 1309 | 0.0871 |
| SSMF3 | 9.18 | 10.25 | 1306 | 0.088 |
| Ex1 | 8.63 | 9.62 | 1314 | 0.0899 |
| Ex2 | 8.64 | 9.56 | 1308 | 0.0924 |
| Ex3 | 8.76 | 9.71 | 1310 | 0.0918 |
| Ex4 | 8.69 | 9.63 | 1309 | 0.0921 |
| Ex5 | 8.68 | 9.66 | 1313 | 0.0914 |
| Ex6 | 8.76 | 9.73 | 1310 | 0.0913 |
| Ex7 | 8.66 | 9.58 | 1307 | 0.0916 |
| Ex8 | 8.64 | 9.65 | 1317 | 0.0904 |
| Ex9 | 8.86 | 9.84 | 1311 | 0.0918 |
| Ex10 | 8.76 | 9.81 | 1319 | 0.0901 |
| Ex11 | 8.67 | 9.68 | 1317 | 0.0908 |
| Ex12 | 8.75 | 9.69 | 1308 | 0.0923 |
| Ex13 | 8.65 | 9.59 | 1310 | 0.0917 |
| Ex14 | 8.66 | 9.62 | 1312 | 0.0914 |
| Ex15 | 8.64 | 9.65 | 1317 | 0.0897 |
| Ex16 | 8.79 | 9.81 | 1314 | 0.0898 |
| Ex17 | 8.89 | 9.90 | 1312 | 0.0913 |
| Ex18 | 8.95 | 10.01 | 1317 | 0.0905 |
| Ex19 | 8.91 | 9.94 | 1315 | 0.0913 |
| Ex20 | 8.92 | 9.95 | 1315 | 0.0914 |
| Ex21 | 8.96 | 10.02 | 1317 | 0.0905 |
| Ex22 | 8.80 | 9.81 | 1314 | 0.0906 |
| Ex23 | 8.89 | 9.91 | 1315 | 0.0913 |
| Ex24 | 8.88 | 9.91 | 1314 | 0.0909 |
| Ex25 | 8.94 | 9.97 | 1315 | 0.0914 |
| Ex26 | 8.83 | 9.84 | 1313 | 0.0908 |
| Ex27 | 8.97 | 10.00 | 1314 | 0.0917 |
| Ex28 | 8.93 | 9.95 | 1314 | 0.0915 |
| Ex29 | 8.95 | 9.99 | 1315 | 0.0911 |
| Ex30 | 8.92 | 9.95 | 1314 | 0.0911 |

It is noted from Table 9 that the disclosed fiber (10) is compatible with fibers corresponding to the criteria of the G.652 standard. In particular, the fiber disclosed herein has a mode field diameter MFD in the standardized range of values from 8.6 microns to 9.5 microns at 1310 nanometers, a zero dispersion wavelength between 1300 nanometers and 1324 nanometers, and a zero dispersion slope of less than 0.092 ps/(nm$^2$·km). Each of these values is in accordance with the G.652 standard.

On the other hand, as shown by Table 10 (below), the fiber has an effective cut-off wavelength $\lambda_{ceff}$ greater than 1350 nanometers. As discussed above, the cut-off wavelength is measured as being the wavelength at which the optical signal is no longer single mode after propagation over two meters of fiber, as defined by Subcommittee 86A of the International Electrotechnical Commission in IEC 60793-44 standard. This increased effective cut-off wavelength value leads to a cable cut-off wavelength value $\lambda_{cc}$ between 1250 nanometers and 1300 nanometers. The cable cut-off wavelength is measured as the wavelength at which the optical signal is no longer single mode after propagation over 22 meters of fiber, as defined by Subcommittee 86A of the International Electrotechnical Commission in IEC 60793-1-44 standard. The optical signal is single mode when the attenuation of the LP11 mode is greater than or equal to 19.3 dB. The G.652 and G.657 standards both impose a maximum value of 1260 nanometers for the cable cut-off wavelength.

One purpose of the developments disclosed herein is to produce fibers that can be used on all of the transmission bandwidths exploited by optical systems, i.e., fibers that can be used in single mode propagation from the original bandwidth (OB) which extends from 1260 nanometers to 1360 nanometers, and as far as the ultra-long (UL) bandwidth beyond 1625 nanometers. A low cut-off wavelength makes it possible to guarantee the possibility of using the fiber over all of the available bandwidths.

The simulations of Table 10 (below), however, show that the directly higher order LP11 mode is propagated according to a leaky mode from a wavelength of 1260 nanometers. The fiber disclosed herein can, therefore, be used in single mode transmission over the original bandwidth (OB: 1260 nanometers to 1360 nanometers).

Table 10 (below) shows several cut-off wavelength values for the disclosed fibers. The first column of Table 10 repeats the references of Table 8.

The column "Theoretical Fiber Cutoff" provides a theoretical cut-off wavelength value, which corresponds to the transition wavelength between a guided propagation of the LP11 mode and a propagation in leaky mode of this LP11 mode. For working wavelengths beyond this effective cut-off wavelength, the LP11 mode is propagated in leaky mode.

The column "Standard Fiber Cutoff" corresponds to the effective cut-off wavelength $\lambda_{ceff}$ as defined by Subcommittee 86A of the International Electrotechnical Commission in IEC 60793-1-44 standard.

The column "5 m Fiber Cutoff" corresponds to the cut-off wavelength measured as the wavelength at which the optical signal is no longer single mode after propagation over 5 meters of fiber. This value therefore corresponds to the effective cut-off wavelength measured after propagation over 5 meters of fiber instead of 2 meters of fiber.

The column "Standard Cable Cutoff" corresponds to the cable cut-off wavelength $\lambda_{cc}$ as defined by Subcommittee 86A of the International Electrotechnical Commission in IEC 60793-1-44 standard. According to the recommendation of Subcommittee 86A of the International Electrotechnical Commission in IEC 60793-1-44 standard, the cable cut-off wavelength $\lambda_{cc}$ is determined by positioning the fiber into two 40 millimeters radius loops and by arranging the remainder of the fiber (i.e., 21.5 meters of fiber) on a mandrel with a radius of 140 millimeters.

The column "Straight Cable Cutoff" corresponds to the cable cut-off wavelength by positioning the fiber into two loops, each having a 40 millimeter radius, and by arranging the remainder of the fiber (i.e., 21.5 meters of fiber) virtually straight.

The column "LP11 LL @1260 after 22 m" indicates the leakage losses of the LP11 mode after propagation over 22 meters of virtually straight fiber.

The column "Length—19.3 dB LP11 LL @1260 nanometers" indicates the length of fiber required to achieve leakage losses of the LP11 mode equal to 19.3dB with the fiber being kept virtually straight. This indicates at which distance the fiber, arranged virtually straight, is single mode within the meaning of the G.652 and G.657 standards.

TABLE 10

| Fiber | Fiber Cutoff (theory) (nm) | Std Fiber Cutoff (nm) | 5-m Fiber Cutoff (nm) | Std Cable Cutoff (nm) | Straight Cable Cutoff (nm) | LP11 LL @1260 nm after 22 m (dB) | Length-19.3 dB LP11 LL @1260 nm (m) |
|---|---|---|---|---|---|---|---|
| BIF | 1197 | 1270 | 1234 | 1196 | 1208 | 180 | 2 |
| SSMF1 | 1287 | 1226 | 1226 | 1151 | 1151 | 2 | 212 |
| SSMF2 | 1334 | 1267 | 1267 | 1188 | 1188 | 0 | >1000 |
| SSMF3 | 1381 | 1311 | 1311 | 1231 | 1231 | 0 | >1000 |
| Ex1 | 1235 | 1437 | 1366 | 1290 | 1284 | 9 | 48 |
| Ex2 | 1231 | 1438 | 1368 | 1287 | 1284 | 9 | 45 |
| Ex3 | 1228 | 1466 | 1392 | 1297 | 1301 | 7 | 61 |
| Ex4 | 1250 | 1420 | 1354 | 1290 | 1283 | 6 | 69 |
| Ex5 | 1243 | 1419 | 1353 | 1287 | 1280 | 10 | 44 |
| Ex6 | 1246 | 1430 | 1361 | 1292 | 1285 | 8 | 56 |
| Ex7 | 1248 | 1403 | 1343 | 1284 | 1278 | 8 | 52 |
| Ex8 | 1249 | 1386 | 1326 | 1274 | 1270 | 11 | 40 |
| Ex9 | 1250 | 1436 | 1367 | 1297 | 1291 | 5 | 89 |
| Ex10 | 1233 | 1435 | 1362 | 1287 | 1280 | 10 | 42 |
| Ex11 | 1250 | 1379 | 1321 | 1271 | 1268 | 10 | 41 |
| Ex12 | 1213 | 1467 | 1393 | 1300 | 1298 | 9 | 48 |
| Ex13 | 1243 | 1383 | 1323 | 1271 | 1266 | 16 | 27 |
| Ex14 | 1232 | 1397 | 1333 | 1271 | 1265 | 16 | 26 |
| Ex15 | 1239 | 1392 | 1331 | 1272 | 1267 | 15 | 28 |
| Ex16 | 1234 | 1424 | 1354 | 1283 | 1277 | 11 | 39 |
| Ex17 | 1244 | 1429 | 1360 | 1291 | 1284 | 9 | 49 |
| Ex18 | 1242 | 1382 | 1322 | 1268 | 1264 | 18 | 24 |
| Ex19 | 1243 | 1360 | 1304 | 1257 | 1258 | 26 | 16 |
| Ex20 | 1238 | 1362 | 1305 | 1256 | 1255 | 24 | 17 |
| Ex21 | 1247 | 1376 | 1319 | 1267 | 1266 | 15 | 28 |
| Ex22 | 1249 | 1351 | 1302 | 1259 | 1262 | 18 | 23 |
| Ex23 | 1246 | 1378 | 1319 | 1268 | 1264 | 17 | 25 |
| Ex24 | 1235 | 1373 | 1317 | 1264 | 1260 | 18 | 24 |
| Ex25 | 1243 | 1371 | 1313 | 1263 | 1260 | 22 | 20 |
| Ex26 | 1247 | 1350 | 1300 | 1257 | 1260 | 22 | 19 |
| Ex27 | 1248 | 1367 | 1310 | 1263 | 1263 | 17 | 25 |
| Ex28 | 1245 | 1362 | 1306 | 1259 | 1259 | 24 | 18 |
| Ex29 | 1244 | 1371 | 1314 | 1264 | 1260 | 20 | 21 |
| Ex30 | 1240 | 1375 | 1319 | 1267 | 1263 | 17 | 24 |

It is noted from Table 10 that the standard effective cut-off wavelength $\lambda_{ceff}$, i.e., as measured according to the recommendations of Subcommittee 86A of the International Electrotechnical Commission in IEC 60793-1-44 standard, is greater than 1350 nanometers. Similarly, it is noted from Table 10 that the standard cable cut-off wavelength $\lambda_{cc}$, i.e., as measured according to the recommendations of Subcommittee 86A of the International Electrotechnical Commission in IEC 60793-44 standard, is between 1250 nanometers and 1300 nanometers, i.e., often greater than the limit of 1260 nanometers imposed by the G.652 and G.657 standards.

It is, however, noted from Table 10 that the LP 11 mode is nevertheless highly attenuated from a wavelength of 1260 nanometers. In fact, the "theoretical" cut-off wavelength is less than or equal to 1250 nanometers. Thus, the higher order LP11 mode is propagated in a leaky mode regime in the original bandwidth, and only the fundamental mode remains guided in the disclosed fiber as from a wavelength of 1260 nanometers.

Similarly, it is noted from Table 10 that the fiber cut-off wavelength is significantly reduced after only 5 meters of propagation in the fiber. Thus, the cut-off wavelength, measured as the wavelength at which the optical signal is no longer single mode after propagation over 5 meters of fiber, is between 1300 nanometers and 1400 nanometers for the disclosed fiber.

Moreover, Table 10 clearly shows that the LP11 mode is already well attenuated after 22 meters of propagation. It is noted in particular that the attenuation of the LP11 mode in an exemplary disclosed fiber (10) is greater than the attenuation of the LP11 mode in an SSMF fiber when the fiber is arranged virtually straight. In fact, in an SSMF fiber, it is the bends that make it possible to highly attenuate the LP11 mode. Thus, the fiber has an attenuation of the LP11 mode greater than 5 dB after 22 meters of propagation in straight fiber at a wavelength of 1260 nanometers.

Moreover, Table 10 also shows that the attenuation of at least 19.3 dB of the LP11 mode is achieved relatively rapidly, after less than 90 meters, instead of the 22 meters imposed by the standards.

Thus, the failure to comply in the strictest sense with the G.652 and G.657 standards in terms of cut-off wavelength is minimized by the fact that the higher order LP11 mode is sufficiently attenuated from a wavelength of 1260 nanometers so as not to impair the quality of the propagation of the fundamental mode.

Moreover, the increase in the effective cut-off wavelength makes it possible to increase the value of the MAC as defined above and consequently to reduce the bending losses.

Table 11 (below) reports bending loss values for preferred embodiments of fibers as disclosed herein. The first column of Table 11 repeats the references of Table 8. The next four columns show bending loss values PPC for respective radii of curvature of 15 millimeters, 10 millimeters, 7.5 millimeters, and 5 millimeters at a wavelength of 1550 nanometers. The next four columns give bending loss values PPC for respective radii of curvature of 15 millimeters, 10 millimeters, 7.5 millimeters, and 5 millimeters at a wavelength of 1625 nanometers.

The last column has a factor of merit FOM representing the order of magnitude of the improvement in the bending losses by the disclosed fibers relative to the limits imposed by the G.657B standard. The FOM of Table 11 is thus defined as an average of the ratios between the upper limits imposed by the G.657B standard and the bending losses in the disclosed fibers for each radius of curvature measured.

Table 11 reports on the first line the bending loss limit values imposed by the G.657B standard for each radius of curvature and for the wavelengths of 1550 nanometers and 1625 nanometers.

The bending losses are less than or equal to $25 \times 10^{-3}$ dB/turn for a radius of curvature of 10 millimeters, as compared to a limit of 0.2 dB/turn imposed by the G.657B standard. The fiber exhibits bending losses less than or equal to 0.08 dB/turn for a radius of curvature of 7.5 millimeters, as against a limit of 1 dB/turn imposed by the G.657B standard, and bending losses less than 0.25 dB/turn for a radius of curvature of 5 millimeters.

TABLE 11

| | R = 15 mm | R = 10 mm | R = 7.5 mm | R = 5 mm | R = 15 mm | R = 10 mm | R = 7.5 mm | R = 5 mm | |
| | | PPC @1550 nm (dB/turn) | | | | PPC @1625 nm (dB/turn) | | | FOM |
|---|---|---|---|---|---|---|---|---|---|
| G657B | 0.003 | 0.1 | 0.5 | | 0.01 | 0.2 | 1 | | 1.00 |
| BIF | 1.3E−03 | 2.9E−02 | 1.0E−01 | 3.3E−01 | 7.0E−03 | 8.4E−02 | 2.3E−01 | 6.3E−01 | 0.70 |
| SSMF1 | 1.5E−02 | 6.0E−01 | 3.4E+00 | 1.7E+01 | 7.5E−02 | 1.7E+00 | 6.9E+00 | 2.7E+01 | 8.44 |
| SSMF2 | 6.3E−03 | 3.6E−01 | 2.4E+00 | 1.4E+01 | 3.4E−02 | 1.0E+00 | 5.0E+00 | 2.3E+01 | 5.21 |
| SSMF3 | 9.6E−04 | 1.1E−01 | 1.0E+00 | 8.9E+00 | 6.5E−03 | 3.6E−01 | 2.5E+00 | 1.4E+01 | 2.45 |
| Ex1 | 4.3E−05 | 2.0E−03 | 9.7E−03 | 3.6E−02 | 3.3E−04 | 7.3E−03 | 2.5E−02 | 7.0E−02 | 0.04 |
| Ex2 | 4.4E−05 | 2.0E−03 | 9.2E−03 | 3.5E−02 | 3.4E−04 | 7.2E−03 | 2.4E−02 | 7.1E−02 | 0.04 |
| Ex3 | 6.4E−05 | 2.2E−03 | 9.0E−03 | 3.2E−02 | 4.4E−04 | 7.6E−03 | 2.3E−02 | 6.4E−02 | 0.04 |
| Ex4 | 3.6E−05 | 2.0E−03 | 1.1E−02 | 4.5E−02 | 2.9E−04 | 7.6E−03 | 2.8E−02 | 8.8E−02 | 0.04 |
| Ex5 | 4.7E−05 | 2.4E−03 | 1.2E−02 | 4.6E−02 | 3.6E−04 | 8.6E−03 | 3.1E−02 | 9.2E−02 | 0.04 |
| Ex6 | 5.3E−05 | 2.4E−03 | 1.2E−02 | 4.4E−02 | 3.9E−04 | 8.6E−03 | 3.0E−02 | 8.4E−02 | 0.04 |
| Ex7 | 4.2E−05 | 2.4E−03 | 1.3E−02 | 5.1E−02 | 3.4E−04 | 8.9E−03 | 3.3E−02 | 1.0E−01 | 0.04 |
| Ex8 | 4.5E−05 | 2.6E−03 | 1.5E−02 | 6.3E−02 | 3.6E−04 | 9.9E−03 | 3.8E−02 | 1.2E−01 | 0.05 |
| Ex9 | 6.9E−05 | 2.8E−03 | 1.3E−02 | 4.8E−02 | 4.8E−04 | 9.7E−03 | 3.2E−02 | 9.1E−02 | 0.05 |
| Ex10 | 8.3E−05 | 3.0E−03 | 1.3E−02 | 4.7E−02 | 5.6E−04 | 1.0E−02 | 3.2E−02 | 8.8E−02 | 0.06 |
| Ex11 | 4.9E−05 | 2.9E−03 | 1.6E−02 | 7.1E−02 | 3.9E−04 | 1.1E−02 | 4.2E−02 | 1.3E−01 | 0.05 |
| Ex12 | 9.1E−05 | 2.6E−03 | 9.5E−03 | 3.0E−02 | 6.1E−04 | 8.6E−03 | 2.3E−02 | 6.1E−02 | 0.06 |
| Ex13 | 5.4E−05 | 2.9E−03 | 1.6E−02 | 6.5E−02 | 4.3E−04 | 1.1E−02 | 4.1E−02 | 1.3E−01 | 0.05 |
| Ex14 | 6.6E−05 | 3.0E−03 | 1.5E−02 | 5.6E−02 | 5.0E−04 | 1.1E−02 | 3.8E−02 | 1.1E−01 | 0.05 |
| Ex15 | 6.2E−05 | 3.1E−03 | 1.5E−02 | 6.3E−02 | 4.7E−04 | 1.1E−02 | 3.9E−02 | 1.2E−01 | 0.06 |
| Ex16 | 9.8E−05 | 3.5E−03 | 1.4E−02 | 5.3E−02 | 6.5E−04 | 1.2E−02 | 3.5E−02 | 1.0E−01 | 0.07 |
| Ex17 | 1.0E−04 | 3.6E−03 | 1.5E−02 | 5.6E−02 | 6.7E−04 | 1.2E−02 | 3.7E−02 | 1.0E−01 | 0.07 |
| Ex18 | 2.2E−04 | 6.9E−03 | 2.7E−02 | 1.0E−01 | 1.3E−03 | 2.1E−02 | 6.4E−02 | 1.8E−01 | 0.13 |
| Ex19 | 2.0E−04 | 7.1E−03 | 3.1E−02 | 1.1E−01 | 1.2E−03 | 2.3E−02 | 7.2E−02 | 2.1E−01 | 0.12 |
| Ex20 | 2.2E−04 | 7.4E−03 | 3.1E−02 | 1.1E−01 | 1.4E−03 | 2.4E−02 | 7.2E−02 | 2.1E−01 | 0.14 |
| Ex21 | 2.1E−04 | 7.1E−03 | 2.9E−02 | 1.1E−01 | 1.3E−03 | 2.2E−02 | 6.9E−02 | 2.0E−01 | 0.13 |
| Ex22 | 1.4E−04 | 6.5E−03 | 3.1E−02 | 1.3E−01 | 1.0E−03 | 2.2E−02 | 7.7E−02 | 2.4E−01 | 0.11 |
| Ex23 | 1.4E−04 | 5.4E−03 | 2.4E−02 | 9.0E−02 | 9.2E−04 | 1.8E−02 | 5.8E−02 | 1.7E−01 | 0.09 |
| Ex24 | 2.3E−04 | 7.3E−03 | 2.8E−02 | 1.0E−01 | 1.4E−03 | 2.3E−02 | 6.8E−02 | 2.0E−01 | 0.14 |
| Ex25 | 2.0E−04 | 6.8E−03 | 2.9E−02 | 1.0E−01 | 1.2E−03 | 2.2E−02 | 6.8E−02 | 2.0E−01 | 0.12 |
| Ex26 | 1.7E−04 | 7.4E−03 | 3.4E−02 | 1.3E−01 | 1.2E−03 | 2.4E−02 | 8.2E−02 | 2.5E−01 | 0.12 |
| Ex27 | 2.0E−04 | 7.1E−03 | 3.0E−02 | 1.1E−01 | 1.2E−03 | 2.3E−02 | 7.1E−02 | 2.1E−01 | 0.12 |
| Ex28 | 1.9E−04 | 7.0E−03 | 3.0E−02 | 1.1E−01 | 1.2E−03 | 2.3E−02 | 7.2E−02 | 2.1E−01 | 0.12 |
| Ex29 | 2.0E−04 | 7.0E−03 | 2.9E−02 | 1.0E−01 | 1.3E−03 | 2.2E−02 | 6.8E−02 | 2.0E−01 | 0.13 |
| Ex30 | 2.3E−04 | 7.4E−03 | 2.9E−02 | 1.1E−01 | 1.4E−03 | 2.3E−02 | 7.0E−02 | 2.1E−01 | 0.14 |

It is noted from Table 11 that the bending losses of the disclosed fibers are clearly less than the limits imposed by the G.657B standard.

Thus, the fiber disclosed above has, for a wavelength of 1550 nanometers, bending losses less than $0.25 \times 10^{-3}$ dB/turn for a radius of curvature of 15 millimeters, as compared to a limit of $3 \times 10^{-3}$ dB/turn imposed by the G.657B standard. The fiber further has bending losses less than or equal to $7.5 \times 10^{-3}$ dB/turn for a radius of curvature of 10 millimeters, as compared against a limit of 0.1 dB/turn imposed by the G.657B standard. The bending losses are less than or equal to 0.05 dB/turn for a radius of curvature of 7.5 millimeters, as against a limit of 0.5 dB/turn imposed by the G.657B standard, and bending losses less than 0.15 dB/turn for a radius of curvature of 5 millimeters.

The bending losses at a wavelength of 1550 nanometers in the disclosed fiber have been improved by a factor greater than 10× relative to the limits of the G.657B standard.

Similarly, the disclosed fiber exhibits, for a wavelength of 1625 nanometers, bending losses less than $1.5 \times 10^{-3}$ dB/turn for a radius of curvature of 15 millimeters, as compared to a limit of $10-10^{-3}$ dB/turn imposed by the G.657B standard.

The bending losses at a wavelength of 1625 nanometers in the disclosed fiber have been improved by a factor of 10 relative to the limits of the G.657B standard. It should be noted that, within the framework of an industrial production of optical fiber preforms, the conformity tests, vis-à-vis the standards, are carried out by taking into account only significant figures indicated in the standard. Thus, when the G.657B standard imposes the limit value of 0.01 dB/turn at a wavelength of 1625 nanometers for a radius of curvature of 15 millimeters, the manufacturer will tolerate bending losses ranging up to 0.014 dB/turn at this wavelength for this radius of curvature. Bending losses less than $1.5 \times 10^{-3}$ dB/turn for a radius of curvature of 15 millimeters at a wavelength of 1625 nanometers are therefore at least ten times better than the limits imposed by the standard.

The column FOM of Table 11 shows that the disclosed fibers have clearly improved bending losses relative to the existing BIF fibers, which correspond to the requirements of the G.657B standard.

The fibers disclosed herein are well suited to a use in optical systems installed in the subscriber's home, of FTTH type, in which the fiber is subjected to significant bend stresses due to the miniaturization of the optical box or holding the fiber in place with staples. The fiber can be placed in particularly compact optical boxes. In fact, the optical fiber may be arranged with a radius of curvature of less than 15 millimeters, for example, a radius of curvature about 5 millimeters. The fiber remains compatible with the fibers of existing systems, in particular in terms of mode field diameter for good fiber-to-fiber coupling. The increase in the cut-off wavelength is not detrimental due to a significant attenuation of the LP11 mode from a wavelength of 1260 nanometers.

\* \* \*

Yet another exemplary bend-insensitive glass fiber for use in the present invention is disclosed in U.S. Patent Application No. 61/112,374 for a Bend-Insensitive Single Mode Optical Fiber (de Montmorillon et al.) and its related patent application Ser. No. 12/436,484, published as U.S. Patent Application Publication No. US 2009/0279836 A1, now U.S. Pat. No. 7,889,960. As noted, each of these commonly assigned patent documents is incorporated by reference in its entirety. Combining (i) a bend-insensitive glass fiber having the refractive index profile as disclosed in U.S. Patent Application No. 61/112,374 and coating according to the present invention can achieve optical fibers having virtually negligible sensitivity to microbend-inducing stresses.

The bend-insensitive glass fiber disclosed in U.S. Patent Application No. 61/112,374 (the "disclosed fiber") includes a central core, an intermediate cladding, and a depressed trench that is surrounded by an external optical cladding. The refractive index profile is optimized to improve the bending losses by a factor of ten relative to the constraints imposed by the G.657B recommendation, while retaining a mode field diameter compatible with the G.652 recommendation and ensuring a sufficient attenuation of the LP11 mode.

In particular, the surface of the core, as well as the surface and the volume of the depressed trench, are optimized to improve the bending losses considerably. The surface of the core or the surface of the depressed trench should not extend geometrically but should correspond to values taking two dimensions into account—the product of the radius and the index difference. Similarly, the volume of the depressed trench corresponds to a value taking three dimensions into account—the product of the square of the radius and the index difference.

The disclosed fiber includes, from its center toward is periphery, a central core, an intermediate cladding, a depressed trench, and an external optical cladding. The central core has a radius $r_1$ and a positive index difference $\Delta n_1$ with the external optical cladding. The intermediate cladding has a radius $r_2$ and an index difference $\Delta n_2$ with the external optical cladding. The difference $\Delta n_2$ is less than the index difference $\Delta n_1$ of the core. The depressed trench has a radius $r_3$ and a negative index difference $\Delta n_3$ with the external optical cladding. The disclosed fiber is further characterized in that it has (i) a nominal mode field diameter (MFD) between 8.6 microns and 9.5 microns at a wavelength of 1310 nanometers and (ii) bending losses less than 0.15 dB/turn for a radius of curvature of 5 millimeters at a wavelength of 1550 nanometers and a cable cut-off wavelength of less than or equal to 1260 nanometers, measured as the wavelength at which the attenuation of the LP11 mode is greater than or equal to 19.3 dB after propagation over 22 meters of fiber, the fiber being either straight conditioned or conditioned around a 140-millimeter curvature radius mandrel.

According to one fiber embodiment, the surface integral of the central core ($V_{01}$), defined as $$V_{01} = \int_0^{r_1} \Delta n(r) \cdot dr \approx r_1 \times \Delta n_1,$$

is between $19.0 \times 10^{-3}$ microns and $23.0 \times 10^{-3}$ microns and preferably between $20.0 \times 10^{-3}$ microns and $23.0 \times 10^{-3}$ microns. In a further preferred embodiment, the surface integral of the central core ($V_{01}$) is between $20.0 \times 10^{-3}$ microns and $21.5 \times 10^{-3}$ μm, which gives rise to outstanding optical properties.

According to one fiber embodiment, the surface integral of the depressed trench ($V_{03}$), defined as $$V_{03} = \int_{r_2}^{r_3} \Delta n(r) \cdot dr \approx (r_3 - r_2) \times \Delta n_3,$$

is between $-55.0 \times 10^{-3}$ microns and $-30.0 \times 10^{-3}$ microns. In a further preferred embodiment the surface integral of the depressed trench ($V_{03}$) is between $-42.5 \times 10^{-3}$ microns and $-32.5 \times 10^{-3}$ μm, which gives rise to outstanding optical properties.

According to one fiber embodiment, the volume integral of the depressed trench ($V_{13}$), defined as, $$V_{13} = 2 \cdot \int_{r_2}^{r_3} \Delta n(r) \cdot r \cdot dr \approx (r_3^2 - r_2^2) \times \Delta n_3,$$

is between $-1200 \times 10^{-3}$ μm$^2$ and $-750 \times 10^{-3}$ μm$^2$. In a further preferred embodiment the volume integral of the depressed trench ($V_{13}$) is between $-1000 \times 10^{-3}$ μm$^2$ and $-750 \times 10^{-3}$ μm$^2$, which gives rise to outstanding optical properties of the present fiber.

In preferred embodiments, the fiber has physical properties and operational parameters with improved resistance to bending losses. For instance, the fiber has an effective cut-off wavelength $\lambda_{ceff}$ greater than 1300 nanometers, the effective cut-off wavelength being measured as the wavelength at which the optical signal becomes single mode after propagation over two meters of fiber. The fiber has, for a wavelength of 1550 nanometers, bending losses less than or equal to 0.003 dB/turn for a radius of curvature of 15 millimeters, bending losses less than or equal to $3 \times 10^{-2}$ dB/turn, preferably $7.5 \times 10^{-3}$ dB/turn for a radius of curvature of 10 millimeters, bending losses less than or equal to 0.05 dB/turn for a radius of curvature of 7.5 millimeters, and bending losses less than 0.15 dB/turn, preferably less than 0.10 dB/turn for a radius of curvature of 5 millimeters.

The fiber disclosed herein also shows reduced bending losses at higher wavelengths. For example, at a wavelength of 1625 nanometers, the fiber has bending losses less than $10^{-2}$ dB/turn, preferably less than $1.5 \times 10^{-3}$ dB/turn for a radius of curvature of 15 millimeters, bending losses less than or equal to 0.1 dB/turn, preferably less than or equal to $25 \times 10^{-3}$ dB/turn for a radius of curvature of 10 millimeters, bending losses less than or equal to 0.15 dB/turn, preferably less than or equal to 0.08 dB/turn for a radius of curvature of 7.5 millimeters, and bending losses less than or equal to 0.25 dB/turn for a radius of curvature of 5 millimeters.

Accordingly, in a preferred embodiment, the fiber has a cut-off wavelength between 1240 nanometers and 1310 nanometers, with the cut-off wavelength measured as the wavelength at which the optical signal is no longer single mode after propagation over five meters of fiber. Cut-off wavelength is distinguished from cable cut-off, measured as the wavelength at which the attenuation of the LP11 mode is greater than or equal to 19.3 dB after propagation over 22 meters of fiber. The fiber has a cable cut-off wavelength less than or equal to 1260 nanometers.

A fourth cut-off definition at issue here is the theoretical cut-off wavelength defined as the wavelength from which the LP11 mode is propagated in leaky mode. In one embodiment, the fiber has a theoretical cut-off wavelength less than or equal to 1250 nanometers. The fiber has an attenuation of the LP11 mode greater than 5 dB after propagation over 22 meters of fiber at a wavelength of 1260 nanometers.

The operational parameters described above result from preferred physical properties of the fiber. In one embodiment, the central core of the fiber has a radius between 3.8 microns and 4.35 μm; the intermediate cladding has a radius between 8.5 microns and 9.7 μm; the depressed trench has a radius between 13.5 microns and 16 μam, which can be less than or equal to 15 microns. The central core typically has a refractive index difference ($\Delta n_1$) with the external optical cladding between $4.9 \times 10^{-3}$ and $5.7 \times 10^{-3}$.

As noted, the refractive index profile of a fiber is plotted in terms of the difference between refractive index values at points on the radius of the fiber and the external optical cladding. The intermediate cladding has an index difference with the optical cladding between $-0.1 \times 10^{-3}$ and $0.6 \times 10^{-3}$. The depressed trench has an index difference with the optical cladding between $-10.0 \times 10^{-3}$ and $-5.0 \times 10^{-3}$. The fiber has a zero chromatic dispersion wavelength between 1300 nanometers and 1324 nanometers; the fiber has a chromatic dispersion slope value at the zero chromatic dispersion wavelength of less than 0.092 ps/(nm²·km).

As depicted in FIG. 23, the bend-insensitive glass fiber (10) disclosed in U.S. Patent Application No. 61/112,374 has a central core (11), an intermediate cladding (12) and a depressed cladding (13). For purposes herein, depressed cladding means a radial portion of the fiber (10) having a refractive index less than the refractive index of the external optical cladding (14). Typically, the central core (11), the intermediate cladding (12), and the depressed cladding (13) are obtained by chemical vapor deposition in a silica tube. The external optical cladding (14) includes the silica tube and the overcladding on the tube. In preferred embodiments, the overcladding is generally natural or doped silica, but can also be obtained by any other deposition technique ((vapor axial deposition ("VAD") or outside vapor deposition ("OVD")).

FIG. 24 illustrates a refractive index profile for the transmission fiber (10) of FIG. 23. The profile of FIG. 24 is a set profile, i.e., representative of the theoretical profile of the fiber, but the fiber actually obtained after fiber drawing of a preform may have a slightly different profile.

In a manner known in the art per se, an optical fiber (10) is obtained by preform drawing. By way of example, the preform may be a very high-quality glass tube (pure silica) which eventually forms part of the external optical cladding (14). The external optical cladding (14) surrounds the central core (11) and the internal claddings (12, 13) of the fiber (10). This tube can then be overcladded to increase its diameter before going through the fiber-drawing operation on a fiber-drawing tower. For the production of the preform, the tube is generally mounted horizontally and held at both ends by glass bars on a lathe; then the tube is rotated and heated locally for the deposition process determining the composition of the preform. This composition determines the optical characteristics of the future fiber.

The fiber includes a central core (11) having an index difference $\Delta n_1$ with an external cladding (14) functioning as an optical cladding. The fiber (10) further includes an intermediate cladding (12) having an index difference $\Delta n_2$ with the external optical cladding (14) and a depressed trench cladding (13) having an index difference $\Delta n_3$ with the external optical cladding (14). The refractive indexes in the central core (11), the intermediate cladding (12) and the depressed trench (13) are substantially constant throughout their respective widths, as set forth in FIG. 24. FIG. 23 illustrates that the width of the core (11) is defined by its radius $r_1$ and the width of the claddings by their respective external radii, $r_2$ and $r_3$. The external optical cladding is denoted as $r_4$.

In order to define a set refractive index profile for an optical fiber, the refractive index value of the external optical cladding is generally taken as a reference ($n_g$). The index values of the central core (11), the intermediate cladding (12), and the depressed trench cladding (13) are then presented in FIG. 24 as index differences $\Delta n_{1,2,3}$. Generally, the external optical cladding (14) is composed of silica but this cladding can be doped to increase or reduce its refractive index—for example, to modify the propagation characteristics of the signal.

Each fiber profile section shown in FIG. 24 (21-24) can also be defined on the basis of integrals that link the index variations with the radius of each section of the fiber (10). It is thus possible to define three surface integrals for the disclosed fiber (10), representative of the surface of the core $V_{01}$, the surface of the intermediate cladding $V_{01}$ and the surface of the depressed trench $V_{03}$. The expression "surface" is not to be understood geometrically but corresponds to a value taking two dimensions into account. These three surface integrals can be expressed as follows:

$$V_{01} = \int_0^{r_1} \Delta n(r) \cdot dr \approx r_1 \times \Delta n_1$$

$$V_{02} = \int_{r_1}^{r_2} \Delta n(r) \cdot dr \approx (r_2 - r_1) \times \Delta n_2$$

$$V_{03} = \int_{r_2}^{r_3} \Delta n(r) \cdot dr \approx (r_3 - r_2) \times \Delta n_3.$$

Similarly, it is possible to define three volume integrals for the disclosed fiber (10), representative of the volume of the core $V_{11}$, the volume of the intermediate cladding $V_{12}$ and the volume of the depressed trench $V_{13}$. The expression "volume" is not to be understood geometrically but corresponds to a value taking three dimensions into account. These three volume integrals can be expressed as follows:

$$V_{11} = 2 \cdot \int_0^{r_1} \Delta n(r) \cdot r \cdot dr \approx r_1^2 \times \Delta n_1$$

$$V_{12} = 2 \cdot \int_{r_1}^{r_2} \Delta n(r) \cdot r \cdot dr \approx (r_2^2 - r_1^2) \times \Delta n_2$$

$$V_{13} = 2 \cdot \int_{r_2}^{r_3} \Delta n(r) \cdot r \cdot dr \approx (r_3^2 - r_2^2) \times \Delta n_3.$$

Table 12 (below) shows nine examples of fiber profiles according to preferred fiber embodiments in comparison with three SSMF fiber profiles and one fiber profile corresponding to the G.657A and G.657B recommendations (noted as "BIF" for Bend Insensitive Fiber), as well as 13 comparative examples. Draka Comteq markets bend-insensitive optical fibers having excellent resistance to bending losses under the trade name BendBright$^{XS}$®. The values in the tables correspond to the set profiles for each fiber.

All profiles were also designed to ensure a Multi-Path Interference (MPI) level lower than −30 dB, which ensures full compatibility with any properly installed system networks, including Access Network and Fiber-to-the-Home. MPI is defined in W. Zheng et al., "Measurement and System Impact of Multipath Interference from Dispersion Compensating Fiber Modules," IEEE Transactions on Instrumentation and Measurement (2004, 53, pp. 15-23) and its particular measurement considerations detailed in S. Ramachandran et al., "Measurement of Multipath Interference in the Coherent Crosstalk Regime," IEEE Photonics Technology Letters (2003, 15, pp. 1171-1173).

The first column of Table 12 assigns a reference to each example (i.e., "Ex" for examples according to the disclosure and "C.Ex" for comparative examples); the next three columns give the values of the radii of the core (11), the intermediate cladding (12), and the depressed trench (13), respectively. The next three columns give the corresponding values of the refractive index differences with the external optical cladding (14). The refractive index values are measured at a wavelength of 633 nanometers. Table 12 also shows the surface integral and volume integral values of the core (11), the intermediate cladding (12) and the depressed trench (13), as defined above.

cladding (14) between $4.9 \times 10^{-3}$ and $5.7 \times 10^{-3}$ (i.e., in the order of or greater than an SSMF fiber). The surface integral of the core $V_{01}$ is between $19.0 \times 10^{-3}$ microns and $23.0 \times 10^{-3}$ μm, and the volume integral of the core $V_{11}$ is between $75 \times 10^{-3}$ μm² and $91 \times 10^{-3}$ μm².

It is also noted from Table 12 that the disclosed fiber has a depressed trench (13). The depressed trench (13) has a large volume and makes it possible to greatly limit the bending losses. Table 12 thus shows that the depressed trench (13) has a radius $r_3$ between 13.5 microns and 16 microns and an index difference $\Delta n_3$ (23) with the external optical cladding (14) between $-10.0 \times 10^{-3}$ and $-5.0 \times 10^{-3}$. Table 12 also shows that the surface integral of the depressed trench $V_{03}$, as defined above, is between $-55.0 \times 10^{-3}$ microns and $-30.0 \times 10^{-3}$ μm, and the volume integral of the depressed trench $V_{13}$, as defined above, is between $-1200 \times 10^{-3}$ μm² and $-750 \times 10^{-3}$ μm².

According to a preferred embodiment, the radius of the depressed cladding $r_3$ can be limited to 15 microns to further reduce the cost of production of the fiber and all fibers according to the examples comply herewith. In fact, the depressed trench (13) can be produced by plasma chemical vapor deposition (PCVD) making it possible to incorporate a large quantity of fluorine in the silica to form deeply depressed claddings. The part of the fiber (10) corresponding to the tube and to the PCVD deposition is, however, the most expensive; it is therefore sought to limit this part as much as possible. It is

TABLE 12

|   | $r_1$ (μm) | $r_2$ (μm) | $r_3$ (μm) | $Dn_1$ $[10^{-3}]$ | $Dn_2$ $[10^{-3}]$ | $Dn_3$ $[10^{-3}]$ | $V_{01}$ (μm) $[10^{-3}]$ | $V_{02}$ (μm) $[10^{-3}]$ | $V_{03}$ (μm) $[10^{-3}]$ | $V_{11}$ (μm²) $[10^{-3}]$ | $V_{12}$ (μm²) $[10^{-3}]$ | $V_{13}$ (μm²) $[10^{-3}]$ |
|---|---|---|---|---|---|---|---|---|---|---|---|---|
| BIF | 3.93 | 9.38 | 14.72 | 5.26 | 0.13 | −5.01 | 20.7 | 0.7 | −26.8 | 81.1 | 9.4 | −645 |
| SSMF1 | 4.35 | 13.92 | | 5.00 | −0.20 | | 21.8 | −1.9 | 0.0 | 94.6 | −35.0 | 0 |
| SSMF2 | 4.51 | 13.92 | | 5.00 | −0.20 | | 22.5 | −1.9 | 0.0 | 101.5 | −34.7 | 0 |
| SSMF3 | 4.55 | 13.92 | | 5.24 | −0.20 | | 23.8 | −1.9 | 0.0 | 108.4 | −34.6 | 0 |
| C. Ex1 | 3.82 | 9.01 | 13.55 | 5.67 | 0.57 | −9.63 | 21.7 | 2.9 | −43.7 | 82.8 | 37.7 | −986 |
| C. Ex2 | 3.96 | 8.61 | 13.86 | 5.58 | 0.31 | −7.87 | 22.1 | 1.4 | −41.3 | 87.6 | 17.9 | −928 |
| C. Ex3 | 3.92 | 8.78 | 13.84 | 5.55 | 0.32 | −8.75 | 21.7 | 1.5 | −44.3 | 85.2 | 19.7 | −1002 |
| C. Ex4 | 3.88 | 9.09 | 14.35 | 5.62 | 0.34 | −7.84 | 21.8 | 1.8 | −41.2 | 84.5 | 23.1 | −965 |
| C. Ex5 | 3.93 | 9.30 | 14.48 | 5.30 | 0.51 | −7.76 | 20.8 | 2.7 | −40.1 | 81.7 | 36.0 | −955 |
| C. Ex6 | 3.93 | 9.28 | 14.47 | 5.31 | 0.53 | −7.51 | 20.9 | 2.8 | −39.0 | 82.0 | 37.5 | −926 |
| C. Ex7 | 3.93 | 8.50 | 15.00 | 5.48 | 0.50 | −5.00 | 21.5 | 2.3 | −32.5 | 84.6 | 28.4 | −764 |
| C. Ex8 | 3.93 | 9.25 | 13.65 | 5.37 | 0.50 | −9.90 | 21.1 | 2.7 | −43.5 | 83.0 | 35.1 | −997 |
| C. Ex9 | 3.93 | 8.50 | 15.50 | 5.33 | 0.51 | −5.00 | 21.0 | 2.3 | −35.0 | 82.4 | 28.8 | −840 |
| C. Ex10 | 3.93 | 9.27 | 13.65 | 5.31 | 0.52 | −9.80 | 20.9 | 2.8 | −42.9 | 82.1 | 36.9 | −983 |
| C. Ex11 | 3.94 | 9.25 | 13.54 | 5.30 | 0.56 | −9.87 | 20.9 | 3.0 | −42.3 | 82.3 | 39.2 | −964 |
| C. Ex12 | 3.95 | 9.29 | 13.91 | 5.30 | 0.50 | −8.93 | 20.9 | 2.7 | −41.2 | 82.6 | 35.4 | −957 |
| C. Ex13 | 3.93 | 8.50 | 15.50 | 5.32 | 0.57 | −5.00 | 20.9 | 2.6 | −35.0 | 82.1 | 32.2 | −840 |
| Ex1 | 3.90 | 9.23 | 14.34 | 4.94 | 0.35 | −7.15 | 19.3 | 1.9 | −36.5 | 75.1 | 24.5 | −861 |
| Ex2 | 3.91 | 9.23 | 14.34 | 5.14 | 0.10 | −7.15 | 20.1 | 0.5 | −36.5 | 78.6 | 7.0 | −861 |
| Ex3 | 3.91 | 9.23 | 14.81 | 5.14 | 0.10 | −7.15 | 20.1 | 0.5 | −39.9 | 78.6 | 7.0 | −959 |
| Ex4 | 3.91 | 9.23 | 14.34 | 5.29 | −0.06 | −7.15 | 20.7 | −0.3 | −36.5 | 80.9 | −4.2 | −861 |
| Ex5 | 3.91 | 9.23 | 14.81 | 5.29 | −0.06 | −7.15 | 20.7 | −0.3 | −39.9 | 80.9 | −4.2 | −959 |
| Ex6 | 3.93 | 9.26 | 13.53 | 5.34 | 0.51 | −9.74 | 21.0 | 2.7 | −41.6 | 82.3 | 36.0 | −949 |
| Ex7 | 3.93 | 9.25 | 13.53 | 5.31 | 0.50 | −9.93 | 20.8 | 2.7 | −42.5 | 81.9 | 35.3 | −967 |
| Ex8 | 3.94 | 8.50 | 15.00 | 5.43 | 0.50 | −5.00 | 21.4 | 2.3 | −32.5 | 84.3 | 28.6 | −764 |
| Ex9 | 3.94 | 9.26 | 13.50 | 5.33 | 0.51 | −9.88 | 21.0 | 2.7 | −41.9 | 82.8 | 35.5 | −954 |

The disclosed fiber (10) according to the embodiment depicted in FIGS. 23 and 24 is a step-index fiber comprising a central core (11), an intermediate cladding (12), and a depressed trench (13). It is noted from Table 12 that the central core (11) has a radius $r_1$ between 3.8 microns and 4.35 microns and preferably between 3.8 microns and 4.05 μm, i.e., narrower than the core of an SSMF fiber. The fiber (10) has an index difference $\Delta n_1$ (21) with the external optical also possible to envisage producing the depressed trench (13) by incorporation of micro-holes or micro-bubbles rather than by fluorine doping. Fluorine doping, however, remains easier to control for industrial production than the incorporation of micro-bubbles.

A depressed trench (13) corresponding to the surface and volume criteria defined above makes it possible to achieve a good compromise between greatly reduced bending losses relative to the existing fibers and a sufficiently consistent leakage regime of the LP11 mode at a wavelength of 1260 nanometers.

It is also noted from Table 12 that a preferred embodiment of the fiber has an intermediate cladding (12) between the central core (11) and the depressed trench (13). This intermediate cladding (12) makes it possible to limit the effects of the depressed trench (13) on the propagation of the optical signal in the core. Table 12 shows that the intermediate cladding (12) has a radius $r_2$ between 8.5 microns and 9.7 microns and an index difference $\Delta n_2$ (22) with the optical cladding between $-0.1 \times 10^{-3}$ and $0.6 \times 10^{-3}$. Table 12 shows that the surface integral of the intermediate cladding $V_{02}$, as defined above, is between $-0.5 \times 10^{-3}$ microns and $3.0 \times 10^{-3}$ microns. The volume integral of the intermediate cladding $V_{12}$, as defined above, is between $-6 \times 10^{-3}$ μm$^2$ and $40+10^{-3}$ μm$^2$.

The central core (11) of the disclosed fiber (10) is optimized, in combination with the intermediate cladding (12), to guarantee parameters of optical transmission in the fiber in conformity with the G.652 and G657A recommendations, particularly in terms of mode field diameter and chromatic dispersion. This also helps ensure compatibility with fibers of other optical systems.

Table 13 (below) shows the optical transmission characteristics for exemplary fibers. The first column repeats the references of Table 12. The following columns provide, for each fiber profile, the mode field diameter (MFD) values for wavelengths of 1310 nanometers and 1550 nanometers, zero dispersion wavelength (ZDW) and zero dispersion slope (ZDS).

TABLE 13

|  | MFD1310 (μm) | MFD1550 (μm) | ZDW (nm) | ZDS ps/(nm$^2 \cdot$ km) |
|---|---|---|---|---|
| BIF | 8.80 | 9.90 | 1320 | 0.0878 |
| SSMF1 | 9.14 | 10.31 | 1314 | 0.0855 |
| SSMF2 | 9.27 | 10.39 | 1309 | 0.0871 |
| SSMF3 | 9.18 | 10.25 | 1306 | 0.088 |
| C. Ex1 | 8.67 | 9.68 | 1317 | 0.0908 |
| C. Ex2 | 8.65 | 9.59 | 1310 | 0.0917 |
| C. Ex3 | 8.66 | 9.62 | 1312 | 0.0914 |
| C. Ex4 | 8.64 | 9.65 | 1317 | 0.0897 |
| C. Ex5 | 8.95 | 10.01 | 1317 | 0.0905 |
| C. Ex6 | 8.96 | 10.02 | 1317 | 0.0905 |
| C. Ex7 | 8.80 | 9.81 | 1314 | 0.0906 |
| C. Ex8 | 8.89 | 9.91 | 1315 | 0.0913 |
| C. Ex9 | 8.88 | 9.91 | 1314 | 0.0909 |
| C. Ex10 | 8.94 | 9.97 | 1315 | 0.0914 |
| C. Ex11 | 8.97 | 10.00 | 1314 | 0.0917 |
| C. Ex12 | 8.95 | 9.99 | 1315 | 0.0911 |
| C. Ex13 | 8.92 | 9.95 | 1314 | 0.0911 |
| Ex1 | 9.00 | 10.10 | 1318 | 0.0906 |
| Ex2 | 8.75 | 9.81 | 1318 | 0.0895 |
| Ex3 | 8.75 | 9.81 | 1318 | 0.0895 |
| Ex4 | 8.60 | 9.64 | 1318 | 0.0888 |
| Ex5 | 8.60 | 9.64 | 1318 | 0.0888 |
| Ex6 | 8.91 | 9.94 | 1315 | 0.0913 |
| Ex7 | 8.92 | 9.95 | 1315 | 0.0914 |
| Ex8 | 8.83 | 9.84 | 1313 | 0.0908 |
| Ex9 | 8.93 | 9.95 | 1314 | 0.0915 |

It is noted from Table 13 that the disclosed fiber (10) is compatible with fibers corresponding to the criteria of the G.652 recommendation. In particular, the fiber disclosed herein has a mode field diameter MFD in the standardized range of values from 8.6 microns to 9.5 microns at 1310 nanometers, a zero dispersion wavelength between 1300 nanometers and 1324 nanometers, and a zero dispersion slope of less than 0.092 ps/(nm$^2$·km). Each of these values is in accordance with the recommendation G.652.

On the other hand, as shown by Table 14 (below), the fiber has an effective cut-off wavelength $\lambda_{ceff}$ (or standard fiber cut-off, third column of Table 14) greater than 1300 nanometers, or even greater than 1350 nanometers. As discussed above, the effective cut-off wavelength is measured as being the wavelength at which the optical signal is no longer single mode after propagation over two meters of fiber, as defined by Subcommittee 86A of the International Electrotechnical Commission in IEC 60793-44 standard. This increased effective cut-off wavelength value leads to a cable cut-off wavelength value $\lambda_{cc}$ (or standard cable cut-off fifth column of Table 14) between 1200 nanometers and 1260 nanometers. The cable cut-off wavelength is measured as the wavelength at which the optical signal is no longer single mode after propagation over 22 meters of fiber, as defined by Subcommittee 86A of the International Electrotechnical Commission in IEC 60793-1-44 standard. The optical signal is single mode when the attenuation of the LP11 mode is greater than or equal to 19.3 dB. The G.652 and G.657 recommendations both impose a maximum value of 1260 nanometers for the cable cut-off wavelength.

One purpose of the developments disclosed herein is to produce fibers that can be used on all of the transmission bandwidths exploited by optical systems, i.e., fibers that can be used in single mode propagation from the original bandwidth (OB) which extends from 1260 nanometers to 1360 nanometers, and as far as the ultra-long (UL) bandwidth beyond 1625 nanometers. A low effective cut-off wavelength makes it possible to guarantee the possibility of using the fiber over all of the available bandwidths.

The simulations of Table 14 (below), however, show that the directly higher order LP11 mode is propagated according to a leaky mode from a wavelength of 1260 nanometers. The fiber disclosed herein can, therefore, be used in single mode transmission over the original bandwidth (OB: 1260 nanometers to 1360 nanometers).

Table 14 (below) shows several cut-off wavelength values for the disclosed fibers. The first column of Table 14 repeats the references of Table 12.

The column "Theoretical Fiber Cutoff" provides a theoretical cut-off wavelength value, which corresponds to the transition wavelength between a guided propagation of the LP11 mode and a propagation in leaky mode of this LP11 mode. For working wavelengths beyond this effective cut-off wavelength, the LP11 mode is propagated in leaky mode.

The column "Standard Fiber Cutoff" corresponds to the effective cut-off wavelength $\lambda_{ceff}$ as defined by Subcommittee 86A of the International Electrotechnical Commission in IEC 60793-1-44 standard.

The column "5-m Fiber Cutoff" corresponds to the cut-off wavelength measured as the wavelength over which the optical signal is no longer multimode after propagation over five meters of fiber. This value therefore corresponds to the effective cut-off wavelength measured after propagation over five meters of fiber instead of two meters of fiber.

The column "Standard Cable Cutoff" corresponds to the cable cut-off wavelength $\lambda_{cc}$ as defined by Subcommittee 86A of the International Electrotechnical Commission in IEC 60793-1-44 standard. According to the recommendation of Subcommittee 86A of the International Electrotechnical Commission in IEC 60793-1-44 standard, the cable cut-off wavelength $\lambda_{cc}$ is determined by positioning the fiber into two 40 millimeters radius loops and by arranging the remainder of the fiber (i.e., 21.5 meters of fiber) on a mandrel with a radius of 140 millimeters. This cut-off should be 1260 nanometers or less.

The column "Straight Cable Cutoff" corresponds to the cable cut-off wavelength by positioning the fiber into two loops each having a 40-millimeter radius, and by arranging the remainder of the fiber (i.e., 21.5 meters of fiber) virtually straight. This cut-off should be 1260 nanometers or less. Comparative Examples 9, 10 and 12 comply with this requirement but are slightly too high regarding standard cable cut-off.

The column "LP11 LL @1260 after 22 m" indicates the leakage losses of the LP11 mode after propagation over 22 meters of virtually straight fiber.

The column "Length—19.3dB LP11 LL @1260 nanometers" indicates the length of fiber required to achieve leakage losses of the LP11 mode equal to 19.3dB with the fiber being kept virtually straight. This indicates at which distance the fiber, arranged virtually straight, is single mode within the meaning of the G.652 and G.657 recommendations.

Similarly, it is noted from Table 14 that the fiber cut-off wavelength is significantly reduced after only 5 meters of propagation in the fiber. Thus, the cut-off wavelength, measured as the wavelength at which the optical signal is no longer single mode after propagation over five meters of fiber, is between 1240 nanometers and 1310 nanometers for the disclosed fiber.

Moreover, Table 14 clearly shows that the LP11 mode is already well attenuated after 22 meters of propagation. It is noted in particular that the attenuation of the LP11 mode in the disclosed fiber (10) is greater than the attenuation of the LP11 mode in an SSMF fiber when the fiber is arranged virtually straight. In fact, in an SSMF fiber, it is the bends that make it possible to highly attenuate the LP11 mode. Thus, the fiber has an attenuation of the LP11 mode greater than 5 dB after 22 meters of propagation in straight fiber at a wavelength of 1260 nanometers.

TABLE 14

| | Fiber Cutoff (theory) (nm) | Std Fiber Cutoff (nm) | 5-m Fiber Cutoff (nm) | Std Cable Cutoff (nm) | Straight Cable Cutoff (nm) | LP11 LL @1260 nm after 22 m (dB) | Length-19.3 dB LP11 LL @1260 nm (m) |
|---|---|---|---|---|---|---|---|
| BIF | 1197 | 1270 | 1234 | 1196 | 1208 | 180 | 2 |
| SSMF1 | 1287 | 1226 | 1226 | 1151 | 1151 | 2 | 212 |
| SSMF2 | 1334 | 1267 | 1267 | 1188 | 1188 | 0 | >1000 |
| SSMF3 | 1381 | 1311 | 1311 | 1231 | 1231 | 0 | >1000 |
| C. Ex1 | 1250 | 1379 | 1321 | 1271 | 1268 | 10 | 41 |
| C. Ex2 | 1243 | 1383 | 1323 | 1271 | 1266 | 16 | 27 |
| C. Ex3 | 1232 | 1397 | 1333 | 1271 | 1265 | 16 | 26 |
| C. Ex4 | 1239 | 1392 | 1331 | 1272 | 1267 | 15 | 28 |
| C. Ex5 | 1242 | 1382 | 1322 | 1268 | 1264 | 18 | 24 |
| C. Ex6 | 1247 | 1376 | 1319 | 1267 | 1266 | 15 | 28 |
| C. Ex7 | 1249 | 1351 | 1302 | 1259 | 1262 | 18 | 23 |
| C. Ex8 | 1246 | 1378 | 1319 | 1268 | 1264 | 17 | 25 |
| C. Ex9 | 1235 | 1373 | 1317 | 1264 | 1260 | 18 | 24 |
| C. Ex10 | 1243 | 1371 | 1313 | 1263 | 1260 | 22 | 20 |
| C. Ex11 | 1248 | 1367 | 1310 | 1263 | 1263 | 17 | 25 |
| C. Ex12 | 1244 | 1371 | 1314 | 1264 | 1260 | 20 | 21 |
| C. Ex13 | 1240 | 1375 | 1319 | 1267 | 1263 | 17 | 24 |
| Ex1 | 1175 | 1316 | 1255 | 1204 | 1201 | 88 | 5 |
| Ex2 | 1171 | 1316 | 1246 | 1205 | 1198 | 83 | 5 |
| Ex3 | 1171 | 1366 | 1271 | 1225 | 1205 | 44 | 10 |
| Ex4 | 1171 | 1316 | 1244 | 1207 | 1195 | 75 | 6 |
| Ex5 | 1171 | 1366 | 1269 | 1226 | 1200 | 40 | 11 |
| Ex9 | 1243 | 1360 | 1304 | 1257 | 1258 | 26 | 16 |
| Ex7 | 1238 | 1362 | 1305 | 1256 | 1255 | 24 | 17 |
| Ex8 | 1247 | 1350 | 1300 | 1257 | 1260 | 22 | 19 |
| Ex9 | 1245 | 1362 | 1306 | 1259 | 1259 | 24 | 18 |

It is noted from Table 14 that the standard effective cut-off wavelength $\lambda_{ceff}$, i.e., as measured according to the recommendations of Subcommittee 86A of the International Electrotechnical Commission in IEC 60793-1-44 standard, is greater than 1300 nanometers. Similarly, it is noted from Table 14 that the standard cable cut-off wavelength $\lambda_{cc}$, i.e., as measured according to the recommendations of Subcommittee 86A of the International Electrotechnical Commission in IEC 60793-44 standard, is between 1200 nanometers and 1260 nanometers (i.e., complying with the limit of 1260 nanometers imposed by the G.652 and G.657 recommendations).

It is noted from Table 14 that the LP11 mode is highly attenuated from a wavelength of 1260 nanometers. In fact, the "theoretical" fiber cut-off wavelength is less than or equal to 1250 nanometers. Thus, the higher order LP11 mode is propagated in a leaky mode regime in the original bandwidth, and only the fundamental mode remains guided in the disclosed fiber as from a wavelength of 1260 nanometers.

Moreover, Table 14 also shows that the attenuation of at least 19.3 dB of the LP11 mode is achieved relatively rapidly, after less than 22 meters, in accordance with cable cut-off imposed by the recommendation. Moreover, the increase in the effective cut-off wavelength makes it possible to increase the value of the MAC as defined above and consequently to reduce the bending losses.

Table 15 (below) reports bending loss values for preferred embodiments of fibers as disclosed herein. The first column of Table 15 repeats the references of Table 12. The next four columns show bending loss values PPC for respective radii of curvature of 15 millimeters, 10 millimeters, 7.5 millimeters and 5 millimeters at a wavelength of 1550 nanometers. The next four columns give bending loss values PPC for respective radii of curvature of 15 millimeters, 10 millimeters, 7.5 millimeters, and 5 millimeters at a wavelength of 1625 nanometers.

The last column has a factor of merit (FOM) representing the order of magnitude of the improvement in the bending losses by the disclosed fibers relative to the limits imposed by the G.657B recommendation. The FOM of Table 15 is thus defined as an average of the ratios between the upper limits imposed by the G.657B standard and the bending losses in the disclosed fibers for each radius of curvature measured. All examples present a FOM lower than or equal to 1, thus meaning they all comply with the G.657B bend losses recommendations.

Table 15 reports on the first line the bending loss limit values imposed by the G.657B recommendation for each radius of curvature and for the wavelengths of 1550 nanometers and 1625 nanometers.

TABLE 15

|  | R = 15 mm | R = 10 mm | R = 7.5 mm | R = 5 mm | R = 15 mm | R = 10 mm | R = 7.5 mm | R = 5 mm |  |
|---|---|---|---|---|---|---|---|---|---|
|  | PPC @1550 nm (dB/turn) |  |  |  | PPC @1625 nm (dB/turn) |  |  |  | FOM |
| G657B | 3E−03 | 1E−01 | 5E−01 |  | 1E−02 | 2E−01 | 1E+00 |  | 1.00 |
| BIF | 1.3E−03 | 2.9E−02 | 1.0E−01 | 3.3E−01 | 7.0E−03 | 8.4E−02 | 2.3E−01 | 6.3E−01 | 0.70 |
| SSMF1 | 1.5E−02 | 6.0E−01 | 3.4E+00 | 1.7E+01 | 7.5E−02 | 1.7E+00 | 6.9E+00 | 2.7E+01 | 8.44 |
| SSMF2 | 6.3E−03 | 3.6E−01 | 2.4E+00 | 1.4E+01 | 3.4E−02 | 1.0E+00 | 5.0E+00 | 2.3E+01 | 5.21 |
| SSMF3 | 9.6E−04 | 1.1E−01 | 1.0E+00 | 8.9E+00 | 6.5E−03 | 3.6E−01 | 2.5E+00 | 1.4E+01 | 2.45 |
| C. Ex1 | 4.9E−05 | 2.9E−03 | 1.6E−02 | 7.1E−02 | 3.9E−04 | 1.1E−02 | 4.2E−02 | 1.3E−01 | 0.05 |
| C. Ex2 | 5.4E−05 | 2.9E−03 | 1.6E−02 | 6.5E−02 | 4.3E−04 | 1.1E−02 | 4.1E−02 | 1.3E−01 | 0.05 |
| C. Ex3 | 6.6E−05 | 3.0E−03 | 1.5E−02 | 5.6E−02 | 5.0E−04 | 1.1E−02 | 3.8E−02 | 1.1E−01 | 0.05 |
| C. Ex4 | 6.2E−05 | 3.1E−03 | 1.5E−02 | 6.3E−02 | 4.7E−04 | 1.1E−02 | 3.9E−02 | 1.2E−01 | 0.06 |
| C. Ex5 | 2.2E−04 | 6.9E−03 | 2.7E−02 | 1.0E−01 | 1.3E−03 | 2.1E−02 | 6.4E−02 | 1.8E−01 | 0.13 |
| C. Ex6 | 2.1E−04 | 7.1E−03 | 2.9E−02 | 1.1E−01 | 1.3E−03 | 2.2E−02 | 6.9E−02 | 2.0E−01 | 0.13 |
| C. Ex7 | 1.4E−04 | 6.5E−03 | 3.1E−02 | 1.3E−01 | 1.0E−03 | 2.2E−02 | 7.7E−02 | 2.4E−01 | 0.11 |
| C. Ex8 | 1.4E−04 | 5.4E−03 | 2.4E−02 | 9.0E−02 | 9.2E−04 | 1.8E−02 | 5.8E−02 | 1.7E−01 | 0.09 |
| C. Ex9 | 2.3E−04 | 7.3E−03 | 2.8E−02 | 1.0E−01 | 1.4E−03 | 2.3E−02 | 6.8E−02 | 2.0E−01 | 0.14 |
| C. Ex10 | 2.0E−04 | 6.8E−03 | 2.9E−02 | 1.0E−01 | 1.2E−03 | 2.2E−02 | 6.8E−02 | 2.0E−01 | 0.12 |
| C. Ex11 | 2.0E−04 | 7.1E−03 | 3.0E−02 | 1.1E−01 | 1.2E−03 | 2.3E−02 | 7.1E−02 | 2.1E−01 | 0.12 |
| C. Ex12 | 2.0E−04 | 7.0E−03 | 2.9E−02 | 1.0E−01 | 1.3E−03 | 2.2E−02 | 6.8E−02 | 2.0E−01 | 0.13 |
| C. Ex13 | 2.3E−04 | 7.4E−03 | 2.9E−02 | 1.1E−01 | 1.4E−03 | 2.3E−02 | 7.0E−02 | 2.1E−01 | 0.14 |
| Ex1 | 2.3E−03 | 2.8E−02 | 8.0E−02 | 1.4E−01 | 1.0E−02 | 7.5E−02 | 1.7E−01 | 2.5E−01 | 1.00 |
| Ex2 | 1.2E−03 | 1.9E−02 | 5.0E−02 | 1.0E−01 | 6.5E−03 | 5.4E−02 | 1.3E−01 | 2.1E−01 | 0.65 |
| Ex3 | 8.5E−04 | 1.2E−02 | 3.6E−02 | 6.7E−02 | 4.5E−03 | 3.7E−02 | 8.4E−02 | 1.4E−01 | 0.45 |
| Ex4 | 7.1E−04 | 1.3E−02 | 4.3E−02 | 8.7E−02 | 4.1E−03 | 4.2E−02 | 1.0E−01 | 1.8E−01 | 0.41 |
| Ex5 | 4.9E−04 | 8.7E−03 | 2.8E−02 | 5.6E−02 | 2.8E−03 | 2.8E−02 | 6.7E−02 | 1.2E−01 | 0.28 |
| Ex6 | 2.0E−04 | 7.1E−03 | 3.1E−02 | 1.1E−01 | 1.2E−03 | 2.3E−02 | 7.2E−02 | 2.1E−01 | 0.12 |
| Ex7 | 2.2E−04 | 7.4E−03 | 3.1E−02 | 1.1E−01 | 1.4E−03 | 2.4E−02 | 7.2E−02 | 2.1E−01 | 0.14 |
| Ex8 | 1.7E−04 | 7.4E−03 | 3.4E−02 | 1.3E−01 | 1.2E−03 | 2.4E−02 | 8.2E−02 | 2.5E−01 | 0.12 |
| Ex9 | 1.9E−04 | 7.0E−03 | 3.0E−02 | 1.1E−01 | 1.2E−03 | 2.3E−02 | 7.2E−02 | 2.1E−01 | 0.12 |

It is noted from Table 15 that the bending losses of the disclosed fibers are clearly less than the limits imposed by the G.657B standard, though for Example 1 the bending loss at 1625 nanometers at a curvature of 15 millimeters is the same as the recommendation.

Thus, the fiber disclosed (above) has, for a wavelength of 1550 nanometers, bending losses less than $3 \times 10^{-3}$ dB/turn, preferably less than $0.25 \times 10^{-3}$ dB/turn for a radius of curvature of 15 millimeters, as compared to a limit of $3 \times 10^{-3}$ dB/turn imposed by the G.657B recommendation. The fiber further has bending losses less than or equal $3 \times 10^{-2}$, preferably less than or equal to $7.5 \times 10^{-3}$ dB/turn for a radius of curvature of 10 millimeters, as compared against a limit of 0.1 dB/turn imposed by the G.657B recommendation. The bending losses are less than or equal to 0.05 dB/turn for a radius of curvature of 7.5 millimeters, as against a limit of 0.5 dB/turn imposed by the G.657B recommendation, and bending losses less than 0.15 dB/turn, preferably less than or equal to 0.10 dB/turn for a radius of curvature of 5 millimeters.

Similarly, the disclosed fiber exhibits, for a wavelength of 1625 nanometers, bending losses less than $10^{-2}$ dB/turn, preferably less than $1.5 \times 10^{-3}$ dB/turn for a radius of curvature of 15 millimeters, as compared to a limit of $10^{-2}$ dB/turn imposed by the G.657B recommendation. The bending losses are less than or equal to 0.1 dB/turn, preferably less than or equal to $25 \times 10^{-3}$ dB/turn for a radius of curvature of 10 millimeters, as compared to a limit of 0.2 dB/turn imposed by the G.657B recommendation. The fiber exhibits bending losses less than or equal to 0.15 dB/turn, preferably less than or equal to 0.08 dB/turn for a radius of curvature of 7.5 millimeters, as against a limit of 1 dB/turn imposed by the G.657B recommendation, and bending losses less than 0.25 dB/turn for a radius of curvature of 5 millimeters.

The fibers disclosed herein are well suited to a use in optical systems installed in the subscriber's home, of FTTH type, in which the fiber is subjected to significant bend stresses due to the miniaturization of the optical box or holding the fiber in place with staples. The fiber can be placed in particularly compact optical boxes. In fact, the optical fiber may be arranged with a radius of curvature of less than 15 millimeters, for example, a radius of curvature about 5 millimeters. The fiber remains compatible with the fibers of existing systems, in particular in terms of mode field diameter for good fiber-to-fiber coupling. The increase in the cut-off wavelength is not detrimental due to a significant attenuation of the LP11 mode from a wavelength of 1260 nanometers.

\* \* \*

As noted, the optical fiber according to the present invention includes one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The optical fiber according to the present invention may be deployed in various structures, such as those exemplary structures disclosed hereinafter.

For example, one or more of the present optical fibers may be enclosed within a buffer tube. For instance, optical fiber may be deployed in either a single fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into sub-units (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary coating thickness and/or modulus, to improve microbending and macrobending characteristics.

By way of example, a rectangular ribbon stack may be formed with or without a central twist (i.e., a "primary twist").

Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation) it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished in one direction, helically, known as "S" or "Z" stranding, or Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or nonmetallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). Likewise, strength members can be included within the buffer tube's casing.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit.

The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may tightly or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or, within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Patent Application Publication No. US 2007/0019915 A1 and its related U.S. patent application Ser. No. 11/424,112, now U.S. Pat. No. 7,515,795, for a Water-Swellable Tape, Adhesive-Backed for Coupling When Used Inside a Buffer Tube (Overton et al.), each of which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Patent Application Publication No. US 2008/0145010 A1, now U.S. Pat. No. 7,599,589, for a Gel-Free Buffer Tube with Adhesively Coupled Optical Element (Overton et al.), which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. patent application Ser. No. 12/146,588, published as U.S. Patent Application Publication No. 2009/0003785 A1, for a Coupling Composition for Optical Fiber Cables (Parris et al.), now U.S. Pat. No. 7,724,998, which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape along with one or more dielectric jackets may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the optical fiber according to the present invention may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Patent Application Publication No. 2007/0263960, now U.S. Pat. No. 7,574,095, for a Communication Cable Assembly and Installation Method (Lock et al.), and U.S. patent application Ser. No. 12/200,095, now U.S. Pat. No. 7,665,902, for a Modified Pre-Ferrulized Communication Cable Assembly and Installation Method (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about seventy to eighty percent of the duct's or microduct's inner diameter.

Compressed air may also be used to install optical fibers according to the present invention in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by outer cable shealth, the optical fibers itself may be further reinforced so that the optical may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the fiber ends either in the field (e.g., at the network location) or in a factory prior to installation into the network. The ends of the connectors are mated in the field in order to connect the fibers together or connect the fibers to the passive or active components. For example, certain optical fiber cable assemblies (e.g., furcation assemblies) can separate and convey individual optical fibers from a multiple optical fiber cable to connectors in a protective manner The deployment of such optical fiber cables may include supplemental equipment. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing optical fibers according to the present invention may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound with a bending radius of less than about 15 millimeters (e.g., 10 millimeters or less, such as about 5 millimeters) in the optical module or the storage box.

Moreover, optical fibers according to the present invention may be used in other applications, including, without limitation, fiber optic sensors or illumination applications (e.g., lighting).

\* \* \*

In another aspect, the optical fibers according to the present invention may be enclosed by buffer tubes formed from a hardened polymer material (e.g., polysulfone).

Those having ordinary skill in the art will appreciate that hardened buffer tubes subject conventional optical fibers to excessive risk of microbending. In contrast and as noted, the present bend-insensitive optical fibers provide exceptional microbending resistance, and so can be satisfactory deployed in hardened buffer tubes.

By way of example, the hardened buffer tube may have an outer diameter between about one and two millimeters. An exemplary hardened buffer tube may possess an inner diameter of about 300 microns, thus forming a single-fiber, semi-tight buffer tube (e.g., a hardened buffer tube having an outer diameter of 1.0 millimeters and an inner diameter of about 300 microns).

In a particular embodiment, a bend-insensitive optical fiber according to the present invention may be enclosed by a hardened buffer tube formed from polysulfone, such as by extrusion or pultrusion. This kind of hardened buffer tube provides superior resistance to lateral stresses that could otherwise cause microbending or macrobending of the enclosed optical fiber. The hardened buffer tube is capable of withstanding high temperatures (e.g., 200° C.) and exposure to corrosive chemicals (e.g., gasoline). Similar to more complex structures, the present hardened buffer tube offers protection against lateral stresses, high temperatures, and corrosive chemicals yet is less expensive and simpler to manufacture.

\* \* \*

This application incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same, and its related patent application Ser. No. 08/377,366; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for Optical Unit for Fiber Optic Cables; U.S. Pat. No. 6,066,397 for Polypropylene Filler Rods for Optical Fiber Communications Cables; U.S. Pat. No. 6,175,677 for Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for Method for Accessing Optical Fibers in the Midspan Region of an Optical Fiber Cable; U.S. Pat. No. 6,381,390 for Color-Coded Optical Fiber Ribbon and Die for Making the Same; U.S. Pat. No. 6,181,857 for Method for Accessing Optical Fibers Contained in a Sheath; U.S. Pat. No. 6,314,224 for Thick-Walled Cable Jacket with Non-Circular Cavity Cross Section; U.S. Pat. No. 6,334,016 for Optical Fiber Ribbon Matrix Material Having Optimal Handling Characteristics; U.S. Pat. No. 6,321,012 for Optical Fiber Having Water Swellable Material for Identifying Grouping of Fiber Groups; U.S. Pat. No. 6,321,014 for Method for Manufacturing Optical Fiber Ribbon; U.S. Pat. No. 6,210,802 for Polypropylene Filler Rods for Optical Fiber Communications Cables; U.S. Pat. No. 6,493,491 for Optical Drop Cable for Aerial Installation; U.S. Pat. No. 7,346,244 for Coated Central Strength Member for Fiber Optic Cables with Reduced Shrinkage; U.S. Pat. No. 6,658,184 for Protective Skin for Optical Fibers; U.S. Pat. No. 6,603,908 for Buffer Tube that Results in Easy Access to and Low Attenuation of Fibers Disposed Within Buffer Tube; U.S. Pat. No. 7,045,010 for Applicator for High-Speed Gel Buffering of Flextube Optical Fiber Bundles; U.S. Pat. No. 6,749,446 for Optical Fiber Cable with Cushion Members Protecting Optical Fiber Ribbon Stack; U.S. Pat. No. 6,922,515 for Method and Apparatus to Reduce Variation of Excess Fiber Length in Buffer Tubes of Fiber Optic Cables; U.S. Pat. No. 6,618,538 for Method and Apparatus to Reduce Variation of Excess Fiber Length in Buffer Tubes of Fiber Optic Cables; U.S. Pat. No. 7,322,122 for Method and Apparatus for Curing a Fiber Having at Least Two Fiber Coating Curing Stages; U.S. Pat. No. 6,912,347 for Optimized Fiber Optic Cable Suitable for Microduct Blown Installation; U.S. Pat. No. 6,941,049 for Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Patent Application Publication No. US 2007/0019915 A1, now U.S. Pat. No. 7,515,795, for a Water-Swellable Tape, Adhesive-Backed for Coupling When Used Inside a Buffer Tube (Overton et al.); International Patent Application Publication No. 2007/013923 for Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Patent Application Publication No. US 2007/0183726 A1, now U.S. Pat. No. 7,570,852, for a Optical Fiber Cable Suited for Blown Installation or Pushing Installation in Microducts of Small Diameter (Nothofer et al.); U.S. Patent Application Publication No. US 2008/0037942 A1, now U.S. Pat. No. 7,646,954, for an Optical Fiber Telecommunications Cable (Tatat); U.S. Patent Application Publication No. US 2008/0145010 A1, now U.S. Pat. No. 7,599,589, for a Gel-Free Buffer Tube with Adhesively Coupled Optical Element (Overton et al.); U.S. Patent Application Publication No. US 2008/0181564 A1, now U.S. Pat. No. 7,567,739, for a Fiber Optic Cable Having a Water-Swellable Element (Overton); U.S. patent application Ser. No. 12/101,528, now published as U.S. Patent Application Publication No. 2009/0041414 A1, for a Method for Accessing Optical Fibers within a Telecommunication Cable (Lavenne et al.), now U.S. Pat. No. 7,817,891; U.S. patent application Ser. No. 12/146,526, now U.S. Pat. No. 7,639,915, for a Optical Fiber Cable Having a Deformable Coupling Element (Parris et al.); U.S. patent application Ser. No. 12/146,588, now published as U.S. Patent Application Publication No. 2009/0003785 A1, for a Coupling Composition for Optical Fiber Cables (Parris et al.), now U.S. Pat. No. 7,725,998; U.S. Patent Application No. 61/096,545 and its related patent application Ser. No. 12/557,055, now published as U.S. Patent Application Publication No. 2010/0092135 A1, for a Optical Fiber Cable Assembly (Barker et al.); and U.S. Patent Application No. 61/096,750 and its related patent application Ser. No. 12/557,086, now published as U.S. Patent Application Publication No. 2010/0067857 A1, for a High-Fiber-Density Optical Fiber Cable (Lovie et al.), now U.S. Pat. No. 7,974,507.

* * *

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A single-mode optical fiber, comprising:
   a single-mode glass fiber comprising (i) a central core surrounded by an outer optical cladding, the central core having a radius $r_1$ and a positive refractive index difference $\Delta n_1$ with the outer optical cladding; (ii) an intermediate cladding positioned between the central core and the outer optical cladding, the intermediate cladding having a radius $r_2$ and a refractive index difference $\Delta n_2$ with the outer optical cladding, wherein the refractive index difference $\Delta n_2$ is less than the refractive index difference $\Delta n_1$; and (iii) a depressed trench positioned between the intermediate cladding and the outer optical cladding, the depressed trench having a radius $r_3$ and a negative refractive index difference $\Delta n_3$ with the outer optical cladding; and
   a substantially cured primary coating surrounding the single-mode glass fiber, the substantially cured primary coating possessing (i) an in situ modulus of less than about 0.65 MPa and (ii) a glass transition temperature of less than about −50° C.;
   wherein, at a wavelength of 1310 nanometers, the optical fiber has a nominal mode field diameter (MFD) between 8.6 microns and 9.5 microns;
   wherein, at a wavelength of 1550 nanometers, the optical fiber has bending losses of $0.25 \times 10^{-3}$ dB/turn or less for a radius of curvature of 15 millimeters; and wherein, at a wavelength of 1260 nanometers, the LP11 mode of the optical fiber is attenuated to 19.3 dB at a length of less than 90 meters.

2. The optical fiber according to claim 1, wherein the substantially cured primary coating possesses an in situ modulus of between about 0.2 MPa and 0.5 MPa.

3. The optical fiber according to claim 1, wherein the substantially cured primary coating possesses a glass transition temperature of less than about −55° C.

4. The optical fiber according to claim 3, wherein said substantially cured primary coating possesses an in situ modulus of between about 0.3 MPa and 0.4 MPa.

5. The optical fiber according to claim 1, wherein the primary coating achieves 50 percent of full cure at a UV dose of about 0.3 J/cm$^2$ as measured on a standard 75-micron film at standard temperature and pressure.

6. The optical fiber according to claim 1, wherein the primary coating comprises a UV-curable urethane acrylate composition.

7. The optical fiber according to claim 1, wherein:
the surface integral of the central core ($V_{01}$), defined as $$V_{01} = \int_0^{r1} \Delta n(r) \cdot dr \approx r_1 \times \Delta n_1,$$

is between $20.0 \times 10^{-3}$ micron and $23.0 \times 10^{-3}$ micron; and
the surface integral of the depressed trench ($V_{03}$), defined as $$V_{03} = \int_{r2}^{r3} \Delta n(r) \cdot dr \approx (r_3 - r_2) \times \Delta n_3,$$

is between $-55.0 \times 10^{-3}$ micron and $-30.0 \times 10^{-3}$ micron.

8. The optical fiber according to claim 1, wherein:
the central core has a refractive index difference ($\Delta n_1$) with the outer optical cladding between about $5.3 \times 10^{-3}$ and $5.7 \times 10^{-3}$;
the intermediate cladding has a refractive index difference ($\Delta n_2$) with the outer optical cladding between about $0.1 \times 10^{-3}$ and $0.6 \times 10^{-3}$; and
the depressed trench has a refractive index difference ($\Delta n_3$) with the outer optical cladding between about $-10.0 \times 10^{-3}$ and $-5.0 \times 10^{-3}$.

9. The optical fiber according to claim 1, wherein the optical fiber has a zero chromatic dispersion wavelength (ZDW) between 1300 nanometers and 1324 nanometers and, at the zero chromatic dispersion wavelength (ZDW), a zero chromatic dispersion slope value (ZDS) of 0.092 ps/(nm$^2$·km) or less.

10. The optical fiber according to claim 1, wherein, at a wavelength of 1550 nanometers, the optical fiber has bending losses of 0.05 dB/turn or less for a radius of curvature of 7.5 millimeters.

11. The optical fiber according to claim 1, wherein, at a wavelength of 1550 nanometers, the optical fiber has bending losses of 0.15 dB/turn or less for a radius of curvature of 5 millimeters.

12. The optical fiber according to claim 1, wherein, at a wavelength of 1625 nanometers, the optical fiber has bending losses of $1.5 \times 10^{-3}$ dB/turn or less for a radius of curvature of 15 millimeters.

13. The optical fiber according to claim 1, wherein, at a wavelength of 1625 nanometers, the optical fiber has bending losses of 0.08 dB/turn or less for a radius of curvature of 7.5 millimeters.

14. The optical fiber according to claim 1, wherein, at wavelengths between 1200 nanometers and 1700 nanometers, the optical fiber possesses spectral attenuation added losses of less than about 0.1 dB/km as measured in accordance with IEC TR62221, Method B (fixed diameter drum).

15. The optical fiber according to claim 1, wherein, at a wavelength of 1550 nanometers, the optical fiber possesses attenuation added losses of less than 1.0 dB/km as measured at 23° C. in accordance with a modified IEC TR62221 fixed-diameter sandpaper drum test in which a 440-meter fiber sample is wound in a single layer at about 1,470 mN on a 300-mm diameter quartz drum that is wrapped with 180-grit sandpaper to create a rough surface.

16. The optical fiber according to claim 1, wherein, at a wavelength of 1550 nanometers, the optical fiber possesses (i) a MAC number of less than about 8.6 and (ii) microbending sensitivity of less than about 0.05 (dB/km)/(N/mm) as measured in accordance with IEC TR62221, Method B (fixed diameter drum).

17. The optical fiber according to claim 1, wherein the central core has a step-refractive index profile.

18. The optical fiber according to claim 1, wherein at a wavelength of 1260 nanometers, the LP11 mode of the optical fiber is attenuated to 19.3 dB at a length of less than 50 meters.

19. A single-mode optical fiber, comprising:
a single-mode glass fiber comprising (i) a central core surrounded by an outer optical cladding, the central core having a radius $r_1$ and a positive refractive index difference $\Delta n_1$ with the outer optical cladding; (ii) an intermediate cladding positioned between the central core and the outer optical cladding, the intermediate cladding having a radius $r_2$ and a refractive index difference $\Delta n_2$ with the outer optical cladding, wherein the refractive index difference $\Delta n_2$ is less than the refractive index difference $\Delta n_1$; and (iii) a depressed trench positioned between the intermediate cladding and the outer optical cladding, the depressed trench having a radius $r_3$ and a negative refractive index difference $\Delta n_3$ with the outer optical cladding; and
a substantially cured primary coating surrounding the single-mode glass fiber, the substantially cured primary coating possessing (i) an in situ modulus of less than about 0.65 MPa and (ii) a glass transition temperature of less than about −50° C.;
wherein, at a wavelength of 1310 nanometers, the optical fiber has a nominal mode field diameter (MFD) between 8.6 microns and 9.5 microns;
wherein, at a wavelength of 1625 nanometers, the optical fiber has bending losses of $1.5 \times 10^{-3}$ dB/turn or less for a radius of curvature of 15 millimeters; and
wherein, at a wavelength of 1260 nanometers, the LP11 mode of the optical fiber is attenuated to 19.3 dB at a length of less than 90 meters.

20. The optical fiber according to claim 19, wherein the substantially cured primary coating possesses an in situ modulus of more than about 0.2 MPa and less than 0.5 MPa.

21. The optical fiber according to claim 20, wherein the substantially cured primary coating possesses a glass transition temperature of less than about −60° C.

22. The optical fiber according to claim 19, wherein said substantially cured primary coating possesses an in situ modulus of between about 0.3 MPa and 0.4 MPa.

23. The optical fiber according to claim 19, wherein the primary coating comprises a UV-curable urethane acrylate composition that achieves 80 percent of full cure at a UV dose of about 0.5 J/cm$^2$ as measured on a standard 75-micron film at standard temperature and pressure.

24. The optical fiber according to claim 19, wherein the central core has a step-refractive index profile.

25. The optical fiber according to claim 19, wherein:
the surface integral of the central core ($V_{01}$), defined as $$V_{01} = \int_0^{r_1} \Delta n(r) \cdot dr \approx r_1 \times \Delta n_1,$$

is between $20.0 \times 10^{-3}$ micron and $23.0 \times 10^{-3}$ micron; and
the surface integral of the depressed trench ($V_{03}$), defined as $$V_{03} = \int_{r_2}^{r_3} \Delta n(r) \cdot dr \approx (r_3 - r_2) \times \Delta n_3,$$

is between $-55.0 \times 10^{-3}$ micron and $-30.0 \times 10^{-3}$ micron.

26. The optical fiber according to claim 19, wherein the depressed trench has a radius ($r_3$) of less than about 16 microns and a refractive index difference ($\Delta n_3$) with the outer optical cladding between about $-10.0 \times 10^{-3}$ and $-5.0 \times 10^{-3}$.

27. The optical fiber according to claim 19, wherein, at a wavelength of 1260 nanometers, the LP11 mode of the optical fiber is attenuated to at least 5 dB at a length of 22 meters.

28. The optical fiber according to claim 19, wherein the optical fiber has a zero chromatic dispersion wavelength (ZDW) between 1300 nanometers and 1324 nanometers and, at the zero chromatic dispersion wavelength (ZDW), a zero chromatic dispersion slope value (ZDS) of 0.092 ps/(nm²·km) or less.

29. The optical fiber according to claim 19, wherein, at a wavelength of 1550 nanometers, the optical fiber has bending losses of $7.5 \times 10^{-3}$ dB/turn or less for a radius of curvature of 10 millimeters.

30. The optical fiber according to claim 19, wherein, at a wavelength of 1550 nanometers, the optical fiber has bending losses of 0.05 dB/turn or less for a radius of curvature of 7.5 millimeters.

31. The optical fiber according to claim 19, wherein, at a wavelength of 1550 nanometers, the optical fiber has bending losses of 0.15 dB/turn or less for a radius of curvature of 5 millimeters.

32. The optical fiber according to claim 19, wherein, at a wavelength of 1625 nanometers, the optical fiber has bending losses of $25 \times 10^{-3}$ dB/turn or less for a radius of curvature of 10 millimeters.

33. The optical fiber according to claim 19, wherein, at a wavelength of 1625 nanometers, the optical fiber has bending losses of 0.08 dB/turn or less for a radius of curvature of 7.5 millimeters.

34. The optical fiber according to claim 19, wherein, at a wavelength of 1625 nanometers, the optical fiber has bending losses of 0.25 dB/turn or less for a radius of curvature of 5 millimeters.

35. The optical fiber according to claim 19, wherein, at a wavelength of 1550 nanometers or 1625 nanometers, the optical fiber possesses spectral attenuation added losses of less than about 0.05 dB/km as measured in accordance with IEC TR62221, Method B (fixed diameter drum).

36. The optical fiber according to claim 19, wherein, at a wavelength of 1550 nanometers, the optical fiber possesses attenuation added losses of less than 0.5 dB/km as measured at 23° C. in accordance with a modified IEC TR62221 fixed-diameter sandpaper drum test in which a 440-meter fiber sample is wound in a single layer at about 1,470 mN on a 300-mm diameter quartz drum that is wrapped with 180-grit sandpaper to create a rough surface.

37. The optical fiber according to claim 19, wherein, at a wavelength of 1550 nanometers, the optical fiber possesses microbending sensitivity of less than about 0.03 (dB/km)/(N/mm) as measured in accordance with IEC TR62221, Method B (fixed diameter drum).

38. A single-mode optical fiber, comprising:
a single-mode glass fiber comprising (i) a central core surrounded by an outer optical cladding, the central core having a radius $r_1$ and a positive refractive index difference $\Delta n_1$ with the outer optical cladding; (ii) an intermediate cladding positioned between the central core and the outer optical cladding, the intermediate cladding having a radius $r_2$ and a refractive index difference $\Delta n_2$ with the outer optical cladding, wherein the refractive index difference $\Delta n_2$ is less than the refractive index difference $\Delta n_1$; and (iii) a depressed trench positioned between the intermediate cladding and the outer optical cladding, the depressed trench having a radius $r_3$ and a negative refractive index difference $\Delta n_3$ with the outer optical cladding; and
a substantially cured primary coating surrounding the single-mode glass fiber, the substantially cured primary coating possessing (i) an in situ modulus of less than about 0.65 MPa and (ii) a glass transition temperature of less than about $-50°$ C.;
wherein, at a wavelength of 1310 nanometers, the optical fiber has a nominal mode field diameter (MFD) between 8.6 microns and 9.5 microns;
wherein, at a wavelength of 1550 nanometers, the optical fiber has bending losses of 0.15 dB/turn or less for a radius of curvature of 5 millimeters; and
wherein the optical fiber has a standard cable cut-off wavelength of 1260 nanometers or less.

39. The optical fiber according to claim 38, wherein the substantially cured primary coating possesses an in situ modulus of less than 0.5 MPa.

40. The optical fiber according to claim 38, wherein the substantially cured primary coating possesses a glass transition temperature of less than about $-60°$ C.

41. The optical fiber according to claim 40, wherein said substantially cured primary coating possesses an in situ modulus of between about 0.20 MPa and 0.4 MPa.

42. The optical fiber according to claim 38, wherein the primary coating achieves 50 percent of full cure at a UV dose of about 0.3 J/cm² as measured on a standard 75-micron film at standard temperature and pressure.

43. The optical fiber according to claim 38, wherein the primary coating comprises a UV-curable urethane acrylate composition.

44. The optical fiber according to claim 38, wherein the central core has a step-refractive index profile.

45. The optical fiber according to claim 38, wherein the optical fiber has (i) a zero chromatic dispersion wavelength (ZDW) between 1300 nanometers and 1324 nanometers and (ii) a zero chromatic dispersion slope value (ZDS) at the zero chromatic dispersion wavelength of 0.092 ps/(nm²·km) or less.

46. The optical fiber according to claim 38, wherein the optical fiber has an effective cut-off wavelength $\lambda_{ceff}$ greater than 1300 nanometers.

47. The optical fiber according to claim 38, wherein the optical fiber has a theoretical cut-off wavelength of 1250 nanometers or less.

48. The The optical fiber according to claim 38, wherein, at a wavelength of 1550 nanometers, the optical fiber has bending losses of (i) 0.003 dB/turn or less for a radius of curvature of 15 millimeters, (ii) 0.03 dB/turn or less for a radius of curvature of 10 millimeters, and (iii) 0.05 dB/turn or less for a radius of curvature of 7.5 millimeters.

49. The optical fiber according to claim 38, wherein, at a wavelength of 1625 nanometers, the optical fiber has bending losses of (i) 0.0015 dB/turn or less for a radius of curvature of 15 millimeters, (ii) 0.025 dB/turn or less for a radius of curvature of 10 millimeters, and (iii) 0.08 dB/turn or less for a radius of curvature of 7.5 millimeters.

50. The The optical fiber according to claim 38, wherein, for a radius of curvature of 5 millimeters, the optical fiber has bending losses of (i) 0.10 dB/turn or less at a wavelength of 1550 nanometers and/or (ii) 0.25 dB/turn or less at a wavelength of 1625 nanometers.

51. The optical fiber according to claim 38, wherein, at a wavelength of 1550 nanometers or 1625 nanometers, the optical fiber possesses spectral attenuation added losses of less than about 0.05 dB/km as measured in accordance with IEC TR62221, Method B (fixed diameter drum).

52. The optical fiber according to claim 38, wherein, at a wavelength of 1550 nanometers, the optical fiber possesses attenuation added losses of less than 1.0 dB/km as measured at 23° C. in accordance with a modified IEC TR62221 fixed-diameter sandpaper drum test in which a 440-meter fiber sample is wound in a single layer at about 1,470 mN on a 300-mm diameter quartz drum that is wrapped with 180-grit sandpaper to create a rough surface.

53. The optical fiber according to claim 38, wherein, at a wavelength of 1550 nanometers, the optical fiber possesses (i) a MAC number of between about 7.2 and 8.0 and (ii) microbending sensitivity of less than about 0.05 (dB/km)/(N/mm) as measured in accordance with IEC TR62221, Method B (fixed diameter drum).

54. A single-mode optical fiber, comprising:
a single-mode glass fiber comprising (i) a central core surrounded by an outer optical cladding, the central core having a radius $r_1$ and a positive refractive index difference $\Delta n_1$ with the outer optical cladding; (ii) an intermediate cladding positioned between the central core and the outer optical cladding, the intermediate cladding having a radius $r_2$ and a refractive index difference $\Delta n_2$ with the outer optical cladding, wherein the refractive index difference $\Delta n_2$ is less than the refractive index difference $\Delta n_1$; and (iii) a depressed trench positioned between the intermediate cladding and the outer optical cladding, the depressed trench having a radius $r_3$ and a negative refractive index difference $\Delta n_3$ with the outer optical cladding; and
a substantially cured primary coating surrounding the single-mode glass fiber, the substantially cured primary coating possessing (i) an in situ modulus of less than about 0.65 MPa and (ii) a glass transition temperature of less than about −50° C.;
wherein, at a wavelength of 1310 nanometers, the optical fiber has a mode field diameter (MFD) between 8.2 microns and 9.9 microns;
wherein, at a wavelength of 1550 nanometers, the optical fiber has bending losses of 0.15 dB/turn or less for a radius of curvature of 5 millimeters; and
wherein, at a wavelength of 1260 nanometers, the LP11-mode attenuation is 19.3 dB after propagation through 45 meters or less of the optical fiber while the optical fiber is straight.

55. The optical fiber according to claim 54, wherein the substantially cured primary coating possesses an in situ modulus of more than about 0.2 MPa and less than 0.5 MPa.

56. The optical fiber according to claim 55, wherein the substantially cured primary coating possesses a glass transition temperature of less than about −55° C.

57. The optical fiber according to claim 54, wherein said substantially cured primary coating possesses an in situ modulus of between about 0.3 MPa and 0.4 MPa.

58. The optical fiber according to claim 54, wherein the primary coating comprises a UV-curable urethane acrylate composition that achieves 90 percent of full cure at a UV dose of about 1.0 J/cm$^2$ as measured on a standard 75-micron film at standard temperature and pressure.

59. The optical fiber according to claim 54, wherein, at a wavelength of 1260 nanometers, the LP11-mode leakage losses are 19.3 dB after propagation through 22 meters or less of the optical fiber while the optical fiber is straight.

60. The optical fiber according to claim 54, wherein the optical fiber has (i) a zero chromatic dispersion wavelength (ZDW) between 1300 nanometers and 1324 nanometers and (ii) a zero chromatic dispersion slope value (ZDS) at the zero chromatic dispersion wavelength of 0.092 ps/(nm$^2$·km) or less.

61. The optical fiber according to claim 54, wherein, at a wavelength of 1550 nanometers, the optical fiber has bending losses of (i) 0.00025 dB/turn or less for a radius of curvature of 15 millimeters, (ii) 0.0075 dB/turn or less for a radius of curvature of 10 millimeters, and (iii) 0.05 dB/turn or less for a radius of curvature of 7.5 millimeters.

62. The optical fiber according to claim 54, wherein, at a wavelength of 1625 nanometers, the optical fiber has bending losses of (i) 0.01 dB/turn or less for a radius of curvature of 15 millimeters, (ii) 0.1 dB/turn or less for a radius of curvature of 10 millimeters, and (iii) 0.15 dB/turn or less for a radius of curvature of 7.5 millimeters.

63. The optical fiber according to claim 54, wherein, for a radius of curvature of 5 millimeters, the optical fiber has bending losses of (i) 0.10 dB/turn or less at a wavelength of 1550 nanometers and/or (ii) 0.25 dB/turn or less at a wavelength of 1625 nanometers.

64. The optical fiber according to claim 54, wherein, at wavelengths between 1200 nanometers and 1700 nanometers, the optical fiber possesses spectral attenuation added losses of less than about 0.1 dB/km as measured in accordance with IEC TR62221, Method B (fixed diameter drum).

65. The optical fiber according to claim 54, wherein, at a wavelength of 1550 nanometers, the optical fiber possesses (i) a MAC number of less than about 8.6 and (ii) microbending sensitivity of less than about 0.05 (dB/km)/(N/mm) as measured in accordance with IEC TR62221, Method B (fixed diameter drum).

* * * * *